United States Patent
Hull et al.

(10) Patent No.: US 11,390,796 B2
(45) Date of Patent: Jul. 19, 2022

(54) VISCOELASTIC-SURFACTANT FRACTURING FLUIDS HAVING OXIDIZER

(71) Applicant: Saudi Arabian Oil Company, Dhahran (SA)

(72) Inventors: Katherine Leigh Hull, Houston, TX (US); Rajesh Kumar Saini, Cypress, TX (US); Desmond Schipper, Houston, TX (US); Brady Kevin Crane, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/139,620

(22) Filed: Dec. 31, 2020

(65) Prior Publication Data
US 2021/0198559 A1 Jul. 1, 2021

Related U.S. Application Data

(60) Provisional application No. 62/955,717, filed on Dec. 31, 2019.

(51) Int. Cl.
| | |
|---|---|
| *E21B 43/26* | (2006.01) |
| *C09K 8/68* | (2006.01) |
| *C09K 8/80* | (2006.01) |
| *E21B 43/267* | (2006.01) |
| *C09K 8/66* | (2006.01) |

(52) U.S. Cl.
CPC .............. *C09K 8/68* (2013.01); *C09K 8/80* (2013.01); *E21B 43/26* (2013.01); *E21B 43/267* (2013.01); *C09K 8/665* (2013.01); *C09K 2208/30* (2013.01)

(58) Field of Classification Search
None
See application file for complete search history.

(56) References Cited

U.S. PATENT DOCUMENTS

| | | | |
|---|---|---|---|
| 701,154 | A | 5/1902 | Cole |
| 830,437 | A | 9/1906 | Humphrey |
| 2,900,269 | A | 8/1959 | Bauman et al. |
| 3,284,281 | A | 11/1966 | Thomas |
| 3,316,965 | A | 5/1967 | Watanabe |

(Continued)

FOREIGN PATENT DOCUMENTS

| | | |
|---|---|---|
| CA | 2322118 | 12/2007 |
| CA | 2635868 | 12/2008 |

(Continued)

OTHER PUBLICATIONS

"Hydraulic Fracturing Fluid Product Component Information Disclosure," 2012, 2 pages.

(Continued)

*Primary Examiner* — Andrew Sue-Ako
(74) *Attorney, Agent, or Firm* — Fish & Richardson P.C.

(57) ABSTRACT

A method and hydraulic fracturing fluid that is a viscoelastic surfactant (VES) fracturing fluid having a surfactant and an inorganic oxidizer salt for hydraulic fracturing of a geological formation. The VES fracturing fluid is provided through a wellbore into the geological formation to hydraulically fracture the geological formation to form hydraulic fractures in the geological formation. The method includes oxidizing organic material in the hydraulic fractures with the VES fracturing fluid.

22 Claims, 11 Drawing Sheets

(56) References Cited

U.S. PATENT DOCUMENTS

| | | |
|---|---|---|
| 3,456,183 A | 7/1969 | Codrington et al. |
| 3,616,855 A | 11/1971 | Colgate |
| 3,690,622 A | 9/1972 | Brunner et al. |
| 3,716,387 A | 2/1973 | Simmons et al. |
| 3,807,557 A | 4/1974 | Miller |
| 3,834,122 A | 9/1974 | Allison et al. |
| 3,912,330 A | 10/1975 | Carnahan et al. |
| 3,926,575 A | 12/1975 | Meyers |
| 3,977,472 A | 8/1976 | Graham et al. |
| 3,996,062 A | 12/1976 | Frost |
| 4,043,599 A | 8/1977 | Lingane |
| 4,043,885 A | 8/1977 | Yen et al. |
| 4,047,988 A | 9/1977 | Weill |
| 4,195,010 A | 3/1980 | Russell et al. |
| 4,220,550 A | 9/1980 | Frenier et al. |
| 4,223,726 A | 9/1980 | Cha |
| 4,252,189 A | 2/1981 | Bodine |
| 4,289,639 A | 9/1981 | Buske |
| 4,324,560 A | 4/1982 | Fonseca |
| 4,381,950 A | 5/1983 | Lawson |
| 4,444,058 A | 4/1984 | Ratigan |
| 4,480,696 A | 11/1984 | Almond et al. |
| 4,485,071 A | 11/1984 | Larter |
| 4,493,875 A | 1/1985 | Beck et al. |
| 4,587,739 A | 5/1986 | Holcomb |
| 4,594,170 A | 6/1986 | Brown et al. |
| 4,629,702 A | 12/1986 | Fan et al. |
| 4,640,692 A | 2/1987 | Audeh |
| 4,681,914 A | 7/1987 | Olson et al. |
| 4,708,805 A | 11/1987 | D'Muhala |
| 4,718,489 A | 1/1988 | Hallam et al. |
| 4,725,372 A | 2/1988 | Teot et al. |
| 4,735,731 A | 4/1988 | Rose et al. |
| 4,780,223 A | 10/1988 | Baranet et al. |
| 4,830,773 A | 5/1989 | Olson |
| 4,830,779 A | 5/1989 | Maeno et al. |
| 4,864,472 A | 9/1989 | Yoshimura |
| 4,882,128 A | 11/1989 | Hukvari et al. |
| 4,887,670 A | 12/1989 | Lord et al. |
| 5,031,700 A | 7/1991 | McDougall et al. |
| 5,180,556 A | 1/1993 | Nolte et al. |
| 5,193,396 A | 3/1993 | Gorski |
| 5,199,490 A | 4/1993 | Surles et al. |
| 5,203,413 A | 4/1993 | Zerhbouh |
| 5,213,705 A | 5/1993 | Olson |
| 5,224,543 A | 7/1993 | Watkins |
| 5,232,490 A | 8/1993 | Bender et al. |
| 5,251,286 A | 10/1993 | Wiener et al. |
| 5,302,297 A | 4/1994 | Barthrope |
| 5,390,529 A | 2/1995 | Ghiselli |
| 5,435,187 A | 7/1995 | Ewy |
| 5,551,516 A | 9/1996 | Norman et al. |
| 5,604,184 A | 2/1997 | Ellis et al. |
| 5,757,473 A | 5/1998 | Kanduth et al. |
| 5,759,964 A | 6/1998 | Shuchart |
| 5,869,750 A | 2/1999 | Onan |
| 5,964,295 A | 10/1999 | Brown et al. |
| 5,999,887 A | 12/1999 | Giannakopoulos et al. |
| 6,035,936 A | 3/2000 | Whalen |
| 6,076,046 A | 6/2000 | Vassudevan |
| 6,095,679 A | 8/2000 | Hammiche et al. |
| 6,131,661 A | 10/2000 | Conner et al. |
| 6,138,760 A | 10/2000 | Lopez et al. |
| 6,140,816 A | 10/2000 | Heron et al. |
| 6,143,698 A | 11/2000 | Murphey et al. |
| 6,165,295 A | 12/2000 | Wagaman |
| 6,227,295 B1 | 5/2001 | Mitchell et al. |
| 6,258,859 B1 | 7/2001 | Dahayanake et al. |
| 6,306,800 B1 | 10/2001 | Samuel et al. |
| 6,349,595 B1 | 2/2002 | Lorenzo et al. |
| 6,399,546 B1 | 6/2002 | Chang et al. |
| 6,410,489 B1 | 6/2002 | Zhang et al. |
| 6,411,902 B1 | 6/2002 | Wiltshire |
| 6,435,277 B1 | 8/2002 | Qu et al. |
| 6,468,945 B1 | 10/2002 | Zhang |
| 6,482,866 B1 | 11/2002 | Dahayanake et al. |
| 6,488,091 B1 | 12/2002 | Weaver |
| 6,491,099 B1 | 12/2002 | Di Lullo Arias et al. |
| 6,491,425 B1 | 12/2002 | Hammiche et al. |
| 6,494,263 B2 | 12/2002 | Todd |
| 6,516,080 B1 | 2/2003 | Nur |
| 6,579,572 B2 | 6/2003 | Espin et al. |
| 6,605,570 B2 | 8/2003 | Miller et al. |
| 6,609,067 B2 | 8/2003 | Tare et al. |
| 6,652,682 B1 | 11/2003 | Fawls |
| 6,694,262 B2 | 2/2004 | Rozak |
| 6,705,398 B2 | 3/2004 | Weng |
| 6,715,553 B2 | 4/2004 | Reddy et al. |
| 6,729,409 B1 | 5/2004 | Gupta et al. |
| 6,749,022 B1 | 6/2004 | Fredd |
| 6,776,235 B1 | 8/2004 | England |
| 6,831,108 B2 | 12/2004 | Dahanayake et al. |
| 6,832,158 B2 | 12/2004 | Mese |
| 6,846,420 B2 | 1/2005 | Reddy et al. |
| 6,866,048 B2 | 3/2005 | Mattox |
| 6,875,728 B2 | 4/2005 | Gupta et al. |
| 6,881,709 B2 | 4/2005 | Nelson et al. |
| 6,884,760 B1 | 4/2005 | Brand et al. |
| 6,947,843 B2 | 9/2005 | Fisher et al. |
| 6,989,391 B2 | 1/2006 | Funkhouser |
| 7,007,752 B2 | 3/2006 | Reddy et al. |
| 7,011,154 B2 | 3/2006 | Maher et al. |
| 7,044,220 B2 | 5/2006 | Nguyen et al. |
| 7,052,901 B2 | 5/2006 | Crews |
| 7,081,439 B2 | 7/2006 | Sullivan et al. |
| 7,086,484 B2 | 8/2006 | Smith |
| 7,098,663 B1 | 8/2006 | Bader |
| 7,148,185 B2 | 12/2006 | Fu et al. |
| 7,207,388 B2 | 4/2007 | Samuel et al. |
| 7,210,528 B1 | 5/2007 | Brannon et al. |
| 7,216,709 B2 | 5/2007 | McElfresh et al. |
| 7,255,169 B2 | 8/2007 | Van Batenburg et al. |
| 7,261,158 B2 | 8/2007 | Middaugh et al. |
| 7,281,580 B2 | 10/2007 | Parker et al. |
| 7,281,581 B2 | 10/2007 | Nyuyen et al. |
| 7,291,651 B2 | 11/2007 | Chen et al. |
| 7,299,874 B2 | 11/2007 | Welton |
| 7,326,670 B2 | 2/2008 | DiLullo et al. |
| 7,334,635 B2 | 2/2008 | Nguyen |
| 7,334,636 B2 | 2/2008 | Nguyen |
| 7,341,980 B2 | 3/2008 | Lee et al. |
| 7,344,889 B2 | 3/2008 | Kelemen et al. |
| 7,369,980 B2 | 5/2008 | Deffenbaugh et al. |
| 7,373,977 B1 | 5/2008 | Berger et al. |
| 7,387,987 B2 | 6/2008 | Chen et al. |
| 7,424,911 B2 | 9/2008 | McCarthy et al. |
| 7,451,812 B2 | 11/2008 | Cooper et al. |
| 7,472,748 B2 | 1/2009 | Gdanski et al. |
| 7,472,751 B2 | 1/2009 | Brannon et al. |
| 7,491,444 B2 | 2/2009 | Smith et al. |
| 7,500,517 B2 | 3/2009 | Looney et al. |
| 7,513,306 B2 | 4/2009 | Pfefferle et al. |
| 7,521,400 B2 | 4/2009 | Samuel |
| 7,526,418 B2 | 4/2009 | Pita et al. |
| 7,527,097 B2 | 5/2009 | Patel |
| 7,544,643 B2 | 6/2009 | Huang |
| 7,565,831 B2 | 7/2009 | Miyahara |
| 7,571,767 B2 | 8/2009 | Parker et al. |
| 7,581,590 B2 | 9/2009 | Lesko et al. |
| 7,588,085 B2 | 9/2009 | Acock et al. |
| 7,595,284 B2 | 9/2009 | Crews |
| 7,615,517 B2 | 11/2009 | Huang et al. |
| 7,621,173 B2 | 11/2009 | Hsu |
| 7,642,223 B2 | 1/2010 | Santra et al. |
| 7,645,724 B2 | 1/2010 | Crews |
| 7,645,883 B1 | 1/2010 | Hawkins et al. |
| 7,654,159 B2 | 2/2010 | Enoksson |
| 7,655,603 B2 | 2/2010 | Crews |
| 7,678,723 B2 | 3/2010 | Duenckel et al. |
| 7,703,531 B2 | 4/2010 | Huang |
| 7,770,647 B2 | 8/2010 | Watson et al. |
| 7,771,549 B1 | 8/2010 | Christe et al. |
| 7,789,164 B2 | 9/2010 | Looney et al. |
| 7,803,740 B2 | 9/2010 | Bicerano et al. |

(56) References Cited

U.S. PATENT DOCUMENTS

| | | |
|---|---|---|
| 7,803,744 B2 | 9/2010 | Chen et al. |
| 7,823,656 B1 | 11/2010 | Williams et al. |
| 7,825,053 B2 | 11/2010 | Duenckel et al. |
| 7,857,055 B2 | 12/2010 | Li |
| 7,867,613 B2 | 1/2011 | Smith et al. |
| 7,878,246 B2 | 2/2011 | Samuel et al. |
| 7,878,248 B2 | 2/2011 | Abad et al. |
| 7,887,918 B2 | 2/2011 | Smith et al. |
| 7,918,277 B2 | 4/2011 | Brannon et al. |
| 7,921,911 B2 | 4/2011 | Fuller et al. |
| 7,983,845 B2 | 7/2011 | Minh |
| 7,997,342 B2 | 8/2011 | Welton et al. |
| 8,003,212 B2 | 8/2011 | Smith et al. |
| 8,003,577 B2 | 8/2011 | Li et al. |
| 8,006,760 B2 | 8/2011 | Fleming et al. |
| 8,047,288 B2 | 11/2011 | Skala et al. |
| 8,061,424 B2 | 11/2011 | Willberg et al. |
| 8,066,068 B2 | 11/2011 | Lesko et al. |
| 8,081,802 B2 | 12/2011 | Dvorkin et al. |
| 8,104,536 B2 | 1/2012 | Looney et al. |
| 8,119,576 B2 | 2/2012 | Reyes et al. |
| 8,127,850 B2 | 3/2012 | Brannon et al. |
| 8,146,416 B2 | 4/2012 | Pisio et al. |
| 8,165,817 B2 | 4/2012 | Betancourt et al. |
| 8,177,422 B2 | 5/2012 | Kjoller et al. |
| 8,205,675 B2 | 6/2012 | Brannon et al. |
| 8,216,675 B2 | 7/2012 | Palamara et al. |
| 8,225,866 B2 | 7/2012 | Rouffignac et al. |
| 8,278,931 B2 | 10/2012 | Fang et al. |
| 8,352,228 B2 | 1/2013 | Walters et al. |
| 8,380,437 B2 | 2/2013 | Abousleiman et al. |
| 8,408,305 B2 | 4/2013 | Brannon et al. |
| 8,473,213 B2 | 6/2013 | Zhu et al. |
| 8,490,700 B2 | 7/2013 | Lesko et al. |
| 8,606,524 B2 | 12/2013 | Soliman et al. |
| 8,614,157 B2 | 12/2013 | Pope et al. |
| 8,614,573 B2 | 12/2013 | Minh |
| 8,616,294 B2 | 12/2013 | Zubrin et al. |
| 8,636,065 B2 | 1/2014 | Lesko et al. |
| 8,653,011 B2 | 2/2014 | Samuel et al. |
| 8,701,788 B2 | 4/2014 | Wigand et al. |
| 8,729,903 B2 | 5/2014 | Srnka et al. |
| 8,731,889 B2 | 5/2014 | Du et al. |
| 8,757,259 B2 | 6/2014 | Lesko et al. |
| 8,763,699 B2 | 7/2014 | Medvedev et al. |
| 8,763,703 B2 | 7/2014 | Saini et al. |
| 8,778,852 B2 | 7/2014 | Huang |
| 8,796,187 B2 | 8/2014 | Reyes et al. |
| 8,821,806 B2 | 9/2014 | Hersherwitz et al. |
| 8,822,386 B2 | 9/2014 | Quintero et al. |
| 8,835,363 B2 | 9/2014 | Amanullah et al. |
| 8,839,860 B2 | 9/2014 | Wigand et al. |
| 8,844,366 B2 | 9/2014 | Warren |
| 8,851,177 B2 | 10/2014 | Wigand |
| 8,865,482 B2 | 10/2014 | Wang et al. |
| 8,868,385 B2 | 10/2014 | Fertig et al. |
| 8,883,693 B2 | 11/2014 | Eldred et al. |
| 8,936,083 B2 | 1/2015 | Nguyen |
| 8,936,089 B2 | 1/2015 | Wigand |
| 8,967,249 B2 | 3/2015 | Akkurt et al. |
| 9,006,151 B2 | 4/2015 | Amanullah et al. |
| 9,006,153 B2 | 4/2015 | Lin et al. |
| 9,033,033 B2 | 5/2015 | Thomas et al. |
| 9,033,043 B2 | 5/2015 | Hinkel |
| 9,046,509 B2 | 6/2015 | Dvorkin et al. |
| 9,057,797 B2 | 6/2015 | Omeragic et al. |
| 9,080,440 B2 | 7/2015 | Panga et al. |
| 9,085,727 B2 | 7/2015 | Litvinets et al. |
| 9,097,818 B2 | 8/2015 | Hursan |
| 9,128,210 B2 | 9/2015 | Pomerantz |
| 9,133,398 B2 | 9/2015 | Wigand et al. |
| 9,152,745 B2 | 10/2015 | Glinsky |
| 9,297,244 B2 | 3/2016 | Mahoney et al. |
| 9,523,268 B2 | 12/2016 | Potapenko et al. |
| 9,644,137 B2 | 5/2017 | Dean et al. |
| 9,664,018 B2 | 5/2017 | Vandeponseele et al. |
| 9,670,764 B2 | 6/2017 | Lesko et al. |
| 9,688,904 B2 | 6/2017 | Wang et al. |
| 9,696,270 B1 | 7/2017 | Roy et al. |
| 9,725,645 B2 | 8/2017 | Monastiriotis et al. |
| 9,753,016 B1 | 9/2017 | Daugela |
| 9,784,882 B2 | 10/2017 | Vinegar et al. |
| 9,816,365 B2 | 11/2017 | Nguyen et al. |
| 9,834,721 B2 | 12/2017 | Chang et al. |
| 9,845,670 B2 | 12/2017 | Surjaatmadja et al. |
| 9,863,211 B2 | 1/2018 | Gamage et al. |
| 9,863,230 B2 | 1/2018 | Litvinets et al. |
| 9,863,231 B2 | 1/2018 | Hull et al. |
| 9,869,649 B2 | 1/2018 | Hull et al. |
| 9,885,691 B1 | 2/2018 | Daugela |
| 9,895,670 B2 | 2/2018 | Anders et al. |
| 9,896,919 B1 | 2/2018 | Chen |
| 9,902,898 B2 | 2/2018 | Nelson et al. |
| 9,909,404 B2 | 3/2018 | Hwang et al. |
| 9,927,344 B2 | 3/2018 | Chertov |
| 9,945,220 B2 | 4/2018 | Saini et al. |
| 9,995,125 B2 | 6/2018 | Madasu et al. |
| 9,995,220 B2 | 6/2018 | Hawie et al. |
| 10,001,769 B2 | 6/2018 | Huang et al. |
| 10,023,782 B2 | 7/2018 | Wang et al. |
| 10,030,495 B2 | 7/2018 | Litvinets et al. |
| 10,047,281 B2 | 8/2018 | Nguyen et al. |
| 10,066,149 B2 | 9/2018 | Li et al. |
| 10,077,396 B2 | 9/2018 | Nguyen et al. |
| 10,087,364 B2 | 10/2018 | Kaufman et al. |
| 10,113,396 B2 | 10/2018 | Nelson et al. |
| 10,151,715 B2 | 12/2018 | Hull et al. |
| 10,273,398 B2 | 4/2019 | Liu et al. |
| 10,329,478 B2 | 6/2019 | Schnoor et al. |
| 10,345,764 B2 | 7/2019 | Early et al. |
| 10,351,758 B2 | 7/2019 | Hull et al. |
| 10,379,068 B2 | 8/2019 | Hull et al. |
| 10,415,367 B2 | 9/2019 | Galford |
| 10,421,897 B2 | 9/2019 | Skiba et al. |
| 10,472,555 B2 | 11/2019 | Hutchins et al. |
| 10,479,927 B2 | 11/2019 | Hull et al. |
| 10,550,314 B2 | 2/2020 | Liang et al. |
| 10,611,967 B2 | 4/2020 | Inan |
| 10,781,360 B2 | 9/2020 | Hull et al. |
| 10,871,061 B2 * | 12/2020 | Hull ............... C08L 33/26 |
| 2002/0003115 A1 | 1/2002 | Conaway et al. |
| 2003/0209248 A1 | 11/2003 | Ward |
| 2003/0212465 A1 | 11/2003 | Howard et al. |
| 2004/0101457 A1 | 5/2004 | Pahlman et al. |
| 2004/0211567 A1 | 10/2004 | Aud |
| 2005/0059558 A1 | 3/2005 | Blauch |
| 2005/0060130 A1 | 3/2005 | Shapiro et al. |
| 2005/0103118 A1 | 5/2005 | Workman |
| 2005/0274523 A1 | 12/2005 | Brannon et al. |
| 2006/0047489 A1 | 3/2006 | Scheidt et al. |
| 2006/0084579 A1 | 4/2006 | Berger et al. |
| 2006/0092766 A1 | 5/2006 | Shelley et al. |
| 2006/0265204 A1 | 11/2006 | Wallis et al. |
| 2007/0054054 A1 | 3/2007 | Svoboda et al. |
| 2007/0087940 A1 | 4/2007 | Qu et al. |
| 2007/0203677 A1 | 8/2007 | Awwiller |
| 2007/0235181 A1 | 10/2007 | Lecampion et al. |
| 2007/0298979 A1 | 12/2007 | Perry et al. |
| 2008/0006410 A1 * | 1/2008 | Looney .............. C09K 8/594 |
| | | 166/308.4 |
| 2008/0059140 A1 | 3/2008 | Salmon et al. |
| 2008/0070806 A1 | 3/2008 | Lin et al. |
| 2008/0081771 A1 | 4/2008 | Lin et al. |
| 2008/0093073 A1 | 4/2008 | Bustos et al. |
| 2008/0234147 A1 | 9/2008 | Li et al. |
| 2009/0032252 A1 | 2/2009 | Boney et al. |
| 2009/0044945 A1 | 2/2009 | Wilberg et al. |
| 2009/0071239 A1 | 3/2009 | Rojas et al. |
| 2009/0087912 A1 | 4/2009 | Ramos et al. |
| 2009/0143252 A1 | 6/2009 | Lehmann |
| 2009/0145607 A1 | 6/2009 | Li et al. |
| 2009/0193881 A1 | 8/2009 | Finnberg |
| 2009/0203557 A1 | 8/2009 | Barnes et al. |
| 2009/0242196 A1 | 10/2009 | Pao |

(56) References Cited

U.S. PATENT DOCUMENTS

| | | |
|---|---|---|
| 2009/0248309 A1 | 10/2009 | Nelville et al. |
| 2009/0253595 A1 | 10/2009 | Qu |
| 2009/0283257 A1 | 11/2009 | Becker |
| 2009/0313772 A1 | 12/2009 | Talley |
| 2010/0010106 A1 | 1/2010 | Crews |
| 2010/0049625 A1 | 2/2010 | Biebesheimer et al. |
| 2010/0051511 A1 | 3/2010 | Faerman |
| 2010/0121623 A1 | 5/2010 | Yogeswaren |
| 2010/0128982 A1 | 5/2010 | Dvorkin et al. |
| 2010/0186520 A1 | 7/2010 | Wheeler |
| 2010/0213579 A1 | 8/2010 | Henry |
| 2010/0224365 A1 | 9/2010 | Abad |
| 2010/0243242 A1 | 9/2010 | Boney et al. |
| 2010/0258265 A1 | 10/2010 | Karanikas et al. |
| 2010/0263867 A1 | 10/2010 | Horton et al. |
| 2010/0276142 A1 | 11/2010 | Skildum et al. |
| 2010/0279136 A1 | 11/2010 | Bonucci |
| 2010/0294500 A1* | 11/2010 | Lesko ............. C09K 8/805 166/308.2 |
| 2010/0323933 A1 | 12/2010 | Fuller et al. |
| 2011/0065612 A1 | 3/2011 | Stokes et al. |
| 2011/0105369 A1 | 5/2011 | Reddy |
| 2011/0257944 A1 | 10/2011 | Du et al. |
| 2011/0259588 A1 | 10/2011 | Ali |
| 2012/0018159 A1 | 1/2012 | Guha et al. |
| 2012/0026037 A1 | 2/2012 | Thomson et al. |
| 2012/0085534 A1 | 4/2012 | MorVan et al. |
| 2012/0129737 A1 | 5/2012 | Lesko et al. |
| 2012/0160486 A1* | 6/2012 | Wigan ............... C10G 9/00 166/279 |
| 2012/0179444 A1 | 7/2012 | Ganguly et al. |
| 2012/0193578 A1 | 8/2012 | Pan et al. |
| 2012/0247774 A1 | 10/2012 | Li et al. |
| 2012/0261129 A1 | 10/2012 | Becker |
| 2012/0261617 A1 | 10/2012 | Pan et al. |
| 2012/0267102 A1 | 10/2012 | Huang et al. |
| 2012/0305247 A1 | 12/2012 | Chen et al. |
| 2012/0318498 A1 | 12/2012 | Parsche |
| 2013/0013209 A1 | 1/2013 | Zhu et al. |
| 2013/0056213 A1 | 3/2013 | Medvedev et al. |
| 2013/0084643 A1 | 4/2013 | Commarieu et al. |
| 2013/0090270 A1 | 4/2013 | Crews et al. |
| 2013/0137610 A1 | 5/2013 | Huang et al. |
| 2013/0160994 A1 | 6/2013 | Alsop et al. |
| 2013/0161002 A1 | 6/2013 | Wigand |
| 2013/0161003 A1 | 6/2013 | Mikhailovich et al. |
| 2013/0213120 A1 | 8/2013 | Lebedev |
| 2013/0213638 A1 | 8/2013 | Keller |
| 2013/0228019 A1 | 9/2013 | Meadows |
| 2013/0231908 A1 | 9/2013 | Williams et al. |
| 2013/0233536 A1 | 9/2013 | Alqam |
| 2013/0238304 A1 | 9/2013 | Glinsky |
| 2013/0269933 A1 | 10/2013 | Pomerantz et al. |
| 2013/0274149 A1 | 10/2013 | Lafitte et al. |
| 2013/0275099 A1 | 10/2013 | Frydman |
| 2013/0306321 A1 | 11/2013 | Lanctot-Downs et al. |
| 2013/0341028 A1 | 12/2013 | Christian et al. |
| 2014/0008305 A1 | 1/2014 | Nichols et al. |
| 2014/0027109 A1 | 1/2014 | Al-Baraik |
| 2014/0045732 A1 | 2/2014 | Mazyar |
| 2014/0048694 A1 | 2/2014 | Pomerantz |
| 2014/0090850 A1 | 4/2014 | Benicewicz |
| 2014/0096964 A1 | 4/2014 | Chakraborty et al. |
| 2014/0116710 A1 | 5/2014 | Naser-El-Din et al. |
| 2014/0221257 A1 | 8/2014 | Roddy |
| 2014/0231077 A1 | 8/2014 | Rivero et al. |
| 2014/0243246 A1 | 8/2014 | Hendrickson |
| 2014/0247997 A1 | 9/2014 | Nishyama |
| 2014/0251605 A1 | 9/2014 | Hera |
| 2014/0260694 A1 | 9/2014 | Szlendak |
| 2014/0364343 A1 | 12/2014 | Nelson et al. |
| 2014/0367100 A1 | 12/2014 | Oliveria et al. |
| 2014/0374104 A1 | 12/2014 | Kushal |
| 2015/0019183 A1 | 1/2015 | Suzuki |
| 2015/0041136 A1 | 2/2015 | Martin |
| 2015/0055438 A1 | 2/2015 | Yan et al. |
| 2015/0057097 A1 | 2/2015 | Cho |
| 2015/0057196 A1 | 2/2015 | Debord |
| 2015/0065398 A1 | 3/2015 | Gartland et al. |
| 2015/0071750 A1 | 3/2015 | Foster |
| 2015/0072902 A1 | 3/2015 | Lafitte et al. |
| 2015/0075782 A1 | 3/2015 | Sharma |
| 2015/0083405 A1 | 3/2015 | Dobroskok |
| 2015/0152724 A1 | 6/2015 | Amendt |
| 2015/0167440 A1 | 6/2015 | Kasevich |
| 2015/0192005 A1 | 7/2015 | Saeedfar |
| 2015/0259593 A1 | 9/2015 | Kaufman et al. |
| 2015/0284625 A1 | 10/2015 | Silveira |
| 2015/0293256 A1 | 10/2015 | Dusterhoft |
| 2015/0300140 A1 | 10/2015 | Eoff et al. |
| 2015/0322759 A1 | 11/2015 | Okoniewski |
| 2015/0368541 A1 | 12/2015 | Monclin et al. |
| 2016/0017202 A1 | 1/2016 | Yang et al. |
| 2016/0061017 A1 | 3/2016 | Nguyen et al. |
| 2016/0103047 A1 | 4/2016 | Liu |
| 2016/0103049 A1 | 4/2016 | Liu |
| 2016/0130496 A1 | 5/2016 | Holtsclaw et al. |
| 2016/0137904 A1 | 5/2016 | Drake |
| 2016/0153273 A1* | 6/2016 | Nguyen .............. C09K 8/88 166/280.1 |
| 2016/0177674 A1 | 6/2016 | Shetty et al. |
| 2016/0203239 A1 | 7/2016 | Samuel et al. |
| 2016/0208591 A1 | 7/2016 | Weaver et al. |
| 2016/0215202 A1 | 7/2016 | Weaver et al. |
| 2016/0215205 A1 | 7/2016 | Nguyen |
| 2016/0237338 A1* | 8/2016 | Bianchi ............... E21B 43/25 |
| 2016/0256583 A1 | 9/2016 | Yamada |
| 2016/0265331 A1 | 9/2016 | Weng et al. |
| 2016/0289543 A1 | 10/2016 | Chang et al. |
| 2016/0362965 A1 | 12/2016 | Parlar et al. |
| 2017/0015895 A1 | 1/2017 | Cox |
| 2017/0051598 A1 | 2/2017 | Ouenes |
| 2017/0066959 A1 | 3/2017 | Hull et al. |
| 2017/0066962 A1 | 3/2017 | Ravi et al. |
| 2017/0067836 A1 | 3/2017 | Hull et al. |
| 2017/0137703 A1 | 5/2017 | Leverson et al. |
| 2017/0145303 A1 | 5/2017 | Fontenelle et al. |
| 2017/0145793 A1 | 5/2017 | Ouenes |
| 2017/0176639 A1 | 6/2017 | Mosse et al. |
| 2017/0198207 A1 | 7/2017 | Li et al. |
| 2017/0247997 A1 | 8/2017 | Kovalevsky |
| 2017/0248011 A1 | 8/2017 | Craddock et al. |
| 2017/0275525 A1 | 9/2017 | Koep et al. |
| 2017/0235181 A1 | 10/2017 | Lecampion et al. |
| 2017/0328179 A1 | 11/2017 | Dykatra et al. |
| 2017/0336528 A1 | 11/2017 | Badri et al. |
| 2017/0370197 A1 | 12/2017 | Han et al. |
| 2018/0112126 A1 | 4/2018 | Yang et al. |
| 2018/0155602 A1 | 6/2018 | Zhang |
| 2018/0155615 A1 | 6/2018 | Rahy et al. |
| 2018/0195982 A1 | 7/2018 | Hull et al. |
| 2018/0305208 A1 | 10/2018 | Mason |
| 2018/0321416 A1 | 11/2018 | Freedman |
| 2018/0355707 A1 | 12/2018 | Herrera et al. |
| 2019/0010795 A1 | 1/2019 | Cascio et al. |
| 2019/0017203 A1 | 1/2019 | Andoh et al. |
| 2019/0078424 A1 | 3/2019 | Copeland et al. |
| 2019/0112912 A1 | 4/2019 | Thompson et al. |
| 2019/0211658 A1 | 7/2019 | Hull et al. |
| 2019/0292436 A1 | 9/2019 | Mason et al. |
| 2019/0345377 A1 | 11/2019 | Haque et al. |
| 2020/0048531 A1 | 2/2020 | Hull et al. |
| 2021/0024808 A1 | 1/2021 | Schipper et al. |

FOREIGN PATENT DOCUMENTS

| | | |
|---|---|---|
| CN | 101819111 | 12/2011 |
| CN | 1621803 | 5/2012 |
| CN | 103387827 | 11/2013 |
| CN | 102183410 | 5/2014 |
| CN | 104727799 | 6/2015 |
| CN | 105445440 | 3/2016 |
| EP | 0247669 | 12/1987 |
| EP | 0460927 | 12/1991 |

(56) References Cited

FOREIGN PATENT DOCUMENTS

| | | |
|---|---|---|
| EP | 02480625 | 4/2013 |
| EP | 02480626 | 4/2013 |
| GB | 2161269 | 8/1988 |
| GB | 2332223 | 6/1999 |
| WO | WO 1997028098 | 8/1997 |
| WO | WO 2000060379 | 10/2000 |
| WO | WO 2001094749 | 12/2001 |
| WO | WO 2002064702 | 8/2002 |
| WO | WO 2004005435 | 1/2004 |
| WO | WO 2008001218 | 1/2008 |
| WO | WO 2008035253 | 3/2008 |
| WO | WO 2010138914 | 12/2010 |
| WO | WO 2011035292 | 3/2011 |
| WO | WO 2011035294 | 3/2011 |
| WO | WO 2012051647 | 4/2012 |
| WO | WO 2012057910 | 5/2012 |
| WO | WO 2012087887 | 6/2012 |
| WO | WO 2012087898 | 6/2012 |
| WO | WO 2012088476 | 6/2012 |
| WO | WO 2012104582 | 8/2012 |
| WO | WO 2012122505 | 9/2012 |
| WO | WO 2012171857 | 12/2012 |
| WO | WO 2013052359 | 4/2013 |
| WO | WO 2013112114 | 8/2013 |
| WO | WO 2013149122 | 10/2013 |
| WO | WO 2013154926 | 10/2013 |
| WO | WO 2013155061 | 10/2013 |
| WO | WO 2014008496 | 1/2014 |
| WO | WO 2014008598 | 1/2014 |
| WO | WO 2014116305 | 7/2014 |
| WO | WO 2014123672 | 8/2014 |
| WO | WO 2014178504 | 11/2014 |
| WO | WO 2015041664 | 3/2015 |
| WO | WO 2015041669 | 3/2015 |
| WO | WO 2015071750 | 5/2015 |
| WO | WO 2015097116 | 7/2015 |
| WO | WO 2015126082 | 8/2015 |
| WO | WO 2015163858 | 10/2015 |
| WO | WO 2015181028 | 12/2015 |
| WO | WO 2015200060 | 12/2015 |
| WO | WO 2016089813 | 6/2016 |
| WO | WO 2016094153 | 6/2016 |
| WO | WO 2017035371 | 3/2017 |
| WO | WO 2017040824 | 3/2017 |
| WO | WO 2017040834 | 3/2017 |
| WO | WO 2017065331 | 4/2017 |
| WO | WO 2017078674 | 5/2017 |
| WO | WO 2017086975 | 5/2017 |
| WO | WO 2017106513 | 6/2017 |
| WO | WO 2017136641 | 8/2017 |
| WO | WO 2017161157 | 9/2017 |
| WO | WO 2018025010 | 2/2018 |
| WO | WO 2018045290 | 3/2018 |
| WO | WO 2018118024 | 6/2018 |
| WO | WO 2018170065 | 9/2018 |
| WO | WO 2019140058 | 7/2019 |

OTHER PUBLICATIONS

Abad et al., "Evaluation of the Material Properties of the Multilayered Oxides formed on HCM12A using New and Novel Techmques," Manuscript Draft, Manuscript No. OXID-D-15-00019, 2015, 44 pages.

Abass et al., "Wellbore Instability of Shale Formation, Zuluf Field, Saudi Arabia," Society of Petroleum Engineers (SPE), presented at the SPE Technical Symposium on Saudi Arabia Section, Dhahran, Saudi Arabia, May 21-23, 2006, 10 pages.

Abousleiman et al, "A Micromechanically Consistent Poroviscoelasticity Theory for Rock Mechanics Applications," Int. J. Rock Mech. Min. Sci. & Geomech. Abstr., 1993, 30:7 (1177-1180), 4 pages.

Abousleiman et al, "Anisotropic Porothermoelastic Solution and Hydro-Thermal Effects on Fracture Width in Hydraulic Fracturing," International Journal for Numerical and Analytical Methods in Geomechanics, 2013, 25 pages.

Abousleiman et al, "Geomechanics Field and Laboratory Characterization of Woodford Shale: The Next Gas Play," SPE 110120, Society of Petroleum Engineers (SPE), presented at the 2007 SPE Annual Technical Conference and Exhibition on Nov. 11-14, 2007, 14 pages.

Abousleiman et al, "Poroviscoelastic Analysis of Borehole and Cylinder Problems," ACTA Mechanica, 1996, 119: 199-219, 21 pages.

Abousleiman et al, "The Granular and Polymer Nature of Kerogen Rich Shale," Acta Geotechnica 2016, 11:3 (573-594), 24 pages.

Abousleiman et al., "GeoGenome Industry Consortium (G2IC)," JIP, 2004-2006, 6 pages.

Abousleiman et al., "GeoMechanics Field Characterization of the Two Prolific U.S. Mid-West Gas Plays with Advanced Wire-Line Logging Tools," SPE 124428, Society of Petroleum Engineers (SPE), presented at the 2009 SPE Annual Technical Conference and Exhibition, Oct. 4-7, 2009, 19 pages.

Abousleiman et al., "Geomechanics Field Characterization of Woodford Shale and Barnett Shale with Advanced Logging Tools and Nano-indentation on Drill Cuttings," The Leading Edge, Special Section: Borehole Geophysics, Jun. 2010, 6 pages.

Abousleiman et al., "Mandel's Problem Revisited," Geotechnique, 1996, 46:2 (187-195), 9 pages.

Abousleiman et al., "Mechanical Characterization of Small Shale Samples subjected to Fluid Exposure using the Inclined Direct Shear Testing Device," International Journal of Rock Mechanics and Mining Sciences, 2010, 47:3 (355-367), 13 pages.

Abousleiman et al., "Modeling Real-Time Wellbore Stability within the Theory of Poromechanics," AADE-03-NTCE-11, American Association of Drilling Engineers (AADE), presented at the AADE 2003 National Technology Conference, Practical Solutions for Drilling Challenges, Texas, Apr. 1-3, 2003, 14 pages.

Abousleiman et al., "Poroelastic Solutions in Transversely Isotropic Media for Wellbore and Cylinder," Int. J. Solids Structures, 1998, 35:34-35 (4905-4929), 25 pages.

Abousleiman et al., "Time-Dependent wellbore (in)stability predictions: theory and case study," IADC/SPE 62796, International Association of Drilling Contractors (IADC), Society of Petroleum Engineers (SPE), presented at the 2000 IADC/SPE Asia Pacific Drilling Technology held in Kuala Lumur, Malaysia, Sep. 11-13, 2000, 8 pages.

Agenet et al., "Fluorescent Nanobeads: a First Step Toward Intelligent Water Tracers," SPE 157019, Society of Petroleum Engineers (SPE), SPE International Oilfield Nanotechnology Conference, Jun. 12-14, 2012, 13 pages.

Agilent Technologies, "Field-Deployable Solution for Nanoporosity Measurements in Mud Logging Operations and a Novel Method for Fracability Analysis Using Mud Cuttings," Gulf Coast Conference, Agilent Restricted, Oct. 2013, 44 pages.

Ahmed et al. "7.2.2 Information Required to Move to a Pilot Project," Unconventional Resources Exploitation and Development, 2016, 1 page.

Al-Ghamdi et al., "Impact of Acid Additives on the Rheological Properties of Viscoelastic Surfactants and Their Influence on Field Application" SPE-89418-MS, Society of Petroleum Engineers, Presented at the SPE/DOE Symposium on Improved Oil Recovery, Tulsa, Apr. 17-21, 2004, 13 pages.

Allan et al., "A Multiscale Methodology for the Analysis of Velocity Anisotropy in Organic-Rich Shale," Geophysics, Jul.-Aug. 2015, 80:4 (C73-C88), 16 pages.

Alleman et al., "The Development and Successful Field Use of Viscoelastic Surfactant-based Diverting Agents for Acid Stimulation" SPE-80222-MS, Society of Petroleum Engineers, Presented at the International Symposium on Oilfield Chemistry, Houston, Feb. 5-7, 2004, 10 pages.

Al-Muntasheri, "A Critical Review of Hydraulic-Fracturing Fluids for Moderate- to Ultralow-Permeability Formations Over the Last Decade," SPE-169552-PA, Society of Petroleum Engineers, SPE Prod & Oper Nov. 29, 2014, (4):243-260, 18 pages.

Al-Muntasheri, "A Critical Review of Hydraulic Fracturing Fluids over the Last Decade," SPE 169552, Society of Petroleum Engi-

(56) References Cited

OTHER PUBLICATIONS neers (SPE), presented at the SPE Western North American and Rocky Mountain Joint Regional Meeting, Apr. 16-18, 2014, 25 pages.
Altowairqi, "Shale elastic property relationships as a function of total organic carbon content using synthetic samples," Journal of Petroleum Science and Engineering, Sep. 2015, 133: 392-400, 9 pages.
Al-Yami et al., "Engineered Fit-for-Purpose Cement System to Withstand Life-of-the-Well Pressure and Temperature Cycling," SPE-188488-MS, Society of Petroleum Engineers (SPE), presented at the Abu Dhabi International Petroleum Exhibition & Conference, Nov. 2017, 14 pages.
Ananthan et al., "Influence of Strain Softening on the Fracture of Plain Concrete Beams," International Journal of Fracture, 1990, 45: 195-219, 25 pages.
Anisimov, "The Use of Tracers for Reservoir Characterization," SPE 118862, Society of Petroleum Engineers (SPE), presented at SPE Middle East Oil and Gas Show and Conference, Mar. 15-18, 2009, 8 pages.
Arias et al., "New Viscoelastic Surfactant Fracturing Fluids Now Compatible with CO2 Drastically Improve Gas Production in Rockies," SPE-111431-MS, Presented at the SPE International Symposium and Exhibition on Formation Damage Control, Lafayette, Louisiana, Feb. 13-15, 2008, 5 pages.
Arns et al., "Computation of linear elastic properties from microtomographic images: Methodology and agreement between theory and experiment," Geophysics, Sep. 1, 2002, 67:5 (1396-1405), 10 pages.
Aslan et al., "Fluorescent Core—Shell AG@SiO$_2$ Nanocomposites for Metal-Enhanced Fluorescence and Single Nanoparticle Sensing Platforms," American Chemical Society (ACS), J. Am. Chem. Soc., JACS Communications, Jan. 19, 2007, 129: 1524-1525, 2 pages.
Atarita et al., "Predicting Distribution of Total Organic Carbon (TOC) and S2 with Δ Log Resistivity and Acoustic Impedance Inversion on Talang Akar Formation, Cipunegara Sub Basin, West Java," Procedia Engineering, 2017, 170: 390-397, 8 pages.
Ballice, "Solvent Swelling Studies of Goynuk (Kerogen Type-I) and Beypazari Oil Shales (Kerogen Type-II)," Science Direct, 2003, Fuel 82: 1317-1321, 5 pages.
Bandyopadhyay et al., "Effect of Silica Colloids on the Rheology of Viscoelastic Gels Formed by the Surfactant Cetyl Trimethylammonium Tosylate," J. Colloid Interf. Sci., 2005, 283(2):585-591, 7 pages.
Barati and Liang, "A Review of Fracturing Fluid Systems Used for Hydraulic Fracturing of Oil and Gas Wells," Journal of Applied Polymer Science, Aug. 15, 2014, 131:16, 11 pages.
Barenblatt et al., "Basic Concepts in the Theory of Seepage of Homogeneous Liquids in Fissured Rocks (Strata)," PMM 1960, 24:5 (852-864), 18 pages.
Bazant et al., "Deformation of Progressively Cracking Reinforced Concrete Beams," ACI Materials Journal, Technical Paper, Title No. 81-26, May-Jun. 1984, 81:3, 11 pages.
Bazant et al., "Size Effect in Brazilian Split-Cylinder Tests: Measurements and Fracture Analysis," ACI Materials Journal, Technical Paper, Title No. 88-M40, May 31, 1991, 88:3 (325-332), 8 pages.
Bazant et al., "Strain-Softening Bar and Beam: Exact Non-Local Solution," Int. J. Solids Structures, 1988, 24:7 (659-673), 15 pages.
Bennett et al., "Instrumented Nanoindentation and 3D Mechanistic Modeling of a Shale at Multiple Scales," Acta Geotechnica, 10:21, Jan. 9, 2015, 14 pages.
Berger et al., "Effect of eccentricity, voids, cement channels, and pore pressure decline on collapse resistance of casing," SPE-90045-MS, Society of Petroleum Engineers (SPE), presented at the SPE Annual Technical Conference and Exhibition, Jan. 2004, 8 pages.
Bernheim-Groswasser et al., "Micellar Growth, Network Formation, and Criticality in Aqueous Solutions of the Nonionic Surfactant C12E5," Langmuir, Apr. 2000, 16(9):4131-4140, 10 pages.

Berryman, "Extension of Poroelastic Analysis to Double-Porosity Materials: New Technique in Microgeomechanics," Journal of Engineering Mechanics, 128:8 (840), Aug. 2002, 8 pages.
Bhandari et al., "Two-Dimensional DEM Analysis of Behavior of Geogrid-Reinforced Uniform Granular Bases under a Vertical Cyclic Load," Acta Geotechnica, Research Paper, 2015, 10: 469-480, 12 pages.
Biot et al., "Temperature analysis in hydraulic fracturing," Journal of Petroleum Technology, 39:11, Nov. 1987, 9 pages.
Biot, "General Theory of Three-Dimensional Consolidation," the Ernest Kempton Adams Fund for Physical Research of Columbia University, Reprint Series, Journal of Applied Physics, 12:2 (155-164), Feb. 1941, 11 pages.
Bisnovat et al., "Mechanical and petrophysical behavior of organic-rich chalk from the Judea Plains, Israel," Marine and Petroleum Geology, 64: 152-164, Jun. 2015, 13 pages.
Blanz et al., "Nuclear Magnetic Resonance Logging While Drilling (NMR-LWD): From an Experiment to a Day-to-Day Service for the Oil Industry," Diffusion Fundamentals, 2010, 14(2), 5 pages.
Bobko et al., "The Nanogranular Origin of Friction and Cohesion in Shale—A Strength Homogenization Approach to Interpretation of Nanoindentation Results," International Journal For Numerical and Analytical Methods in Geomechanics, 2010, 23 pages.
Boskey et al., "Perspective—Collagen and Bone Strength," Journal of Bone and Mineral Research, 14:3, Nov. 3, 1999, 6 pages.
Bourbie and Zinszner, "Hydraulic and Acoustic Properties as a Function of Porosity in Fontainebleau Sandstone," Journal of Geophysical Research, 90(B13):11,524-11,532, Nov. 1985, 9 pages.
Bratton et al., "The Nature of Naturally Fractured Reservoirs," Oilfield Review, Jun. 2006, 21 pages.
Brochard et al., "Fracture Properties of Kerogen and Importance for Organic-Rich Shales," Annual World Conference on Carbon (Carbon 2013), Jul. 2013, 5 pages.
Brown et al., "Use of a Viscoelastic Carrier Fluid in Frack-Pack Applications," SPE-31114-MS, Society of Petroleum Engineers, Presented at the SPE Formation Damage Control Symposium, Lafayette, Louisiana, Feb. 14-15, 1996, 10 pages.
Bunzil et al., "Taking Advantage of Luminescent Lanthanide Ions," Chemical Society Reviews (CSR), Critical Review, 34: 1048-1077, Dec. 2005, 30 pages.
Bustos et al., "Case Study: Application of a Viscoelastic Surfactant-Based CO2 Compatible Fracturing Fluid in the Frontier Formation, Big Horn Basin, Wyoming," SPE-107966-MS, Society of Petroleum Engineers, Presented at the Rocky Mountain Oil & Gas Technology Symposium, Denver, Apr. 16-18, 2007, 11 pages.
Caenn et al., "Chapter 9: Wellbore Stability," p. 359, in Composition and Properties of Drilling and Completion Fluids, 7th Edition: Gulf Professional Publishing, 2016, 1 page.
Cahill et al., "Nanoscale Thermal Transport II," Applied Physics Reviews 1.1:011305, 2014, 46 pages.
Cahill et al., "Nanoscale Thermal Transport," Journal of Applied Physics 93:2, Jan. 15, 2003, 28 pages.
California Council on Science and Technology Lawrence Berkeley National Laboratory Pacific Institute, "Advanced Well Stimulation Technologies in California: An Independent Review of Scientific and Technical Information," CCST, Jul. 2016, 400 pages.
Carcione and Avseth, "Rock-physics templates for clay-rich source rocks," Geophysics 80:5 (D481-D500), Sep. 2015, 21 pages.
Carcione et al., "Theory of borehole stability when drilling through salt formations," Geophysics, 71:3, May-Jun. 2006, 17 pages.
Carter and Hanson, "Fake Moon Dirt, HOOD Solar System Science," UT Dallas Magazine, 6:2, Spring 2016, 1 page.
Cates, "Nonlinear Viscoelasticity of Wormlike Micelles (and Other Reversibly Breakable Polymers)," J. Phys. Chem., 1990, 94(1):371-375, 5 pages.
Cates, "Statics and Dynamics of Worm-Like Surfactant Micelles," J. Phys-Condens., 1990, Mat. 2(33):6869-6892, 25 pages.
Chang et al., "A Novel Self-Diverting-Acid Developed for Matrix Stimulation of Carbonate Reservoirs," SPE-65033-MS, Society of Petroleum Engineers, Presented at the SPE International Symposium on Oilfield Chemistry, Houston, Feb. 13-16, 2001, 6 pages.
Chang et al., "Experience in Acid Diversion in High Permeability Deep Water Formations Using Visco-Elastic-Surfactant," SPE-68919-

(56) References Cited

OTHER PUBLICATIONS

MS, Society of Petroleum Engineers, Presented at the SPE European Formation Damage Conference, The Hague, The Netherlands, 21-22 May 21-22, 2001, 5 pages.
Chang et al., "Magnetic SERS Composite Nanoparticles for Microfluidic Detection," abstract to 251st ACE National Meeting, Mar. 13-17, 2016, 1 page (abstract).
Chang, "In-Situ Formation of Proppant and Highly Permeable Blocks for Hydraulic Fracturing," SPE-173328-MS, Society of Petroleum Engineers (SPE), SPE Hydraulic Fracturing Technology Conference Feb. 3-5, 2015, 11 pages.
Chen et al., "Novel CO2-Emulsified Viscoelastic Surfactant Fracturing Fluid System," SPE-94603-MS, Society of Petroleum Engineers, Presented at the SPE European Formation Damage Conference, Scheveningen, The Netherlands, May 25-27, 2005, 6 pages.
Chen et al., "Size Effect in Micro-Scale Cantilever Beam Bending," Acta Mech., 219: 291-307, 2011, 17 pages.
Chen et al., "FITC functionalized magnetic core-shell $Fe_3O_4/Ag$ hybrid nanoparticle for selective determination of molecular biothiols," Sensors and Actuators B: Chemical, 193: 857-863, Dec. 2013, 7 pages.
Chern et al., "Deformation of Progressively Cracking Partially Prestressed Concrete Beams," PCI Journal, 37:1 (74-84), 1992, 11 pages.
Cheshomi et al., "Determination of uniaxial compressive strength of microcystalline limestone using single particles load test," Journal of Petroleum Science and Engineering, 111: 121-126, 2013, 6 pages.
Chevalier et al., "Micellar Properties of Zwitterionic Phosphobetaine Amphiphiles in Aqueous Solution: Influence of the Intercharge Distance," Colloid Polym. Sci., 1988, 266(5):441-448. 8 pages.
Chevalier et al., "Structure of Zwitterionic Surfactant Micelles: Micellar Size and Intermicellar Interactions," J. Phys. Chem., Jun. 1992, 96(21):8614-8619, 6 pages.
Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.
Chupin et al., "Finite Strain Analysis of Nonuniform Deformation Inside Shear Bands in Sands," International Journal for Numerical and Analytical Methods in Geomechanics, 36: 1651-1666, 2012, 16 pages.
Clough et al., "Characterization of Kerogen and Source Rock Maturation Using Solid-State NMR Spectroscopy," Energy & Fuels, 2015, 29(10): 6370-6382, 42 pages.
Corapcioglu, "Fracturing Fluid Effects on Young's Modulus and Embedment in the Niobrara Formation," Thesis for degree of Master of Science (Petroleum Engineering), Colorado School of Mines, 2014, 189 pages.
Couillet et al., "Synergistic Effects in Aqueous Solutions of Mixed Wormlike Micelles and Hydrophobically Modified Polymers," Macromolecules, American Chemical Society, 2005, 38(12):5271-5282, 12 pages.
Crews et al., "Internal Breakers for Viscoelastic Surfactant Fracturing Fluids," SPE-106216-MS, Society of Petroleum Engineers, Presented at the International Symposium on Oilfield Chemistry, Houston, Feb. 28-Mar. 2, 2007, 8 pages.
Crews et al., "New Remediation Technology Enables Removal of Residual Polymer in Hydraulic Fractures," SPE-135199-MS, Society of Petroleum Engineers, Presented at the SPE Annual Technical Conference and Exhibition, Florence, Italy, Sep. 19-22, 2010.
Crews et al., "New Technology Improves Performance of Viscoelastic Surfactant Fluids" SPE-103118-PA, Society of Petroleum Engineers, SPE Drill & Compl, SPE Annual Technical Conference and Exhibition, San Antonio, Texas, Sep. 24-27, 2008, 23(1):41-47, 7 pages.
Crews et al., "Performance Enhancements of Viscoelastic Surfactant Stimulation Fluids with Nanoparticles," SPE-113533-MS, Society of Petroleum Engineers, Presented at the Europec/EAGE Annual Conference and Exhibition, Rome, Jun. 9-12, 2008, 10 pages.

Crews et al., "The Future of Fracturing-Fluid Technology and Rates of Hydrocarbon Recovery," SPE-115475-MS, Society of Petroleum Engineers, Presented at the SPE Annual Technical Conference and Exhibition, Denver, Sep. 21-24, 2008, 13 pages.
Crews, "Internal Phase Breaker Technology for Viscoelastic Surfactant Gelled Fluids," SPE-93449-MS, Society of Petroleum Engineers, Presented at the SPE International Symposium on Oilfield Chemistry, Houston, 2-4 Feb. 2-4, 2005, 11 pages.
Cubillos et al., "The Value of Inter-well and Single Well Tracer Technology for De-Risking and Optimizing a CEOR Process—Caracara Field Case," SPE 174394-MS, Society of Petroleum Engineers (SPE), presented at EUROPEC 2015, Jun. 1-4, 2015, 19 pages.
Cui et al., "Poroelastic solution for an inclined borehole," Transactions of the ASME, Journal of Applied Mechanics, 64, Mar. 1997, 7 pages.
Custelcean et al., "Aqueous Sulfate Separation by Crystallization of Sulfate-Water Clusters," Angewandte Chemie, International Edition, 2015, 54: 10525-10529, 5 pages.
Dagan, "Models of Groundwater Flow in Statistically Homogeneous Porous Formations," Water Resource Search 15:1, Feb. 1979, 17 pages.
Daneshy, "Hydraulic Fracturing to Improve Production," Tech 101, TheWayAhead, 6:3, Oct. 2010, 4 pages.
Daniel et al., "New Visco-Elastic Surfactant Formulations Extend Simultaneous Gravel-Packing and Cake-Cleanup Technique to Higher-Pressure and Higher-Temperature Horizontal Open-Hole Completions: Laboratory Development and a Field Case History From the North Sea," SPE-73770-MS, Society of Petroleum Engineers, Presented at the SPE International Symposium and Exhibition on Formation Damage, Lafayette, Louisiana, Feb. 20-21, 2002, 10 pages.
Das et al., "Molecular Fluorescence, Phosphorescence, and Chemiluminescence Spectrometry," American Chemical Society Publications (ACS), Analytical Chemistry, 84: 597-625, Nov. 3, 2011, 29 pages.
De Block et al., "A New Solution for the Characterization of Unconventional Shale Resources Based on Analysis or Drill Cutting," SPE-177601-MS, Society of Petroleum Engineers (SPE), presented at the Abu Dhabi International Petroleum Exhibition and Conference, Nov. 9-12, 2015, 6 pages.
De Rocha et al, "Concentrated CO2-in-Water Emulsions with Nonionic Polymeric Surfactants," Journal of Colloid and Interface Science, 2001, 239:1 (241-253), 13 pages.
Deans, "Using Chemical Tracers To Measure Fractional Flow And Saturation In-Situ," SPE 7076, Society of Petroleum Engineers (SPE) of AIME, presented at Fifth Symposium on Improved Methods for Oil Recovery of the Society of Petroleum Engineers of AIME, Apr. 16-19, 1978, 10 pages.
Deirieh et al., "Nanochemomechanical Assessment of Shale: A Coupled WDS-Indentation Analysis," Acta Geotechnica, Research Paper, Sep. 2012, 25 pages.
Delafargue and Ulm, "Explicit approximations of the indentation modulus of elastically orthotropic solids for conical indenters," International Journal of Solids and Structures 41:26 (7351-7360), Dec. 2004, 10 pages.
Detournay and Cheng, "Poroelastic Response of a Borehole in a Non-Hydrostatic Stress Field," International Journal of Rock Mechanics, Min. Science and Geomech. Abstracts, 25:3, 1988, 12 pages.
Devarapalli et al., "Micro-CT and FIB-SEM imaging and pour structure characterization of dolomite rock at multiple scales," Arabian Journal of Geosciences 10:361, Aug. 2017, 9 pages.
Di Lullo et al., "Toward Zero Damage: New Fluid Points the Way," SPE-69453-MS, Society of Petroleum Engineers, Presented at the SPE Latin American and Caribbean Petroleum Engineering Conference, Buenos Aires, Argentina, Mar. 25-28, 2001, 8 pages.
Dreiss, "Wormlike Micelles: Where Do We Stand? Recent Developments, Linear Rheology, and Scattering Techniques," The Royal Society of Chemistry, Soft Matter, 2007, 3(8):956-970, 15 pages.
Dropek et al., "Pressure—temperature creep testing as applied to a commercial rock salt," Union Carbide, Office of Waste Isolation, prepared for the U.S. Energy Research and Development Administration, Jun. 1976, 54 pages.

(56) References Cited

OTHER PUBLICATIONS

Du et al., "Interwell Tracer Tests: Lessons Learned from past Field Studies," SPE 93140, Society of Petroleum Engineers (SPE), presented at SPE Asia Pacific Oil and Gas Conference and Exhibition, Apr. 5-7, 2005, 9 pages.
Ducros, "Source Rocks of the Middle East," Source Rock Kinetics: Goal and Perspectives. AAPG Geosciences Technology Workshop, Jul. 2016, 30 pages.
Dvorkin, "Kozeny-Carman Equation Revisited," 2009, 16 pages.
Eastoe et al, "Water-in-CO2 Microemulsions Studied by Small-Angle Neutron Scattering," Langmuir 1997, 13:26 (6980-6984), 5 pages.
Economides et al., Reservoir Stimulation, 2nd ed., Prentice Hall, Englewood Cliffs, New Jersey, 1989, 408 pages.
Ehlig-Economides and Economides, "Water as Proppant," SPE-147603, Society of Petroleum Engineers (SPE), presented at the SPE Annual Technical Conference and Exhibition, Oct. 30-Nov. 2, 2011, 8 pages.
Ekbote et al., "Porochemoelastic Solution for an Inclined Borehole in a Transversely Isotropic Formation," Journal of Engineering Mechanics, ASCE, Jul. 2006, 10 pages.
El-Aneed et al., "Mass Spectrometry, Review of the Basics: Electrospray, MALDI, and Commonly Used Mass Analyzers," Applied Spectroscopy Reviews 44:3 (210-230), Mar. 16, 2009, 22 pages.
Elijah, "Numerical Modeling of Wellbore Instability (Tensile Failure) Using Fracture Mechanics Approach," Thesis for the degree of Master of Science, African University of Science and Technology Abuja, May 2013, 77 pages.
Eliyahu et al, "Mechanical Properties of organic matter in shales mapped at the nanometer scale," Marine and Petroleum Geology, 59:294-304, Sep. 18, 2014, 11 pages.
Ertas et al., "Petroleum Expulsion Part 1. Theory of Kerogen Swelling in Multicomponent Solvents," Energy & Fuels, 20: 295-300, 2006, 6 pages.
Eseme et al., "Review of mechanical properties of oil shales: implications for exploitation and basin modeling," Oil Shale 24:2 (159-174), Jan. 2007, 16 pages.
Esfahani et al., "Quantitative nanoscale mapping of three-phase thermal conductivities in filled skutterudites via scanning thermal microscopy," Nature Science Review 5:1, Feb. 2017, 31 pages.
Ewy, "Shale Swelling/Shrinkage and Water Content Change due to Imposed Suction and Due to Direct Brine Contact," Acta Geotechnica, 9: 869-886, 2014, 18 pages.
Ewy, "Wellbore-Stability Predictions by Use of a Modified Lade Criterion," SPE Drill and Completion, 14:2, Jun. 1999, 7 pages.
Fakoya et al., "Rheological Properties of Surfactant-Based and Polymeric Nano-Fluids," SPE-163921-MS, Society of Petroleum Engineers, Presented at the SPE/ICoTA Coiled Tubing and Well Intervention Conference and Exhibition, The Woodlands, Texas, Mar. 26-27, 2013, 17 pages.
fekete.com [online], "Dual Porosity," retrieved from URL <www.fekete.com/SAN/WebHelp/FeketeHarmony/Harmony_WebHelp/Content/HTML_Files/Reference_Material/General_Concepts/Dual_Porosity.htm>, available on or before 2014, retrieved on Nov. 11, 2019, 6 pages.
Finney, "Random packings and the structure of simple liquids I. The geometry of random close packing," Proc. Roy. Soc. Lond. 319, 479-493, May 1970, 15 pages.
Fjaer et al., "Stresses around Boreholes. Borehole Failure Criteria," in Petroleum Related Rock Mechanics, 2nd Edition, 2008, 156, 1 page.
Fontana et al., "Successful Application of a High Temperature Viscoelastic Surfactant (VES) Fracturing Fluids Under Extreme Conditions in Patagonian Wells, San Jorge Basin," SPE-107277-MS, Society of Petroleum Engineers, Presented at the EUROPEC/EAGE Annual Conference and Exhibition, London, Jun. 11-14, 2007, 15 pages.
Frazer et al., "Localized Mechanical Property Assessment of SiC/SiC Composite Materials," Science Direct, Composites: Part A, 70: 93-101, 2015, 9 pages.

Fredd et al., "Polymer-Free Fracturing Fluid Exhibits Improved Cleanup for Unconventional Natural Gas Well Applications" SPE-91433-MS, Society of Petroleum Engineers, Presented at the SPE Eastern Regional Meeting, Charleston, West Virginia, Sep. 15-17, 2004, 15 pages.
Gallegos and Varela, "Trends in Hydraulic Fracturing Distributions and Treatment Fluids, Additives, Proppants, Water Volumes Applied to Wells Drilled in the United States from 1947 through 2010—Data Analysis and Comparison to the Literature," USGS, United States Geological Survey, 2015, 24 pages.
Gandossi and Estorff, "An overview of hydraulic fracturing and other formation stimulation technologies for shale gas production," JRC Science for Policy Report, European Commission, EUR 26347 EN, Jan. 2013, 62 pages.
Ganjdanesh et al. "Treatment of Condensate and Water Blocks in Hydraulic-Fractured Shale-Gas/Condensate Reservoirs," SPE-175145, Society of Petroleum Engineers (SPE), presented at the SPE Annual Technical Conference and Exhibition, Sep. 28-30, 2015, SPE Journal, Apr. 2016, 10 pages.
Gao et al., "Materials Become Insensitive to Flaws at Nanoscale: Lessons from Nature," PNAS, 100:10, May 13, 2003, 4 pages.
Gardiner et al., "Chapter 1: Introduction to Raman Scattering," in Practical Raman Spectroscopy, Springer-Verlag, 1989, 9 pages.
Garnero, "The Contribution of Collagen Crosslinks to Bone Strength," Int. Bone & Mineral Society, BoneKEy Reports 1:182, Sep. 2012, 8 pages.
George et al., "Approximate relationship between frequency-dependent skin depth resolved from geoelectronnagnetic pedotransfer function and depth of investigation resolved from geoelectrical measurements: A case study of coastal formation, southern Nigeria," Journal of Earth Syst. Sci, 125:7 (1379-1390), Oct. 2016, 12 pages.
Georgi et al., "Physics and Chemistry in Nanoscale Rocks," Society of Petroleum Engineers (SPE), SPE Forum Series, Frontiers of Technology, Mar. 22-26, 2015, 4 pages.
Glossary.oilfield.slb.com [online], "Oilfield Glossary: fluid-friction reducer," available on or before Jun. 15, 2017, retrieved from URL<http://www.glossary.oilfield.slb.com/Terms/f/fluid-friction_reducer.aspx>, 1 page.
Glover et al., "The Use of Measurements Made on Drill Cuttings to Construct and Apply Geomechanical Well Profiles," ARMA 16-0737, American Rock Mechanics Association (ARMA), presentation at the 50th US Rock Mechanics/Geomechanics Symposium, Jun. 26-29, 2016, 11 pages.
Godwin et al., "Simultaneous Gravel Packing and Filter-Cake Cleanup with Shunt Tubes in Openhole Completions: A Case History From the Gulf of Mexico," SPE-78806, Society of Petroleum Engineers, SPE Drill & Compl, Sep. 2002, 17(3):174-178, 5 pages.
Golomb et al, "Macroemulsion of liquid and supercritical CO2-in-water and water-in-liquid CO2 stabilized with fine particles," American Chemical Society (ACS), Ind. Eng. Chem. Res. 2006, 45:8 (2728-2733), 6 pages.
Gomaa et al., "New Insights Into the Viscosity of Polymer-Based In-Situ-Gelled Acids," SPE-121728-PA, Society of Petroleum Engineers, SPE Prod & Oper, Aug. 2010, 25(3):367-375, 9 pages.
Gomaa et al., "Viscoelastic Behavior and Proppant Transport Properties of a New Associative Polymer-Based Fracturing Fluid," SPE-168113-MS, Society of Petroleum Engineers, Presented at the SPE International Symposium and Exhibition on Formation Damage Control, Lafayette, Louisiana, Feb. 26-28, 2014, 17 pages.
Gomaa et al., "Viscoelastic Behavior and Proppant Transport Properties of a New High-Temperature Viscoelastic Surfactant-Based Fracturing Fluid," SPE-173745-MS, Society of Petroleum Engineers, Presented at the SPE International Symposium on Oilfield Chemistry, The Woodlands, Texas, Apr. 13-15, 2015, 25 pages.
Gomaa et al., "Viscoelastic Evaluation of a Surfactant Gel for Hydraulic Fracturing," SPE-143450-MS, Society of Petroleum Engineers, Presented at the SPE European Formation Damage Conference, Noordwijk, The Netherlands, Jun. 7-10, 2011, 18 pages.
Goodman, "Chapter 3: Rock Strength and Failure Criteria," in Introduction to Rock Mechanics, John Wiley & Sons, 1989, 21 pages.

(56) References Cited

OTHER PUBLICATIONS

Gravsholt, "Viscoelasticity in Highly Dilute Aqueous Solutions of Pure Cationic Detergents," Journal of Colloid and Interface Science, Dec. 1976, 57(3):575-577, 3 pages.

Gu and Mohanty, "Effect of Foam Quality on Effectiveness of Hydraulic Fracturing in Shales," International Journal of Rock Mechanics and Mining Sciences, 70: 273-285, 2014, 13 pages.

Gupta et al., "Frac-Fluid Recycling and Water Conservation: A Case History," SPE-119478-PA, Society of Petroleum Engineers, SPE Prod & Oper, Feb. 2010, 25(1):65-69, 5 pages.

Gupta et al., "Surfactant Gel Foam/Emulsion: History and Field Application in the Western Canadian Sedimentary Basin," SPE-97211-MS, Society of Petroleum Engineers, Presented at the SPE Annual Technical Conference and Exhibition, Dallas, Oct. 9-12, 2005, 7 pages.

Gupta, "Unconventional Fracturing Fluids for Tight Gas Reservoirs," SPE-119424-MS, Society of Petroleum Engineers, Presented at the SPE Hydraulic Fracturing Technology Conference, The Woodlands, Texas, Jan. 19-21, 2009, 9 pages.

Gurluk et al., "Enhancing the Performance of Viscoelastic Surfactant Fluids Using Nanoparticles," SPE-164900-MS, Society of Petroleum Engineers, Presented at the EAGE Annual Conference and Exhibition, London, Jun. 10-13, 2013, 15 pages.

Hamley, Introduction to Soft Matter: Synthetic and Biological Self-Assembling Materials, Hoboken, New Jersey: John Wiley & Sons, 2007.

Han and Cundall, "LBM-DEM modeling of fluid-solid internation in porous media," International Journal for Numerical and Analytical Methods in Geomechanics, 37:10 (1391-1407), Jul. 2013, 17 pages.

Han et al., "Impact of Depletion on Integrity of Sand Screen in Depleted Unconsolidated Sandstone Formation," ARMA-2015-301, In 49th US Rock Mechanics/Geomechanics Symposium. American Rock Mechanics Association, 2015, 9 pages.

Han et al., "Numerical and Experimental Studies of Kerogen Rich Shales on Millimeter-Scale Single-Edge Notched Beam," ARMA-19-211, American Rock Mechanics Association (ARMA), prepared for presentation at the 53rd US Rock Mechanics and Geomechanics Symposium in New York, Jun. 23-26, 2019, 8 pages.

Han et al., "Numerical Modeling of Elastic Spherical Contact for Mohr-Coulomb Type Failures in Micro-Geomaterials," Experimental Mechanics, 57: 1091-1105, Jun. 16, 2017, 15 pages.

Han et al., "Application of Silver-Coated Magnetic Microspheres to a SERS-Based Optofluidic Sensor," American Chemical Society Publications (ACS), the Journal of Physical Chemistry C (JPCC), 115: 6290-6296, Mar. 7, 2011, 7 pages.

Harrison et al, "Water-in-Carbon Dioxide Microemulsions with a Fluorocarbon-Hydrocarbon Hybrid Surfactant," Langmuir 1994, 10:10 (3536-3541), 6 pages.

He et al., "Hydrolysis Effect on the Properties of a New Class of Viscoelastic Surfactant-Based Acid and Damage Caused by the Hydrolysis Products," SPE-165161-MS, Society of Petroleum Engineers, Presented at the SPE European Formation Damage Conference & Exhibition, Noordwijk, The Netherlands, Jun. 5-7, 2013, 17 pages.

Helgeson et al., "Formation and Rheology of Viscoelastic "Double Networks" in Wormlike Micelle-Nanoparticle Mixtures," American Chemical Society, Langmuir, 2010, 26(11):8049-8060, 12 pages.

Hiramatsu and Oka, "Stress around a shaft or level excavated in ground with a three-dimensional stress state," Mem. Fra. Eng, Kyoto Univ. 24, 1962, 2 pages (Abstract).

Hoang et al., "Correspondence Principle Between Anisotropic Poroviscoelasticity and Poroelasticity using Micromechanics and Application to Compression of Orthotropic Rectangular Strips," Journal of Applied Physics, American Institute of Physics, 112: 044907, Aug. 30, 2012, 16 pages.

Hoek and Brown, "Empirical Strength Criterion for Rock Masses," Journal of the Geotechnical Engineering Division, Sep. 1980, 20 pages.

Hornby et al., "Anisotropic Effective-Medium Modeling of the Elastic Properties of Shales," Geophysics, 59:10 (1570-1583), Oct. 1994, 14 pages.

Hosemann et al, "Mechanical Characteristics of SiC Coating Layer in TRISO Fuel Particles," Journal of Nuclear Materials, 442: 133-142, 2013, 10 pages.

Hosemann et al., "An Exploratory Study to Determine Applicability of Nano-Hardness and Micro-compression Measurements for Yield Stress Estimation," Science Direct, Journal of Nuclear Materials, 375: 135-143, 2008, 9 pages.

Hu et al., "Smart Liquid SERS Substrates based on $Fe_3O_4$/Au Nanoparticles with Reversibility Tunable Enhancement Factor for Practical Quantitative Detection," a natureresearch journal, Scientific Reports, 4:7204, Nov. 27, 2014, 10 pages.

Huang et al., "A theoretical study of the critical external pressure for casing collapse" Journal of Natural Gas Science and Engineering, Nov. 2015, 27(1), 8 pages.

Huang et al., "Collapse strength analysis of casing design using finite element method," International Journal of Pressure Vessels and Piping 2000, 77:359-367, 8 pages.

Huang et al., "Do Viscoelastic-Surfactant Diverting Fluids for Acid Treatments Need Internal Breakers?" SPE-112484-MS, Society of Petroleum Engineers (SPE), presented at the SPE International Symposium and Exhibition on Formation Damage Control, Lafayette, Louisiana, Feb. 13-15, 2008, 8 pages.

Huang et al., "Field Case Study on Formation Fines Control with Nanoparticles in Offshore Wells," SPE-135088-MS, Society of Petroleum Engineers (SPE), presented at the SPE Annual Technical Conference and Exhibition, Florence, Italy, Sep. 19-22, 2010, 8 pages.

Huang et al., "Fluid-Loss Control Improves Performance of Viscoelastic Surfactant Fluids," SPE-106227-PA, Society of Petroleum Engineers (SPE), SPE Production and Operations, Feb. 2009, 24:1 (60-65), 6 pages.

Huang et al., "Improving Fracture Fluid Performance and Controlling Formation Fines Migration with the Same Agent: Is It Achievable?" IPTC-17044-MS, International Petroleum Technology Conference, Presented at the International Petroleum Technology Conference, Beijing, Mar. 26-28, 2013, 8 pages.

Huang et al., "Nanoparticle Pseudocrosslinked Micellar Fluids: Optimal Solution for Fluid-Loss Control With Internal Breaking," SPE-128067-MS, Society of Petroleum Engineers (SPE), presented at the SPE International Symposium and Exhibition on Formation Damage Control, Lafayette, Louisiana, Feb. 10-12, 2010, 8 pages.

Huang et al., "Nanotechnology Applications in Viscoelastic-Surfactant Stimulation Fluids," SPE-107728-PA, Society of Petroleum Engineers (SPE), SPE Production and Operations, Nov. 2008, 23:4 (512-517), 6 pages.

Hull and Abousleiman, "Chapter 10: Insights of the Rev of Source Shale from Nano-and Micromechanics," in New Frontiers in Oil and Gas Exploration, Springer International Publishing Switzerland, 2016, 29 pages.

Hull et al, "Nanomechanical Characterization of the Tensile Modulus of Rupture of Kerogen-Rich Shale," SPE 177628, Society of Petroleum Engineers (SPE), presented at the Abu Dhabi International Petroleum Exhibition and Conference, Nov. 9-12, 2015, SPE Journal 2017, 22:4 (1024-1033), 10 pages.

Hull et al., "Bromate Oxidation of Ammonium Salts: In Situ Acid Formation for Reservoir Stimulation," Inorganic Chemistry, 2019, 58, 3007-3014, 8 pages.

Hull et al., "Oxidative Kerogen Degradation: A Potential Approach to Hydraulic Fracturing in Unconventionals," Energy Fuels 2019, 33:6 (4758-4766), 9 pages.

Hull et al., "Recent Advances in Viscoelastic Surfactants for improved Production from Hydrocarbon Reservoirs," SPE 173776, Society of Petroleum Engineers (SPE), presented at the SPE International Symposium on Oilfield Chemistry, Apr. 13-15, 2015, SPE Journal, 2016, 18 pages.

Huseby et al., "High Quality Flow Information from Tracer Data," SPE-169183-MS, Society of Petroleum Engineers (SPE), presented at the SPE Bergen One Day Seminar, Apr. 2, 2014, 9 pages.

(56) References Cited

OTHER PUBLICATIONS

Hutchins et al., "Aqueous Tracers for Oilfield Applications," SPE-21049, Society of Petroleum Engineers (SPE), presented at SPE International Symposium on Oilfield Chemistry, Feb. 20-22, 1991, 9 pages.

Imanishi et al., "Wormlike Micelles of Polyoxyethylene Alkyl Ether Mixtures C10E5 + C14E5 and C14E5 + C14E7: Hydrophobic and Hydrophilic Chain Length Dependence of the Micellar Characteristics," Journal of Physical Chemistry B, 2007, 111:1 (62-73), 12 pages.

Infante and Chenevert, "Stability of boreholes drilled through salt formations displaying plastic behaviour," SPE Drilling Engineering, 4:1, Mar. 1989, 9 pages.

Iqbal et al., "In situ micro-cantilver tests to study fracture properties of NiAl single crystals," Acta Materialia, 60:3 (1193-1200), Feb. 2012, 8 pages.

Israelachvili et al., "Theory of Self-Assembly of Hydrocarbon Amphiphiles into Micelles and Bilayers," Journal of Chemical Society, Faraday Transactions, 1976, 2:72 (1525-1567), 44 pages.

Itasca, Fast Lagrangian Analysis of Continua, Version 7.0. Minneapolis, Minnesota, 2011, 22 pages.

itascacg.com [online], "Particle Flow Code, Version 5.0," Itasca Consulting Group, Inc., available on or before Apr. 11, 2014, [retrieved on May 11, 2018], retrieved from URL: <https://www.itascacg.com/software/pfc>, 5 pages.

itascacg.com [online], "Three-dimensional Fast Lagrangian Analysis of Continua (FLAC3D)," available on or before 2012, [retrieved on Jun. 7, 2018], retrieved from URL: < https://www.itascacg.com/software/flac3d>, 4 pages.

Iyengar et al., "Analysis of Crack Propagation in Strain-Softening Beams," Engineering Fracture Mechanics 69: 761-778, 2002, 18 pages.

Jaeger et al., "Fundamentals of Rock Mechanics," 4th Edition, Wiley, 2007, 486 pages.

Jerke et al., "Flexibility of Charged and Uncharged Polymer-Like Micelles," Langmuir 1998, 14:21 (6013-6024), 12 pages.

Jia et al., "Highly Efficient Extraction of Sulfate Ions with a Tripodal Hexaurea Receptor," Angew. Chem. Int. Ed., 2011, 50: 486-490, 5 pages.

Jianhong et al., "Estimation of the Tensile Elastic Modulus using Brazilian disc by Applying Diametrically Opposed Concentrated Loads," International Journal of Rock Mechanics & Mining Sciences 46:3 (568-576), 2009, 9 pages.

Johnston et al, "Water-in-Carbon Dioxide Microemulsions: An Environment for Hydrophiles Including Proteins," Science, 271:5249 (624-626), Feb. 2, 1996, 3 pages.

Jose et al., "Continuous multi cycle nanoindentation studies on compositionally graded $Ti_{1-x}Al_xN$ multilayer thin films," Materials Science and Engineering A, 528:21 (6438-6444), Apr. 20, 2011, 7 pages.

Jun et al., "Multifunctional Silver-Embedded Magnetic Nanoparticles as SERS Nanoprobes and Their Applications," Nano Micro Small, Multifunctional Nanoparticles, 6:1 (119-125), Jan. 4, 2010, 7 pages.

Kang et al., "An experimental study on oxidizer treatment used to improve the seepage capacity of coal reservoirs," Natural Gas Industry B, 6: 129-137, Sep. 25, 2018, 9 pages.

Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels 20: 310-308, 2006, 8 pages.

Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.

Kim et al., "Numerical analysis of fracture propagation during hydraulic fracturing operations in shale gas systems," International Journal of Rock and Mechanics Mining Sciences, 76: 127-137, 2015, 11 pages.

King, "Thirty Years of Gas Shale Fracturing: What Have We Learned?" SPE-133456, Society of Petroleum Engineers (SPE), presented at the SPE Annual Technical Conference and Exhibition, Sep. 19-22, 2010, 50 pages.

Klapetek, "Chapter 11: Thermal Measurements," in Quantitative Data Processing in Scanning Probe Microscopy: SPM Applications for Nanometrology, 2018, 26 pages.

Kneipp et al., "Single Molecule Detection Using Surface-Enhanced Raman Scattering (SERS)," Physical Review Letters, American Physical Society 78:9, Mar. 3, 1997, 4 pages.

Kolymbas, "Kinematics of Shear Bands," Acta Geotechnica, 4: 315-318, 2009, 4 pages.

Kreh, "Viscoelastic Surfactant-Based Systems in the Niagaran Formation," SPE-125754-MS, Society of Petroleum Engineers (SPE), presented at the SPE Eastern Regional Meeting, Charleston, West Virginia, Sep. 23-25, 2009, 7 pages.

Kumar et al., "Nano to Macro Mechanical Characterization of Shale," SPE 159804, Society of Petroleum Engineers (SPE), presented at the SPE Annual Technical Conference and Exhibition, Oct. 8-10, 2012, 23 pages.

Kuperkar et al., "Viscoelastic Micellar Water/CTAB/NaNO3 Solutions: Rheology, SANS and Cryo-TEM Analysis," Journal of Colloid and Interface Science, 2008, 323:2 (403-409), 7 pages.

Lam et al., "Experiments and Theory in Strain Gradient Elasticity," Journal of Mechanics and Physics of Solids, 51: 1477-1508, 2003, 32 pages.

Larsen et al., "Changes in the Cross-Link Density of Paris Basin Toarcian Kerogen During Maturation," Organic Geochemistry 33: 1143-1152, 2002, 10 pages.

Lee et al, "Water-in carbon dioxide emulsions: Formation and stability," Langmuir, 1999, 15:20 (6781-6791), 11 pages.

Lee et al., "An Analytical Study on Casing Design for Stabilization of Geothermal Well," Korean J. Air-Conditioning and Ref. Eng., 2012, 11:24(11), 16 pages (English Abstract).

Leitzell, "Viscoelastic Surfactants: A New Horizon in Fracturing Fluids for Pennsylvania," SPE-111182-MS, Society of Petroleum Engineers (SPE), presented at the Eastern Regional Meeting, Lexington, Kentucky, Oct. 17-19, 2007, 6 pages.

Lewan, "Evaluation of petroleum generation by hydrous pyrolysis experimentation," Phil. Trans. R. Soc. Lond. A, 1985, 315: 123-134, 13 pages.

Lewan, "Experiments on the role of water in petroleum formation," Geochimica et Cosmochimica Acta, Pergamon, 1997, 61:17 (3691-3723), 33 pages.

Li et al., "A review of crosslinked fracturing fluids prepared with produced water," KeAi Advanced Research Evolving Science, Southwest Petroleum University, Petroleum 2, 2:4 (313-323), Dec. 2016, 11 pages.

Li et al., "Differentiating Open Natural Fractures from Healed Fractures Using the New, High-Definition Oil-Based Mud Microelectrical Imager-Case Studies from Organic Rich Shales," SPE-174923-MS, Society of Petroleum Engineers (SPE), presented at the SPE Annual Technical Conference and Exhibition, Sep. 28-30, 2015, 16 pages.

Li et al., "High-Temperature Fracturing Fluids Using Produced Water with Extremely High TDS and Hardness," IPTC-17797-MS, International Petroleum Technology Conference (IPTC), presented at the International Petroleum Technology Conference, Dec. 10-12, 2014, 13 pages.

Li et al., "Mechanical Characterization of Micro/Nanoscale Structures for MEMS/NEMS Applications using Nanoindentation Techniques," Science Direct, Ultramicroscopy, 97: 481-494, 2003, 14 pages.

Li et al., "The Brazilian Disc Test for Rock Mechanics Applications: Review and New Insights," Rock Mech Rock Eng, 2013, 46: 269-287, 19 pages.

Li et al., "Well Treatment Fluids Prepared With Oilfield Produced Water: Part II," SPE-133379-MS, Society of Petroleum Engineers (SPE), presented at the SPE Annual Technical Conference and Exhibition, Sep. 19-22, 2010, 7 pages.

Liang et al., "An Experimental Study on interactions between Imbibed Fractured Fluid and Organic-Rich Tight Carbonate Source Rocks," SPE-188338-MS, Society of Petroleum Engineers (SPE),

(56) References Cited

OTHER PUBLICATIONS presented at the Abu Dhabi International Petroleum Exhibition and Conference, Nov. 13-16, 2017, 14 pages.

Liu and Abousleiman, "Multiporosity/Multipermeability Inclined-Wellbore Solutions with Mudcake Effects," Society of Petroleum Engineers (SPE), SPE Journal 23:5, Oct. 2018, 25 pages.

Liu and Abousleiman, "N-Porosity and N-Permeability generalized wellbore stability analytical solutions and applications," ARMA 16-417, America Rock Mechanics Association (ARMA), presented at the 50th US Rock Mechanics/Geomechanics Symposium held in Houston, Texas, Jun. 26-29, 2016, 10 pages.

Liu et al., "Applications of nano-indentation methods to estimate nanoscale mechanical properties of shale reservoir rocks," Journal of Natural Gas Science and Engineering, 35: 1310-1319, Sep. 29, 2016, 10 pages.

Liu et al., "Microstructural and geomechanical analysis of Bakken shale at nanoscale," Journal of Petroleum Science and Engineering, 153: 138-144, Mar. 23, 2017, 12 pages.

Liu et al., "Poroelastic Dual-Porosity/Dual-Permeability After-Closure Pressure-Curves Analysis in Hydraulic Fracturing," SPE 181748, Society of Petroleum Engineers (SPE), SPE Journal 2016, 21 pages.

Liu et al., "Safe Drilling in Chemically Active and Naturally Fractured Source Rocks: Analytical Solution and Case Study," IADC/SPE-189658-MS, Society of Petroleum Engineers (SPE), IADC, presented at the IADC/SPE Drilling Conference and Exhibition, Mar. 6-8, 2018, 13 pages.

Liu, "Dimension effect on mechanical behavior of silicon micro—cantilver beams," Measurement, 41:8 (885-895), Oct. 2008, 11 pages.

Liu, "Elastic Constants Determination and Deformation Observation Using Brazilian Disk Geometry," Experimental Mechanics, 2010, 50: 1025-1039, 15 pages.

Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.

Liu, "Micro-cantilver Testing to Evaluate the Mechanical Properties of Thermal Barrier Coatings," presented at the 19th European Conference on Fracture (ECF19): Fracture Mechanics for Durability, Reliability and Safety, Conference Proceedings, Aug. 26-31, 2012, 7 pages.

Long et al., "Chapter 2: Advanced Well Stimulation Technologies," in An Independent Scientific Assessment of Well Stimulation in California, vol. I, Well Stimulation Technologies and their Past, Present and Potential Future Use in California, Jan. 2015, 62 pages.

Low, "Advances in Ceramics Matrix Composites," Processing, Properties and applications of SiC1/SiC, 10-19, Nanoceramic Matric Composites, 30-41, 2014, 11 pages.

Low, "Ceramic-Matrix Composites: Microstructure, Properties and Applications," Woodhead Publishing Limited, 11-19, 30-40, 2006, 11 pages.

Lu et al, "Fabrication and characterization of ceramic coatings with alumina-silica sol-incorporated a-alumina powder coated on woven quartz fiber fabrics," Ceramics International 39:6 (6041-6050), Aug. 2013, 10 pages.

Lu et al., "Quantitative prediction of seismic rock physics of hybrid tight oil reservoirs of the Permian Lucaogou Formation, Junggar Basin, Northwest China," Journal of Asian Earth Sciences, 2019, 178: 216-223, 8 pages.

Luan et al., "Creation of synthetic samples for physical modelling of natural shale," European Association of Geoscientists and Engineers (EAGE), Geophysical Prospecting 64: 898-914, Jul. 2016, 17 pages.

Lungwitz et al., "Diversion and Cleanup Studies of Viscoelastic Surfactant-Based Self-Diverting Acid," SPE-86504-PA, Society of Petroleum Engineers (SPE), SPE Production and Operations, 2007, 22:1 (121-127), 7 pages.

Luo et al., 2012. "Rheological Behavior and Microstructure of an Anionic Surfactant Micelle Solution with Pyroelectric Nanoparticle," Colloid and Surface A: Physiochemical English Aspects, Feb. 5, 2012, 395: 267-275, 9 pages.

Lyngra et al. "Heavy Oil Characterization: Lessons Learned During Placement of a Horizontal Injector at a Tar/Oil Interface," SPE-172673-MS, Society of Petroleum Engineers (SPE), presented at the SPE Middle East Oil & Gas Show and Conference, Mar. 8-11, 2015, 20 pages.

Lynn et al., "A Core Based Comparison Of The Reaction Characteristics Of Emulsified And In-Situ Gelled Acids In Low Permeability, High Temperature, Gas Bearing Carbonates," SPE-65386-MS, Society of Petroleum Engineers (SPE), presented at the SPE International Symposium on Oilfield Chemistry, Houston, Feb. 13-16, 2001, 16 pages.

Mahabadi et al., "A novel approach for micro-scale characterization and modeling of geomaterials incorporating actual material heterogeneity," (XP002689941) Geophysical Research Letters 39:1 (L01303), Jan. 1, 2012, 6 pages.

Mahabadi et al., "Development of a new fully-parallel finite-discrete element code: Irazu," ARMA-2016-516, American Rock Mechanics Association (ARMA), presented at the 50th US Rock Mechanics/Geomechanics Symposium, Jun. 26-29, 2016, 9 pages.

Mahmoud et al., "Removal of Pyrite and Different Types of Iron Sulfide Scales in Oil and Gas Wells without H2S Generation," IPTC-18279-MS, International Petroleum Technology Conferences (IPTC), presented at the International Petroleum Technology Conference, Dec. 6-9, 2015, 8 pages.

Maio et al., "Measuring Fracture Toughness of Coatings using Focused-ion-beam-machined Microbeams," J. Mater, Res., 20:2, Feb. 2005, 4 pages.

Mao et al., "Chemical and nanometer-scale structure of kerogen and its change during thermal maturation investigated by advanced solid-state 13C NMR spectroscopy," Geochimica et Cosmochimica Acta, 2010, 74(7): 2110-2127, 18 pages.

Marchetti et al., "Fluorous affinity chromatography for enrichment and determination of perfluoroalkyl substances," American Chemical Society (ACS), Annual Review of Analytical Chemistry 84: 7138-7145, Jul. 19, 2012, 8 pages.

Maxwell, "Microseismic hydraulic fracture imaging: The path toward optimizing shale gas production," The Leading Edge, Special Section: Shales, Mar. 2011, 6 pages.

McElfresh et al., "A Single Additive Non-Ionic System for Frac Packing Offers Operators a Small Equipment Footprint and High Compatibility with Brines and Crude Oils," SPE-82245-MS, Society of Petroleum Engineers (SPE), presented at the SPE European Formation Damage Conference, The Hague, The Netherlands, May 13-14, 2003, 11 pages.

McMahon et al., "First 100% Reuse of Bakken Produced Water in Hybrid Treatments Using Inexpensive Polysaccharide Gelling Agents," SPE-173783-MS, Society of Petroleum Engineers (SPE), presented at the SPE International Symposium on Oilfield Chemistry, Apr. 13-15, 2015, 9 pages.

Mehrabian and Abousleiman, "Generalized Biot's Theory an Mandel's Problem of Multiple Porosity and Multiple-Permeability Poroelasticity," American Geophysical Union (AGU), Journal of Geological Research: Solid Earth, 119:4 (2745-2763), 2014, 19 pages.

Mesa, "Spherical and rounded cone nano indenters," Micro Star Technologies Inc., available on or before Jan. 23, 2018, 24 pages.

Meyer et al., "Identification of Source Rocks on Wireline Logs by Density/Resistivity and Sonic Transit Time/Resistivity Crossplots," AAPG Bulletin, 1984, 68(2): 121-129, 9 pages.

Meyers et al., "Point load testing of drill cuttings from the determination of rock strength," ARMA-05-712, presented at the 40th U.S. Symposium on Rock Mechanics (USRMS), Alaska Rocks 2005, American Rock Mechanics Association, Jun. 25-29, 2005, 2 pages, (Abstract).

Middleton et al, "Shale gas and non-aqueous fracturing fluids: Opportunities and challenges for supercritical CO 2," Applied Energy, 147: 500-509, 2015, 10 pages.

Mitchell et al., "Chapter 7: Casing and Tubing Design," Properties of Casing and Tubing, Petroleum well construction, 1998, 40 pages.

(56) References Cited

OTHER PUBLICATIONS

Mohammed et al., "Casing structural integrity and failure modes in a range of well types—A review," Journal of Natural Gas Science and Engineering, 2019, 68: 102898, 25 pages.

Mohammed et al., "Successful Application of Foamed Viscoelastic Surfactant-Based Acid," SPE-95006-MS, Society of Petroleum Engineers (SPE), presented at the SPE European Formation Damage Conference, Sheveningen, The Netherlands, May 25-27, 2005, 7 pages.

Montgomery and Smith, "Hydraulic Fracturing: History of Enduring Technology," Journal of Petroleum Technology, Dec. 2010, 7 pages.

Montgomery, "Chapter 1: Fracturing Fluids," in Effective and Sustainable Hydraulic Fracturing, Intech, the proceedings of the International Conference for Effective and Sustainable Hydraulic Fracturing (HF2103) on May 20-22, 2013, 23 pages.

Montgomery, "Chapter 2: Fracturing Fluid Components," in Effective and Sustainable Hydraulic Fracturing, Intech, 2013, 21 pages.

Moyer, "A Case for Molecular Recognition in Nuclear Separations: Sulfate Separation from Nuclear Wastes," American Chemical Society (ACS), Inorganic Chemistry, 2012, 52: 3473-3490, 18 pages.

Moyner et al., "The Application of Flow Diagnostics for Reservoir Management," SPE 171557, Society of Petroleum Engineers (SPE), SPE Journal, Apr. 2015, 18 pages.

Nagarajan, "Molecular Packing Parameter and Surfactant Self-Assembly: The Neglected Role of the Surfactant Tail," Langmuir 2002, 18:1 (18-38), 8 pages.

Nasr-El-Din et al., "Investigation and Field Evaluation of Foamed Viscoelastic Surfactant Diversion Fluid Applied During Coiled-Tubing Matrix-Acid Treatment," SPE-99651-MS, Society of Petroleum Engineers (SPE), presented at the SPE/ICoTA Coiled Tubing Conference & Exhibition, The Woodlands, Texas, Apr. 4-5, 2006, 14 pages.

Nasr-El-Din et al., "Lessons Learned and Guidelines for Matrix Acidizing With Viscoelastic Surfactant Diversion in Carbonate Formations," SPE-102468-MS, Society of Petroleum Engineers (SPE), presented at the SPE Annual Technical Conference and Exhibition, San Antonio, Texas, Sep. 24-27, 2006, 11 pages.

Nehmer, "Viscoelastic Gravel-Pack Carrier Fluid," SPE-17168-MS, Society of Petroleum Engineers (SPE), presented at the SPE Formation Damage Control Symposium, Bakersfield, California, Feb. 8-9, 1988, 10 pages.

Nettesheim et al., "Influence of Nanoparticle Addition on the Properties of Wormlike Micellar Solutions," Langmuir 2008, 24:15 (7718-7726), 9 pages.

Nguyen and Abousleiman, "Poromechanics Response of Inclined Wellbore Geometry in Chemically Active Fractured Porous Media," Journal of Engineering Mechanics, 135:Nov. 11, 2005, 14 pages.

Okiongbo et al., "Changes in Type II Kerogen Density as a Function of Maturity: Evidence from the Kimmeridge Clay Formation," Energy Fuels, 2005, 19: 2495-2499, 5 pages.

Oliver and Pharr, "An improved technique for determining hardness and elastic modulus using load and displacement sensing indentation experiments," Journal of Materials Research, 7:Jun. 6, 1992, 20 pages.

Oliver and Pharr, "Measurement of hardness and elastic modulus by instrumented indentation: Advances in understanding and refinements to methodology," Journal of Materials Research, 19:Jan. 1, 2004, 18 pages.

Ortega et al., "The Effect of Particle Shape and Grain-Scale Properties of Shale: A Micromechanics Approach," International Journal for Numerical and Analytical Methods in Geomechanics, 34: 1124-1156, 2010, 33 pages.

Ortega et al., "The Effect of the Nanogranular Nature of Shale on their Poroelastic Behavior," Acta Geotechnica, 2: 155-182, 2007, 28 pages.

Ortega et al., "The Nanogranular Acoustic Signature of Shale," Geophysics, 74:3 (D65-D84), May-Jun. 2009, 20 pages.

Osman and Pao, "Mud Weight Prediction for Offshore Drilling," 8 pages.

Ottesen, "Wellbore Stability in Fractured Rock," IADC/SPE 128728, International Association of Drilling Contractors (IADC), Society of Petroleum Engineers (SPE), presented at the 2010 IADC/SPE Drilling Conference and Exhibition, Louisiana, Feb. 2-4, 2010, 8 pages.

Palisch et al., "Determining Realistic Fracture Conductivity and Understanding Its Impact on Well Performance—Theory and Field Examples," SPE-106301-MS, Society of Petroleum Engineers (SPE), presented at the SPE Hydraulic Fracturing Technology Conference, College Station, Texas, Jan. 29-31, 2007, 13 pages.

Pandey et al., "Fracture Stimulation Utilizing a Viscoelastic-Surfactant Based System in the Morrow Sands in Southeast New Mexico," SPE-102677-MS, Society of Petroleum Engineers (SPE), presented at the International Symposium on Oilfield Chemistry, Houston, Feb. 28-Mar. 2, 2007, 8 pages.

Pant, "Nanoindentation characterization of clay minerals and clay-based hybrid bio-geomaterials," dissertation for degree of Doctor of Philosophy in the Department of Civil and Environmental Engineering at the Louisiana State University and Agricultural and Medical College, Dec. 2013, 111 pages.

Passey et al., "From Oil-Prone Source Rock to Gas-Producing Shale Reservoir—Geologic and Petrophysical Characterization of Unconventional Shale-Gas Reservoirs," SPE 131350, Society of Petroleum Engineers (SPE), presented at the CPS/SPE International Oil & Gas Conference and Exhibition, Jun. 8-10, 2010, 29 pages.

Patel et al., "Analysis of US Hydraulic Fracturing Fluid System and Proppant Trends," SPE 168645, Society of Petroleum Engineers (SPE), presented at the SPE Hydraulic Fracturing Technology Conference, Feb. 4-6, 2014, 20 pages.

Petoud et al., "Brilliant SM, Eu, Tb, and Dy Chiral Lanthanide Complexes with Strong Circularly Polarized Luminescence," Journal for the American Chemical Society (JACS), 129: 77-83, Dec. 15, 2006, 7 pages.

petrowiki.org [online], "Fluid flow in naturally fractured reservoirs," retrieved from URL <https://petrowiki.org/Fluid_flow_in_naturally_fractured_reservoirs>, available on or before Jul. 16, 2015, retrieved on Nov. 11, 2019, 12 pages.

Podio et al., "Dynamic Properties of Dry and Water-Saturated Green River Shale under Stress," SPE 1825, Society of Petroleum Engineers (SPE), presented at the SPE 42nd Annual Fall Meeting, Oct. 1-4, 1967, Society of Petroleum Engineers Journal, Jun. 11, 1968, 16 pages.

Pollard et al., "Fundamentals of Structural Geology," Cambridge University Press, Sep. 1, 2005, 291, 3 pages.

Pollock and Hammiche, "Micro-thermal analysis: techniques and applications," Journal of Physics D: Applied Physics, 34.9 (R23-R53), 2001, 31 pages.

Poon et al., "An Analysis of Nanoindentation in Linearly Elastic Solids," International Journal of Solids and Structures, 45:24 (6018-6033), Dec. 1, 2008, 16 pages.

Qin et al, "Applicability of nonionic surfactant alkyl polyglucoside in preparation of liquid CO2 emulsion," Journal of CO2 Utilization, 2018, 26: 503-510, 8 pages.

Raghavan et al., "Highly Viscoelastic Wormlike Micellar Solutions Formed by Cationic Surfactants with Long Unsaturated Tails," Langmuir 2001, 17:2 (300-306), 7 pages.

Rajbanshi et al., "Sulfate Separation from Aqueous Alkaline Solutions by Selective Crystallization of Alkali Metal Coordination Capsules," American Chemical Society Publications (ACS), Crystal Growth and Design, 2011, 11: 2702-2706, 5 pages.

Rawat et al., "Case Evaluating Acid Stimulated Multilayered Well Performance in Offshore Carbonate Reservoir: Bombay High," OTC-25018-MS, Offshore Technology Conference (OTC), presented at the Offshore Technology Conference-Asia, Kuala Lumpur, Mar. 25-28, 2014.

Ribeiro and Sharma, "Fluid Selection for Energized Fracture Treatments," SPE 163867, Society of Petroleum Engineers (SPE), presented at the SPE Hydraulic Fracturing Technology Conference, Feb. 4-6, 2013, 11 pages.

Richard et al, "Slow Relaxation and Compaction of Granular Systems," Nature Materials, 4, Feb. 2005, 8 pages.

(56) References Cited

OTHER PUBLICATIONS

Rodriguez et al., "Imagining techniques for analyzing shale pores and minerals," National Energy Technology Laboratory, Dec. 2, 2014, 44 pages.
Rostami et al., "DABCO tribromide immobilized on magnetic nanoparticle as a recyclable catalyst for the chemoselective oxidation of sulfide using H2O2 under metaland solvent-free condition," Catal. Commun. 2014, 43: 16-20, 20 pages.
Rowan et al., "Dynamic Covalent Chemistry," Angewante Chemie International Edition, 41: 898-952, Mar. 15, 2002, 55 pages.
Ryoo et al, "Water-in-Carbon Dioxide Microemulsions with Methylated Branched Hydrocarbon Surfactants," Industrial & Engineering Chemistry Research 2003, 42:25 (6348-6358), 11 pages.
Sagisaka et al, "A New Class of Amphiphiles Designed for Use in Water-in-Supercritical CO2 Microemulsions," Langmuir 2016, 32:47 (12413-12422), 44 pages.
Sagisaka et al, "Effect of Fluorocarbon and Hydrocarbon Chain Lengths In Hybrid Surfactants for Supercritical CO2," Langmuir 2015, 31:27 (7479-7487), 36 pages.
Sagisaka et al, "Nanostructures in Water-in-CO2 Microemulsions Stabilized by Double-Chain Fluorocarbon Solubilizers," Langmuir 2013, 29:25 (7618-7628), 11 pages.
Samuel et al., "A New Solids-Free Non-Damaging High Temperature Lost-Circulation Pill: Development and First Field Applications," SPE-81494-MS, Society of Petroleum Engineers (SPE), presented at the Middle East Oil Show, Bahrain, 9-12 Jun. 9-12, 2003, 12 pages.
Samuel et al., "Polymer-Free Fluid for Fracturing Applications," SPE-59478-PA, Society of Petroleum Engineers (SPE), SPE Drill & Compl 1999, 14:4 (240-246), 7 pages.
Samuel et al., "Polymer-Free Fluid for Hydraulic Fracturing," SPE-38622-MS, Society of Petroleum Engineers (SPE), presented at the SPE Annual Technical Conference and Exhibition, San Antonio, Texas, Oct. 5-8, 1997, 7 pages.
Samuel et al., "Viscoelastic Surfactant Fracturing Fluids: Application in Low Permeability Reservoirs," SPE-60322-MS, Society of Petroleum Engineers (SPE), presented at the SPE Rocky Mountain Regional/Low-Permeability Reservoirs Symposium and Exhibition, Denver, 12-15, Mar. 12-15, 2000, 7 pages.
Santarelli et al., "Drilling through Highly Fractured Formations: A Problem, a Model, and a Cure," Society of Petroleum Engineers (SPE), presented at the 67th Annual Technical Conference and Exhibition of the Society of Petroleum Engineers, Washington D.C., Oct. 4-7, 1992, 10 pages.
Sayed and Al-Muntasheri, "A Safer Generation of Wettability Alteration Chemical Treatments," SPE-184566-MS, Society of Petroleum Engineers (SPE), presented at the SPE International Conference on Oilfield Chemistry, Apr. 3-5, 2017, 25 pages.
Schubert et al., "The Microstructure and Rheology of Mixed Cationic/Anionic Wormlike Micelles," Langmuir 2003, 19:10 (4079-4089), 11 pages.
Selvin et al., "Principles and biophysical applications of lanthanide-based probes," Annual Review of Biophysics and Biomolecular Structure, Jun. 2002, 31:275-302, 28 pages.
Semmelbeck et al., "Novel CO2-Emulsified Viscoelastic Surfactant Fracturing Fluid System Enables Commercial Production from Bypassed Pay in the Olmos Formation of South Texas," SPE-100524-MS, Society of Petroleum Engineers (SPE), presented at the SPE Gas Technology Symposium, Calgary, May 15-17, 2006, 8 pages.
Sepulveda et al., "Oil-Based Foam and Proper Underbalanced-Drilling Practices Improve Drilling Efficiency in a Deep Gulf Coast Well," SPE 115536, Society of Petroleum Engineers (SPE), presented at the 2008 SPE Annual Technical Conference and Exhibition in Denver, Colorado, Sep. 21-24, 2008, 8 pages.
Serra, "No Pressure Transient Analysis Methods for Naturally Fractured Reservoirs," (includes associated papers 12940 and 13014), Journal of Petroleum Technology, Dec. 1983, 35:12, Society of Petroleum Engineers, 18 pages.
Serres-Piole et al., "Water tracers in oilfield applications: Guidelines," Elsevier Ltd., Journal of Science and Engineering, Nov. 2012, 98-99:22-39, 18 pages.
Shahid et al., "Natural-fracture reactivation in shale gas reservoir and resulting microseismicity," SPE 178437, Journal of Canadian Petroleum Technology, Nov. 2015, 54:06, 10 pages.
Shashkina et al., "Rheology of Viscoelastic Solutions of Cationic Surfactant. Effect of Added Associating Polymer," Langmuir 2005, 21:4 (1524-1530), 7 pages.
Shin et al., "Development and Testing of Microcompression for Post Irradiation Characterization of OPS Steels," Journal of Nuclear Materials, 2014, 444:43-48, 6 pages.
Shook et al., "Determining Reservoir Properties and Flood Performance from Tracer Test Analysis," SPE 124614, Society of Petroleum Engineers (SPE), presented at SPE Annual Technical Conference and Exhibition, Oct. 4-7, 2009, 19 pages.
Shukla et al., "Nanoindentation Studies on Shales," ARMA 13-578, American Rock Mechanics Association (ARMA), presented at the 47th US Rock Mechanics/Geomechanics Symposium, Jun. 23-26, 2013, 10 pages.
Siddig et al., "A review of different approaches for water-based drilling fluid filter cake removal," Journal of Petroleum Science and Engineering, Apr. 2020.
Sierra et al., "Woodford Shale Mechanical Properties and the Impacts of Lithofacies," ARMA 10-461, American Rock Mechanics Association (ARMA), presented at the 44th US Rock Mechanics Symposium and 5th US-Canada Rock Mechanics Symposium, Jun. 27-30, 2010, 10 pages.
Singh et al., "Facies classification based on seismic waveform," presented at the 5th Conference & Exposition on Petroleum Geophysics, Jan. 15-17, 2004, 456-462, 7 pages.
Siskin et al., "Reactivity of organic compounds in hot water: geochemical and technological implications," Science, Oct. 11, 1991, 254, 8 pages.
Slatt et al., "Merging Sequence Stratigraphy and Geomechanics for Unconventional Gas Shales," The Leading Edge, Special Section: Shales, Mar. 2011, 8 pages.
Slatt et al., "Outcrop/Behind Outcrop (Quarry), Multiscale Characterization of the Woodford Gas Shale," in Breyer, Shale Reservoirs—Giant Resources for the 21st Century: AAPG Memoir, 2011, 97: 1-21, 22 pages.
Sone et al., "Mechanical Properties of Shale-Gas Reservoir Rocks—Part 2: Ductile Creep, Brittle Strength, and Their Relation to the Elastic Modulus," Geophysics, Sep.-Oct. 2013, 78:5 (D393-D402), 10 pages.
Sone et al., "Mechanical Properties of Shale-Gas Reservoir Rocks—Part 1: Static and Dynamic Elastic Properties and Anisotropy," Geophysics, Sep.-Oct. 2013, 78:5 (D381-D392), 13 pages.
Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 136: 6838-6841, 4 pages.
Soni, "LPG-Based Fracturing: An Alternative Fracturing Technique in Shale Reservoirs," IADC/SPE-170542-MS, Society of Petroleum Engineers (SPE), IADC/SPE Asia Pacific Drilling Technology Conference, Aug. 25-27, 2014, 7 pages.
Stewart et al., "Use of a Solids-Free Viscous Carrying Fluid in Fracturing Applications: An Economic and Productivity Comparison in Shallow Completions," SPE-30114-MS, Society of Petroleum Engineers (SPE), presented at the SPE European Formation Damage Control Conference, Hague, The Netherlands, May 15-16, 1994, 14 pages.
Stiles et al., "Surface-enhanced Raman Spectroscopty," Annual Review of Analytical Chemistry, Mar. 18, 2008, 1:601-26, 29 pages.
Sullivan et al., "Optimization of a Viscoelastic Surfactant (VES) Fracturing Fluid for Application in High-Permeability Formations," SPE-98338-MS, Society of Petroleum Engineers (SPE), presented at the SPE International Symposium and Exhibition on Formation Damage Control, Lafayette, Louisiana, Feb. 15-17, 2006, 8 pages.
Tabatabaei et al., "Well performance diagnosis with temperature profile measurements," SPE 147448, Society of Petroleum Engineers (SPE), in SPE Annual Technical Conference and Exhibition, Oct. 30-Nov. 2, 2011, published Jan. 2011, 16 pages.

(56) References Cited

OTHER PUBLICATIONS

Taheri et al., "Investigation of rock salt layer creep and its effects on casing collapse," International Journal of Mining Science and Technology, 2020, 9 pages.

Tathed et al., "Hydrocarbon saturation in Bakken Petroleum System based on joint inversion of resistivity and dielectric dispersion logs," Fuel, Dec. 2018, 233: 45-55, 11 pages.

Taylor et al., "Laboratory Evaluation of In-Situ Gelled Acids for Carbonate Reservoirs," SPE-71694-MS, Society of Petroleum Engineers (SPE), presented at the SPE Annual Technical Conference and Exhibition, New Orleans, Sep. 30-Oct. 3, 2001, 10 pages.

Tian et al., "Off-Resonant Gold Superstructures as Ultrabright Minimally Invasive Surface-Enhanced Raman Scattering (SERS) Probes," American Chemical Society (ACS), Chemistry of Materials (CM), Jul. 2015, 27: 5678-5684, 7 pages.

Trippetta et al., "The seismic signature of heavy oil on carbonate reservoir through laboratory experiments and AVA modelling," Journal of Petroleum Science and Engineering, 2019, 177: 849-860, 12 pages.

Ulboldi et al., "Rock strength measurement on cuttings as input data for optimizing drill bit selection," SPE 56441, Society of Petroleum Engineers (SPE), presented at the 1999 SPE Annual Technical Conference and Exhibition, Oct. 3-6, 1999, 9 pages.

Uleberg and Kleppe, "Dual Porosity, Dual Permeability Formulation for Fractured Reservoir Simulation," TPG4150, Reservoir Recovery Techniques, Combined Gas/Water Injection Subprogram, 1996, 12 pages.

Ulm et al., "Material Invariant Poromechanics Properties of Shales," 2005, 8 pages.

Ulm et al., "The Nanogranular Nature of Shale," Acta Geotechnica, Springer, Jun. 15, 2006, 1:2, 12 pages.

Van Zanten et al., "Advanced Viscoelastic Surfactant Gels for High-Density Completion Brines," SPE-143844-MS, Society of Petroleum Engineers (SPE), presented at the SPE European Formation Damage Control Conference, Noordwijk, The Netherlands, Jun. 7-10, 2011, 7 pages.

Van Zanten, "Stabilizing Viscoelastic Surfactants in High-Density Brines," SPE-141447-PA, Society of Petroleum Engineers (SPE), SPE Drill & Compl 26:4 (499-505), 7 pages.

Vanlandingham, "Review of Instrumented Indentation," Journal of Research of the National Institute of Standards and Technology, Jul.-Aug. 2003, 108:4 (249-265), 17 pages.

Vernik et al., "Ultrasonic Velocity and Anisotropy of Hydrocarbon Source Rocks," Geophysics, May 1992, 57:5 (727-735), 9 pages.

Walters et al., "Kinetic rheology of hydraulic fracturing fluids," SPE 71660, Society of Petroleum Engineers (SPE), SPE Annual Technical Conference and Exhibition, Sep. 30-Oct. 3, 2001, 12 pages.

Wang and Samuel, "Geomechanical Modelling of Wellbore Stability in Salt Formations, 3D Geomechanical Modeling of Salt-Creep Behavior on Wellbore Casing for Presalt Reservoirs," SPE Drilling and Completion, 31(04): 261-272, Sep. 2013, 13 pages.

Wang et al, "A Feasibility Analysis on Shale Gas Exploitation with Supercritical Carbon Dioxide," Energy Sources, Part A: Recovery, Utilization, and Environmental Effects 2012, 34:15 (1426-1435), 11 pages.

Wang et al. "Iron Sulfide Scale Dissolvers: How Effective Are They?" SPE 168063, Society of Petroleum Engineers (SPE), presented at the SPE Saudi Arabia Section Annual Technical Symposium and Exhibition, May 19-22, 2013, 22 pages.

Wang et al., "A New Viscoelastic Surfactant for High Temperature Carbonate Acidizing," SPE-160884-MS, Society of Petroleum Engineers (SPE), presented at the SPE Saudi Arabia Section Technical Symposium and Exhibition, Al-Khobar, Saudi Arabia, Apr. 8-11, 2012, 18 pages.

Wang et al., "A Numerical Study of Factors Affecting the Characterization of Nanoindentation on Silicon," Materials Science and Engineering: A, Feb. 25, 2007, 447:1 (244-253), 10 pages.

Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, 2004, 41:2 (245-253), 9 pages.

Warpinski, "Understanding Hydraulic Fracture Growth, Effectiveness, and Safety Through Microseismic Monitoring," Chapter 6, in Effective and Sustainable Hydraulic Fracturing, Intech, May 17, 2013, 14 pages.

Warren and Root, "The Behavior of Naturally Fractured Reservoirs," SPE 426, Society of Petroleum Engineers (SPE), SPE Journal, Sep. 1963, 3:3 (245-255), 11 pages.

Wegst et al., "Bioinspired Structural Materials," Nature Materials, Jan. 2015, 14, 14 pages.

Weijermars et al., "Closure of open wellbores in creeping salt sheets" Geophysical Journal International, 196: 279-290, 2014, 12 pages.

Welton et al., "Anionic Surfactant Gel Treatment Fluid," SPE-105815-MS, Society of Petroleum Engineers (SPE), presented at the SPE International Symposium on Oilfield Chemistry, Houston, Feb. 28-Mar. 2, 2007, 8 pages.

Wenk et al., "Preferred Orientation and Elastic Anisotropy of Illite-Rich Shale," Geophysics, Mar.-Apr. 2007, 72:2 (E69-E75), 7 pages.

Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.

Wilson and Aifantis, "On the Theory of Consolidation with Double Porosity," International Journal of Engineering Science, 1982, 20:9 (1009-1035), 27 pages.

Wilson et al., "Fracture Testing of Bulk Silicon Microcantilever Beams Subjected to a Side Load," Journal of Microelectromechanical Systems, Sep. 1996, 5:3, 9 pages.

Witten et al., "Structured Fluids: Polymers, Colloids, Surfactants," New York: Oxford University Press, 2010, 231 pages.

Wu et al., "A reusable biosensor chip for SERS-fluorescence dual mode immunoassay," Proc. SPIE 9543:954317-1, Third International Symposium on Laser Interaction with Matter, LIMIS 2014, May 4, 2015, 6 pages.

Wu et al., "A SERS-Assisted 3D Barcode Chip for High-Throughput Biosensing," Nano Micro Small Journal, Jun. 11, 2015, 11:23 (2798-2806), 9 pages.

Wu et al., "Extraction of kerogen from oil shale with supercritical carbon dioxide: Molecular dynamics simulations," the Journal of Supercritical Fluids, 107: 499-506, Jan. 2016, 8 pages.

Wurster et al., "Characterization of the fracture toughness of microsized tungsten single crystal notched specimens," Philosophical Magazine, May 2012, 92:14 (1803-1825), 23 pages.

Wurzenberger et al., "Nitrogen-Rich Copper(II) Bromate Complexes: an Exotic Class of Primary Explosives," Journal of Inorganic Chemistry, 2018, 57: 7940-7949, 10 pages.

Xu et al., "Anisotropic elasticity of jarosite: A high-P synchrotron XRD study," American Mineralogist, 2010, 95:1 (19-23), 5 pages.

Xu et al., "Measurement of two-photon excitation cross sections of molecular fluorophores with data from 690 to 1050 nm," Journal of the Optical Society of America B, Mar. 1996, 13:3, 11 pages.

Yang et al., "Nanoscale geochemical and geomechanical characterization of organic matter in shale," Nature Communications, Dec. 19, 2017, 8:2179, 9 pages.

Yang et al., "Viscoelastic Evaluation of Gemini Surfactant Gel for Hydraulic Fracturing," SPE-165177-MS, Society of Petroleum Engineers (SPE), presented at the SPE European Formation Damage Conference and Exhibition, Noordwijk, The Netherlands, Jun. 5-7, 2013, 5 pages.

Yoldas, "Alumina gels that form porous transparent Al2O2," Journal of Materials Science, 1975, 10: 1856-1860, 5 pages.

Yu et al., "Impact of Hydrolysis at High Temperatures on the Apparent Viscosity of Carboxybetaine Viscoelastic Surfactant-Based Acid: Experimental and Molecular Dynamics Simulation Studies," SPE-142264-PA, Society of Petroleum Engineers (SPE), SPE J. 2012, 17:4 (1119-1130), 12 pages.

(56) References Cited

OTHER PUBLICATIONS

Yu et al., "Propagation and Retention of Viscoelastic Surfactants Following Matrix-Acidizing Treatments in Carbonate Cores," SPE-128047-PA, Society of Petroleum Engineers (SPE), SPE J. 2011, 16:4 (993-1001), 9 pages.

Zamberi et al., "Improved Reservoir Surveillance Through Injected Tracers In A Saudi Arabian Field: Case Study," SPE 166005, Society of Petroleum Engineers (SPE), presented at SPE Reservoir Characterization and Simulation Conference and Exhibition, Sep. 16-18, 2013, 15 pages.

Zeilinger et al., "Improved Prediction of Foam Diversion in Matrix Acidizing," SPE-29529-MS, Society of Petroleum Engineers (SPE), presented at the Production Symposium, Oklahoma City, Oklahoma, Apr. 2-4, 1995, 13 pages.

Zemel, "Chapter 3: Interwell Water Tracers," Tracers in the Oil Field, 43:1, Elsevier Science, Jan. 13, 1995, 47 pages.

Zeszotarski et al., "Imaging and Mechanical Property Measurements of Kerogen via Nanoindentation," Geochimica et Cosmochimica Acta, Oct. 15, 2004, 68:20 (4113-4119), 7 pages.

Zhao et al., "A New Fracturing Fluid for HP/HT Applications," SPE-174204-MS, Society of Petroleum Engineers (SPE), presented at the SPE European Formation Damage Conference and Exhibition, Budapest, Hungary, Jun. 3-5, 2015, 17 pages.

Zhou et al., "Upconversion luminescent materials: advances and applications," American Chemical Society (ACS), Chemical Reviews, Jan. 14, 2015, 115: 395-465, 71 pages.

Zielinski et al, "A Small-Angle Neutron Scattering Study of Water in Carbon Dioxide Microemulsions," Langmuir 1997, 13:15 (3934-3937), 4 pages.

Zimmerman and Bodvarsson, "Hydraulic Conductivity of Rock Fractures," transport in Porous Media, Jan. 1996, 23: 1-30, 31 pages.

PCT International Search Report and Written Opinion in International Appln. No. PCT/US2020/067357, dated Apr. 29, 2021, 15 pages.

\* cited by examiner

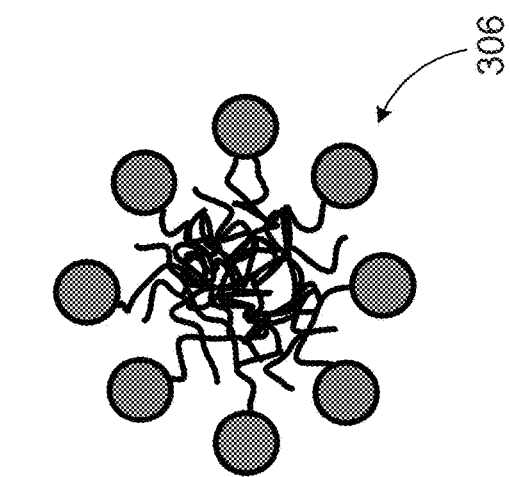
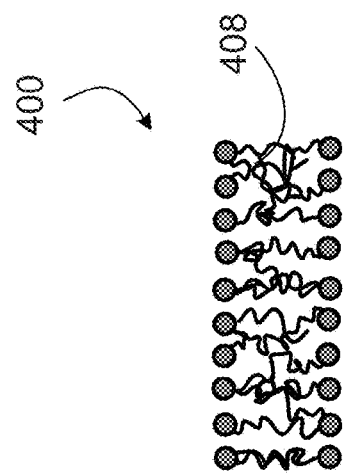
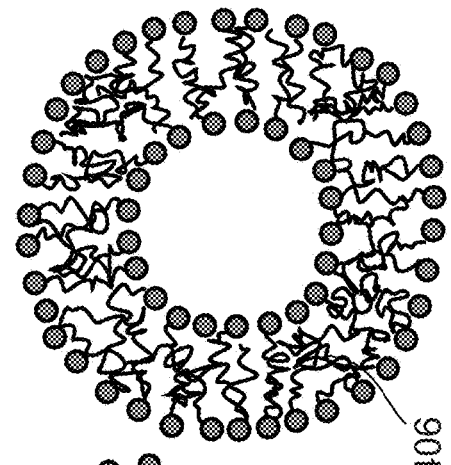
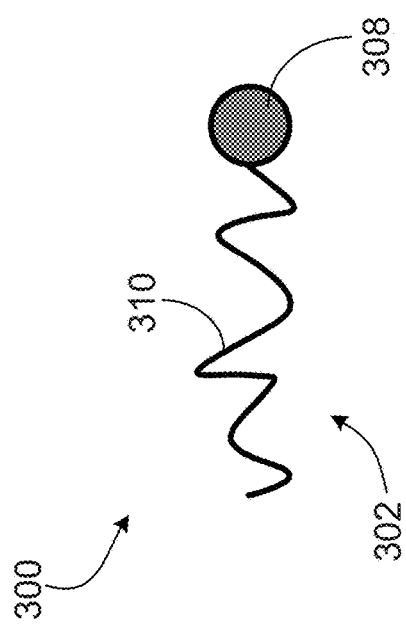
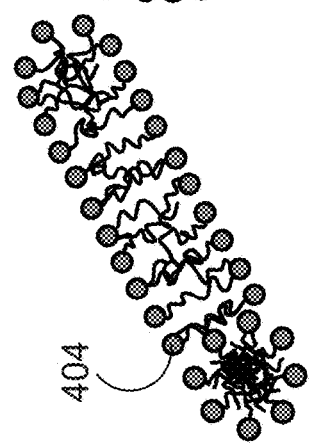
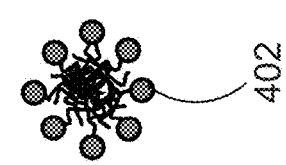
FIG. 3
FIG. 4

Table 1. Solution Parameters

| Sample | Water (mL) | VES (mL) | CaCl$_2$·2H$_2$O (g) | CaCl$_2$ (m) | NaBrO$_3$ (g) | NaBrO$_3$ (m) | Total ion molality |
|---|---|---|---|---|---|---|---|
| 1 | 135 | 7.5 | 7.5 | 0.34 | 0 | 0 | 1.02 |
| 2 | 135 | 7.5 | 7.5 | 0.35 | 3.75 | 0.166 | 1.35 |
| 3 | 135 | 7.5 | 0 | 0 | 15.5 | 0.685 | 1.37 |

FIG. 11

Table 2. Solution Parameters

| Sample | Water (mL) | VES (mL) | Volume of Polymer Added | NaBrO$_3$ (g) | NaBrO$_3$ (m) |
|---|---|---|---|---|---|
| 4 | 135 | 7.5 | 1.5 mL | 15.5 | 0.685 |
| 5 | 135 | 7.5 | 3.0 mL | 15.5 | 0.685 |
| 6 | 135 | 7.5 | 4.5 mL | 15.5 | 0.685 |

FIG. 13

VISCOELASTIC-SURFACTANT FRACTURING FLUIDS HAVING OXIDIZER

CROSS-REFERENCE TO RELATED APPLICATIONS

This application claims the benefit of U.S. Provisional Application Ser. No. 62/955,717, filed Dec. 31, 2019, the entire contents of which are incorporated herein by reference in its entirety.

TECHNICAL FIELD

This disclosure relates to hydraulic fracturing.

BACKGROUND

Hydraulic fracturing employs fluid and material to generate fractures in a geological formation to stimulate production from oil and gas wells. Hydraulic fracturing is a well-stimulation technique in which rock is fractured by a pressurized fluid that may be a fracturing fluid. The process can involve the pressure injection of fracturing fluid into a wellbore to generate cracks in the deep-rock formations through which natural gas, petroleum, and brine will flow more freely. The fracturing typically generates paths that increase the rate at which production fluids, such as crude oil or natural gas, can be produced from the reservoir formations. The amount of increased production may be related to the amount of fracturing. Proppant may be employed to maintain the fractures as pressure depletes in the well during hydrocarbon production. The proppant may resist formation closure stresses to keep fractures open.

Hydraulic fracturing may allow for the recovery of crude oil and natural gas from unconventional formations that geologists once believed were impossible to produce. Unconventional source rocks may be organic-rich sedimentary deposits, such as shales and mud rocks. The organic components of the source shale may include hydrocarbon-source material kerogen and its produced components bitumen and pyrobitumen.

SUMMARY

An aspect relates to a method of hydraulic fracturing. The method includes providing a viscoelastic surfactant (VES) fracturing fluid having a surfactant and an inorganic oxidizer salt through a wellbore into a geological formation to hydraulically fracture the geological formation to form hydraulic fractures in the geological formation. The method includes oxidizing organic material in the hydraulic fractures with the VES fracturing fluid.

Another aspect relates to a method including pumping a reactive VES fracturing fluid having a surfactant and an inorganic oxidizer salt through a wellbore into a geological formation for hydraulic fracturing of the geological formation. The method includes forming hydraulic fractures in the geological formation with the reactive VES fracturing fluid. Further, the method includes oxidizing organic material in the hydraulic fractures with the reactive VES fracturing fluid. The method includes generating a permeable channel through organic material at a fracture face of a hydraulic fracture between the geological formation and the hydraulic fracture via oxidizing of the organic material at the fracture face with the reactive VES fracturing fluid.

Yet another aspect relates a reactive VES fracturing fluid for hydraulic fracturing of a geological formation. The reactive VES fracturing fluid includes a surfactant at a concentration in the reactive VES fracturing fluid in a range of 0.1 weight percent (wt %) to 10 wt %. The reactive VES fracturing fluid includes an inorganic oxidizer salt for the reactive VES fracturing fluid to degrade kerogen in the geological formation.

Yet another aspect relates to a reactive VES fracturing fluid for hydraulic fracturing of a subterranean formation. The reactive VES fracturing fluid includes water and a surfactant at a concentration in the reactive VES fracturing fluid in a range of 0.5 wt % to 7 wt %. The reactive VES fracturing fluid includes an inorganic oxidizer salt for the reactive VES fracturing fluid to oxidize kerogen in the subterranean formation to fragment the kerogen.

Yet another aspect relates to a method of applying a reactive VES-based fluid. The method includes providing the reactive VES-based fluid having a surfactant and an inorganic oxidizer salt through a wellbore into a subterranean formation. The concentration of the inorganic oxidizer salt in the reactive VES-based fluid is in a range of 1 wt % to 20 wt %. The method includes oxidizing organic material in the subterranean formation with the reactive VES-based fluid.

The details of one or more implementations are set forth in description and in the accompanying drawings. Other features and advantages will be apparent from the description, drawings, and the claims.

BRIEF DESCRIPTION OF DRAWINGS

FIG. 3 is a diagram of micellization in which surfactant molecules in aqueous solution form into a colloidal structure that is a surfactant micelle.

FIG. 4 is a diagram of micelle shapes (types).

FIG. 11 is Table 1 giving solution parameters for the three VES fluid samples prepared for viscosity measurement in Example 1.

FIG. 13 is Table 2 giving solution parameters for the three VES fluids prepared with the polymer additive FP9515SH for viscosity measurement in Example 2.

DETAILED DESCRIPTION

Figure 1:
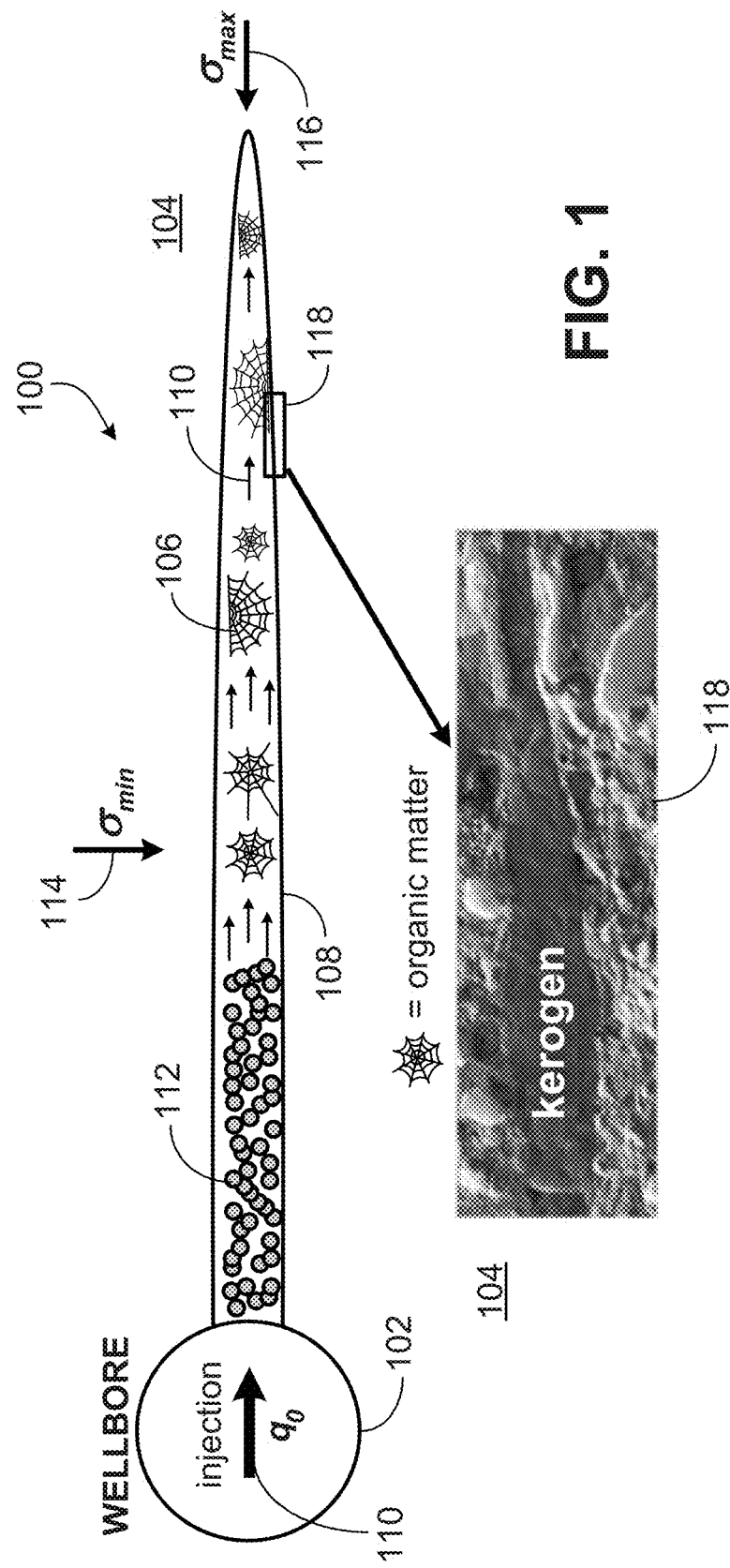
FIG. 1 is a diagram of a well including a wellbore formed in a geological formation having organic matter, such as kerogen.

Some aspects of the present disclosure are directed to hydraulic fracturing fluids that are viscoelastic surfactant-based and bear an oxidizing component(s) (oxidizer). The hydraulic fracturing fluid includes a viscoelastic surfactant (VES) that forms micelles to increase viscosity of the hydraulic fracturing fluid as a VES-based fluid. The increase in viscosity may be beneficial for conveying of proppant by the VES-based hydraulic fracturing fluid.

A first salt may be added to the VES-based hydraulic fracturing fluid to drive formation of the micelles. The first salt may be, for example, a monovalent or divalent salt. A second salt (for example, an inorganic oxidizer salt) may be added as an oxidizing component of the VES-based hydraulic fracturing fluid to give a reactive VES-based hydraulic fracturing fluid. This second salt as an oxidizer may provide for attack of organic material (for example, kerogen) in the geological formation treated by the reactive VES-based hydraulic fracturing fluid. The second salt may also further promote formation of micelles in the VES-based hydraulic-fracturing fluid. Both the first salt (monovalent or divalent) and the second salt (oxidizer) are inert to oxidation.

In certain embodiments, the first salt (monovalent or divalent salt) is not added to the reactive VES-based hydraulic-fracturing fluid. Instead, the second salt (oxidizer) provides for the formation of the micelles. In some embodiments, a polymer may be optionally added to reactive VES-based hydraulic-fracturing fluid to enhance the increase in viscosity. In implementations, the second salt (and first salt if included) may act as a breaker of the viscosity of the reactive VES-based hydraulic-fracturing fluid with or without a polymer loading.

In some applications, the VES-based fluid containing oxidative materials (for example, oxidizer salt) may be pumped as a stand-alone hydraulic fracturing treatment to fracture the geological formation and transport proppant. The VES-based fluid containing oxidative materials and proppant may be pumped alternatively with VES-based fluid containing oxidative materials and no proppant as a hybrid treatment. The VES-based fracturing fluid may be pumped as part of a channel fracturing operation. Channel fracturing may refer to hydraulic fracturing treatment employing intermittent pumping of proppant-laden fluid and proppant-free fluid to generate conductive channels within the formation.

In other embodiments, the VES-based fluid containing oxidative materials is pumped alternatively with carbon dioxide ($CO_2$)-based fluids that optionally contain oxidizers for breaking down kerogen. A benefit may be that $CO_2$ slugs can enhance the delivery of oxidizer to the kerogen and better expel hydrocarbons from the geological formation. If employed, the $CO_2$-based fluid with oxidizer may contain organic oxidizers, reactive gases, or in-situ forming halogens, or any combinations of these. The $CO_2$-based fluid with oxidizer may be foamed in some instances.

The VES-based hydraulic-fracturing fluid may be premixed, for example, in a batch mix vessel and then pumped downhole through a wellbore in a geological formation for the hydraulic fracturing of the geological formation. The amount of components (for example, surfactant or oxidizer salt) added to the mix vessel (for example, a batch mix vessel (may be adjusted in response to the hydraulic-fracturing conditions and the amount of kerogen or other organic matter in the subterranean region of the geological formation being treated. In certain embodiments, at least some of the surfactant or oxidizer salt is added to a conduit on the discharge of the pump conveying the VES-based hydraulic-fracturing fluid. The amount of the oxidizer salt added to the conduit (or to the mix vessel) may be adjusted (for example, in real time) in response to the hydraulic-fracturing conditions and the amount of kerogen or other organic matter in the fractures of the geological formation.

It should be understood that the phrase "VES fluid" as utilized in the present disclosure generally refers to a "VES-based fluid" in that the fluid contains more than a VES. Similarly, the phrase "VES hydraulic fracturing fluid" generally refers to a VES-based hydraulic fracturing fluid" in that the hydraulic fracturing fluid contains more than a VES. Further, a VES-based fluid having the VES may include water as a base fluid.

While the present discussion may at times focus on the VES-based fluid as a VES-based hydraulic fracturing fluid, the present VES-base fluid may also be a VES-based treatment fluid for treatments other than hydraulic fracturing. The other treatments may be independent (or separate) from hydraulic fracturing or in combination with hydraulic fracturing. Implementations of treatments with the VES-based treatment fluid include: (1) degradation of filter cake during open hole drilling or during hydraulic fracturing; (2) upgrading oil in the subterranean formation (geological formation) by reducing the viscosity and boiling point of the oil; (3) breaking organic matter (for example, paraffin, bitumen, or oil) in the subterranean formation by reducing the viscosity of the organic matter; and (4) oxidizing organic scale (buildup) in a subterranean formation to remove (clean-up) the organic scale to promote subsequent fluid injection into the subterranean formation for the wellbore employed in an injection well.

Production from unconventional source-rock formations has become economically viable. The technology for accessing these reservoirs continues to advance as the industry improves drilling, completion, and stimulation techniques. Unconventional source-rock reservoirs differ from conventional reservoirs at least due to the presence of the hydrocarbon source material, such as kerogen and kerogen-produced components, in unconventional source-rock reservoirs. This hydrocarbon source material as irregular organic matter can represent 5-10 weight percent (wt %) [or 10-20 volume percent (vol %)] of the sedimentary source-rock formation. An assortment of minerals are woven and compacted together with the organic matter (for example, kerogen) resulting in a complex hierarchical structure with toughness and strength characteristics similar to other natural materials. The tensile characteristics of the organic matter have been demonstrated by nanoindentation of organic-rich shale micro/nano-cantilever source-shale beams tested under a scanning electron microscope (SEM). The chemomechanical characteristics of the organic matter implicate a problematic role of the organic matter in the tensile stresses in hydraulic fracturing and in overall mechanical and chemical operational success of the fracturing. The interwoven organic matter that the fracturing fluid encounters as the fracture extends into the source rock formation is further discussed with respect to FIG. 1.

FIG. 1 is well 100 having a wellbore 102 formed in a geological formation 104 having organic matter 106 (organic material), such as kerogen. The wellbore 102 is depicted as a circular cross section. The geological formation 104 is a subterranean formation in the Earth's crust and may be an unconventional source-rock formation having hydrocarbon. The geological formation 104 may be an organic-rich shale zone. The spider-web symbol represents the presence of the organic matter 106.

In FIG. 1, a fracture 108 is being formed via injection of a fracturing fluid 110 (stimulation fluid) from the Earth's surface through the wellbore 102 into the geological formation 104. The fracturing fluid 110 may be injected at a specified flow rate ($q_o$). The flow rate ($q_o$) may be specified as a volumetric flow rate or mass flow rate. The fracturing fluid 110 may include proppant 112, such as sand or ceramic proppant. The fracture 108 may propagate perpendicular to a minimum principal stress 114 of the formation 104 and in a direction against a maximum principal stress 116 of the formation.

The schematic in FIG. 1 depicts the hydraulic fracture 108 extending from the wellbore 102. The fracturing fluid 110 system encounters the ductile organic matter 106 illustrated as spider webs. The presence of the organic matter 106 at the fracture face 118 may restrict the generation of permeable channels from the geological formation 104 into the fracture 108. Thus, the organic matter 106 may inhibit the subsequent production of hydrocarbon from the formation 104 into and through the fracture 108 to the wellbore 102 and Earth surface. The fracture face 118 may be an interface of the forming fracture 108 with the geological formation 104. Conventional hydraulic-fracturing stimulation fluids typically do not address challenges of fracturing organic-rich shale zones. The polymer-like organic material 106 may be intertwined within the organic material and with the rock. The organic material 106 affects fracturing (fracture) behavior and reduces resulting hydraulic conductivity.

Hydraulic fracturing fluids may include polymers or crosslinkers for viscosifying the fracturing fluids as proppant-carrying fluids. Developments in fracturing fluids (or stimulation fluid chemicals) have also included additives, such as polymer breakers, biocides, clay swelling inhibitors, and scale inhibitors. VES-based hydraulic fracturing fluids may be a cleaner alternative to polymer-based systems.

Among the most commonly-used fracturing fluids for unconventional formations are slickwater systems incorporating friction-reducing synthetic polymer that facilitates the pumping of stimulation fluids at large rates (for example, at least 100 barrels per minute). Moreover, the incorporation of gas into fracturing fluids may reduce water as a component of the fracturing fluid.

To address the challenge of improving hydraulic fracturing in unconventional source-rock reservoirs, embodiments of the present techniques include reactive fluids that can break down the polymer nature of the organic matter 106 on the hydraulic fracture faces 118. At the fracture face 118, organic matter 106 (for example, kerogen) is beneficially cracked open due to exposure to oxidizing conditions (for example, aqueous oxidizing conditions). Techniques to implement the oxidizing conditions via a fracturing fluid 110 include, for example: (1) inorganic oxidizers in aqueous fluids, (2) inorganic and organic oxidizers in carbon dioxide ($CO_2$), (3) inorganic or organic oxidizers in foamed mixtures of water and $CO_2$, and (4) reactive gases in $CO_2$.

Figure 2:
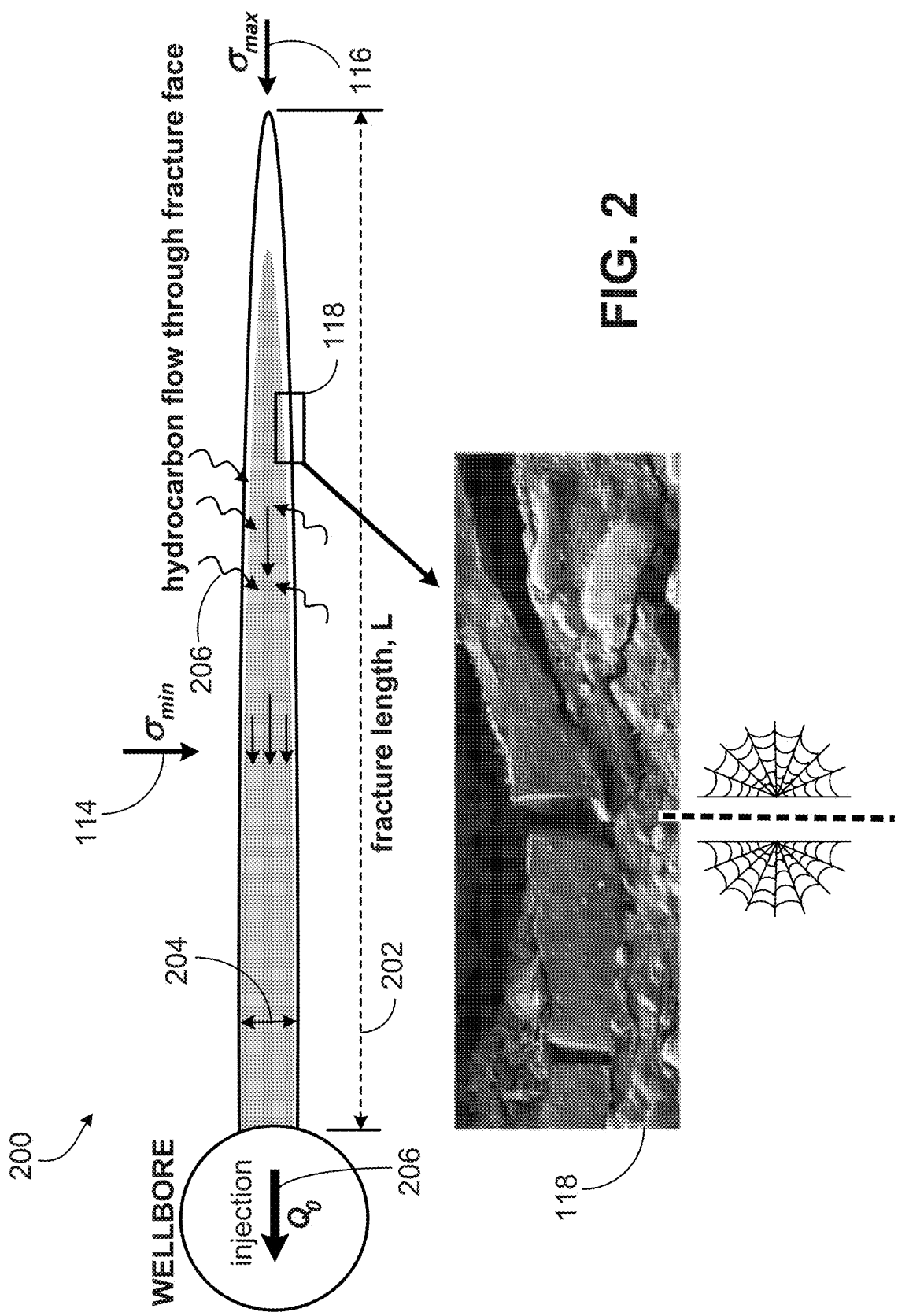
FIG. 2 a diagram of the well of FIG. 1 after a hydraulic fracture is formed and with the well in production.

FIG. 2 is a well 200 that is the well 100 of FIG. 1 after the hydraulic fracture 108 is formed and with the well 200 in production. FIG. 2 depicts the hydraulic fracture 108 extending from the wellbore 102. The fracture 108 has a length 202 and width 204. The fracturing fluid 110 (FIG. 1) that formed the fracture 108 was a VES fracturing fluid having an oxidizer that attacked the organic matter 106. Thus, the fracturing fluid 110 system caused organic matter 106 to crack open to generate permeable channels from the formation 104 into the fracture 108 and therefore provide for conductivity from the formation 104 through the fracture 108 to the wellbore 102. The well 200 as depicted is in production phase with produced hydrocarbon 206 flow from the geological formation 104 through the fracture 108 and wellbore 102 to the Earth surface. The flow rate of the produced hydrocarbon 206 may be labeled as $Q_0$ and may be a characterized as a volumetric flow rate or mass flow rate.

As discussed, VES-based systems may be combined with reactive fluid components for breaking down organic matter 106, such as kerogen, in the geological formation 104. This fracturing-fluid system may also be utilized to upgrade heavy oil or clean-up organic residues.

VES-based fluids generally differ from conventional polymer-based fracturing fluid systems. Polymer-based fracturing fluids typically incorporate a water-soluble polymer, crosslinker, and breaker. A viscous polymer-based fluid (for example, a gel at greater than 10 centipoise [cP]) is pumped into a geological formation and with the fluid gel transporting proppant into a fracture network. Then, the gel is broken by enzyme or oxidizer and the fluid flowed back from the formation to the surface. This process may be operationally complex in relying on polymer hydration and a variety of additives, such as biocides, crosslinkers, and breakers. By contrast, viscoelastic surfactants may be simpler to utilize in the field because typically there is no hydration step and because fewer additives may be included. For example, in the case of breakers, VES-based fluids can break in the formation by changes in brine concentration due to contact with produced fluids or alternatively by contact with hydrocarbons which disrupt the surfactant micelles of the VES-based fluid.

An advantage of VES-based fluids over polymer-based systems can be that VES-based fluids may typically be solids-free (except for any proppant). Therefore, in implementations, the VES-based fluids generally do not deposit residue in the geological formation or on the proppant pack. Thus, VES-based fluids may be more efficient than polymer-based systems in hydraulic-fracture reservoir stimulation because the conductivity of the in-place proppant pack affects well productivity.

In addition, VES-based fluids may heal after exposure to shear. Additives may further improve the shear re-healing time of the VES-based fluid gel. A benefit of healing may be that viscosity is maintained for conveying proppant. The self-healing may restore the micelles and hence the viscosity. The VES fluid experiences shear forces during pumping at the wellhead. The viscosity may be restored as the VES fluid goes into the wellbore and formation and thus perform hydraulic fracturing and convey proppant. Crosslinked polymer fluids, by contrast, can be irreversibly damaged during pumping because the shear forces cause some of the covalent bonds to break. The micelles of the VES fluid are not covalently held together and their formation is reversible. This may be an advantage of VES over crosslinked polymer for hydraulic fracturing.

Embodiments employ VES gels to hydraulically fracture unconventional source-rock formations. These gels may contain a specified amount of oxidizer that can break down organic material (for example, kerogen) in the subterranean formation. Thus, embodiments may combine the benefits of viscoelastic surfactants as fracturing fluids with the reactive capabilities of an oxidizer component to break down kerogen on the surface of the fractures. The reactive VES fluid may also be utilized to upgrade heavy oil (for example, bitumen or including bitumen) by breaking down the heavy oil and reducing viscosity of the heavy oil. Heavy oil may be crude oil having an American Petroleum Institute (API)

gravity less than 20°. The reactive VES fluid may also be utilized to clean downhole by removing organic residues from the surface of the rock formation deposited as a result of drilling, completion, and fracturing. The reactive VES fluid may dissolve filter cake in open-hole completions (both water injectors and hydrocarbon producers).

A purpose of the viscoelastic surfactant (for example, cationic, anionic, nonionic, zwitterionic or amphoteric, or a combination of cationic and anionic surfactants) is to form micelles to increase viscosity of the fluid to give the VES-based fluid. Cylindrical (truncated) or wormlike micelles give greater fluid viscosity than spherical micelles. Spherical micelles generally do not produce viscosity. Truncated cylindrical micelles may make worm-like or rod-like micelles that entangle to give viscosity. VES-based systems may include a surfactant capable of forming a wormlike micelle that can entangle and thus impart viscosity to the fluid. The fluid system typically includes salt to drive formation of the micelles, such as worm-like micelles that entangle. VES-based fluids may also contain a breaker to disrupt the micelles and reduce the viscosity while in the formation to enhance flowback.

Surfactant selection may be an aspect of formulating a VES-based fracturing fluid. Under certain conditions, surfactant molecules arrange into colloidal structures called micelles as indicated earlier. With these structures, the hydrocarbon tails of the surfactants orient toward each other while the polar head groups form an interface with the surrounding aqueous media.

FIG. 3 depicts micellization 300 in which surfactant molecules 302 in aqueous solution form into a colloidal structure that is a surfactant micelle 306. The surfactant molecules 302 are a hydrocarbon chain having a polar head group 308 and a hydrocarbon tail 310. Surfactant micelles 306 form 304 spontaneously in aqueous solution when the surfactant concentration, c, exceeds the threshold referred to as the critical micelle concentration (cmc). The size and structure of the micelles 306 may be controlled by the selected charge and geometry of the surfactant molecules 302. The size and structure of the micelles 306 may be controlled by solution conditions, such as concentration of the surfactant molecules, type and concentration of salt, temperature, ionic strength, and shear rate.

FIG. 4 gives examples 400 of micelle shapes (types). Depicted are a spherical micelle 402, a cylindrical (worm-like) micelle 404, a vesicles (bilayer) micelle 406, and a lamellar micelle 408. For each micelle type, the respective qualitative prediction of shape may be based on the packing parameter.

The molecular packing parameter may provide for insight into the self-assembly phenomenon of the surfactant micelle as an aggregate. The molecular packing parameter is defined as $v_o l_o$, where $v_o$ and $l_o$ are the volume and the length of the surfactant tail and a is the surface area of the hydrophobic core of the aggregate expressed per molecule in the aggregate (here referred to as the area per molecule). For instance, for a spherical micelle with a core radius R, made up of g molecules, the volume of the core $V = g v_o = 4\pi R^3/3$ and the surface area of the core $A = ga = 4\pi R^2$. Hence, $R = 3 v_o/a$ from simple geometrical relations. If the micelle core is packed with surfactant tails without empty space, then the radius R cannot exceed the extended length $l_o$ of the tail. Introducing this constraint in the expression for R gives $0 \leq v_o/a l_o \leq 1/3$, for spherical micelles.

For spherical, cylindrical, or bilayer aggregates made up of g surfactant molecules, the geometrical relations for the volume V and the surface area A are given in Table 1. The variables V, A, and g in the table refer to the entire spherical aggregate, unit length of a cylindrical aggregate, or unit area of a bilayer aggregate, respectively, for the three shapes. These geometrical relations together with the constraint that at least one dimension of the aggregate (the radius of the sphere or the cylinder, or the half-bilayer thickness, all denoted by R) cannot exceed $l_o$ lead to the following connection between the molecular packing parameter and the aggregate shape: $0 \leq v_o/a l_o \leq 1/3$ for sphere, $1/3 \leq v_o/a l_o \leq 1/2$ for cylinder, and $1/2 \leq v_o/a l_o \leq 1$ for bilayer. Therefore, if the molecular packing parameter is known, the shape and size of the equilibrium aggregate can be readily identified. This is the predictive sense of the molecular packing parameter.

TABLE 1

Geometrical Relations for Spherical, Cylindrical, and Bilayer Aggregates

| Variable | Sphere | Cylinder | Bilayer |
|---|---|---|---|
| volume of core $V = g v_o$ | $4\pi R^3/3$ | $\pi R^2$ | $2R$ |
| surface area of core $A = ga$ | $4\pi R^2$ | $2\pi R$ | $2$ |
| area per molecule a | $3 v_o/R$ | $2 v_o/R$ | $v_o/R$ |
| packing parameter $v_o/a l_o$ | $v_o/a l_o \leq 1/3$ | $v_o/a l_o \leq 1/2$ | $v_o/a l_o \leq 1$ |
| largest aggregation number $g_{max}$ | $4\pi l_o^3/3 v_o$ | $\pi l_o^2/v_o$ | $2 l_o/v_o$ |
| aggregation number g | $g_{max}(3 v_o/a l_o)^3$ | $g_{max}(2 v_o/a l_o)^2$ | $g_{max}(v_o/a l_o)$ |

Variables V, A, g, and $g_{max}$ refer to the entire spherical aggregate, unit length of a cylinder or unit area of a bilayer. R is the radius of spherical or cylindrical micelle or the half-bilayer thickness of the spherical vesicle. $v_o$ and $l_o$ are the volume and extended length of the surfactant tail. The variable $g_{max}$ is the largest aggregation number possible for the given geometry based on the constraint that the aggregate core is filled and the tail cannot stretch beyond its extended length.

Changes to the surfactant molecule or solution conditions influence the micelle structure. Surfactant molecules with polar head groups that are large (for example, greater than 8 carbons) may promote the formation of spherical micelles. Surfactant molecules with polar head groups that are small (for example, less than 8 carbons) should encourage lamellae formation. For instance, nonionic surfactants with small ethylene-oxide head groups (small number of carbons, m<8) should favor bilayer and lamellae structures. However, nonionic surfactants with larger head groups (for example, m=10, 12, 14, or 16) may yield cylindrical or wormlike micelles. Further, salt addition to ionic surfactant solutions generally causes a transition from spherical to cylindrical micelles. For example, the cationic surfactant hexadecyltrimethylammonium bromide (also referred to as cetyltrimethylammonium bromide or CTAB) forms spherical micelles in aqueous solution. Upon addition of sodium nitrate ($NaNO_3$) to the surfactant solution, the spherical micelles transform into wormlike micelles.

In addition to surfactant selection, formulation of the present VES-based fracturing fluid may further include salt selection, oxidizer selection, and selection of any polymer loading. The salts utilized may interact electrostatically with the polar head groups and thereby reduce head group repulsion. This may cause a structural change to the micelle to ideally form wormlike micelles that can entangle with one another and cause the viscosity of the VES-based fracturing fluid to increase. A wide range of salts are capable of interacting in this manner. These salts can include monovalent or divalent salts. Salts that that are inert to oxidation may be desired.

As for oxidizer selection, the oxidizers employed in this application should demonstrate reactivity toward kerogen. To this end, salts of chlorate and bromate are examples. Both are reactive toward kerogen. Further, both alkali and alkaline earth metal salts are suitable. The oxidizers employed should be nonreactive towards the surfactant molecules in the fracturing fluid at ambient and reservoir temperatures for the time period of pumping so that the fluid can maintain viscosity throughout the pumping time. Alternatively, oxidizers may be selected that are instead (or also) reactive towards heavy oil or organic residues in the formation so that this reactive VES fluid could be utilized for upgrading oil or well cleanup.

With respect to polymer loading, polymers are commonly used in hydraulic fracturing fluids to create viscosity. However, such polymers are known to damage the formation. A traditional VES fluid is advantageous in its lack of polymer additives. This makes VES fluids less damaging to the formation. However, in present embodiments, the oxidizing salt in the reactive VES fluid gives the fluid the capacity to "break" including to break polymers in the VES fluid. Thus, in certain implementations, polymer can be added to the reactive VES fluid to boost viscosity of the VES fluid and increase efficacy of the fracturing operation without inflicting damage to the formation. The polymer added may include, for example, acrylamide acrylic acidic copolymer, polyvinyl pyrrolidone, polyethylene oxides, and natural polymers. The acrylamide acrylic acidic copolymer may be 2-acrylamido-2-methylpropane sulfonic acid (AMPS). Natural polymers added may include guar, xanthan gum, and cellulose.

Embodiments of the reactive VES-based fluid for hydraulic fracturing include water and surfactant to form the VES-based fluid. The majority (>90 volume %) of the fluid is water. The amount of VES used for the fluid can range 4-8 volume % depending on the temperature and viscosity requirement. The hydraulic fracturing fluid as a reactive VES-based fluid includes an inorganic oxidizer salt. The inorganic oxidizer salt is included as an oxidizer or reactive component for the reactive VES-based fluid to attack organic matter in the subterranean formation. The inorganic oxidizer salt may also promote micelle formation for increased viscosity of the reactive VES fluid. The VES-based fluid may additionally include a monovalent or divalent salt that promotes micelle formation and is generally not an oxidizer. The reactive VES-based fluid may include organic compounds, such as phthalic acid, salicylic acid, or their salts. Other fluid additives in the reactive VES-based fluid may include a breaker, corrosion inhibitor, scale inhibitor, biocide, or pH buffer, or any combinations of these. The reactive VES-based fluid may include inorganic oxidizer salt as the sole salt to promote micelle formation and not include the monovalent salt or divalent salt.

The reactive VES-based fluid (hydraulic fracturing fluid) may have a concentration of the surfactant, for example, in a range of 0.1 weight percent (wt %) to 10 wt % or in a range of 0.5 wt % to 7 wt %, or at least 1 wt %. The surfactant may be, for example, a zwitterionic or amphoteric surfactant, a cationic surfactant, an anionic surfactant, a nonionic surfactant, or a combination of cationic and anionic surfactants.

The zwitterionic surfactant may be a betaine, phosphobetaine, or sultaines. The zwitterionic surfactant may include dihydroxyl alkyl glycinate, alkyl ampho acetate or propionate, alkyl amidoamine oxide, gemini VES, alkyl betaine, alkyl amidopropyl betaine, and alkylimino mono- or di-propionates derived from waxes, fats, or oils.

Figure 5:
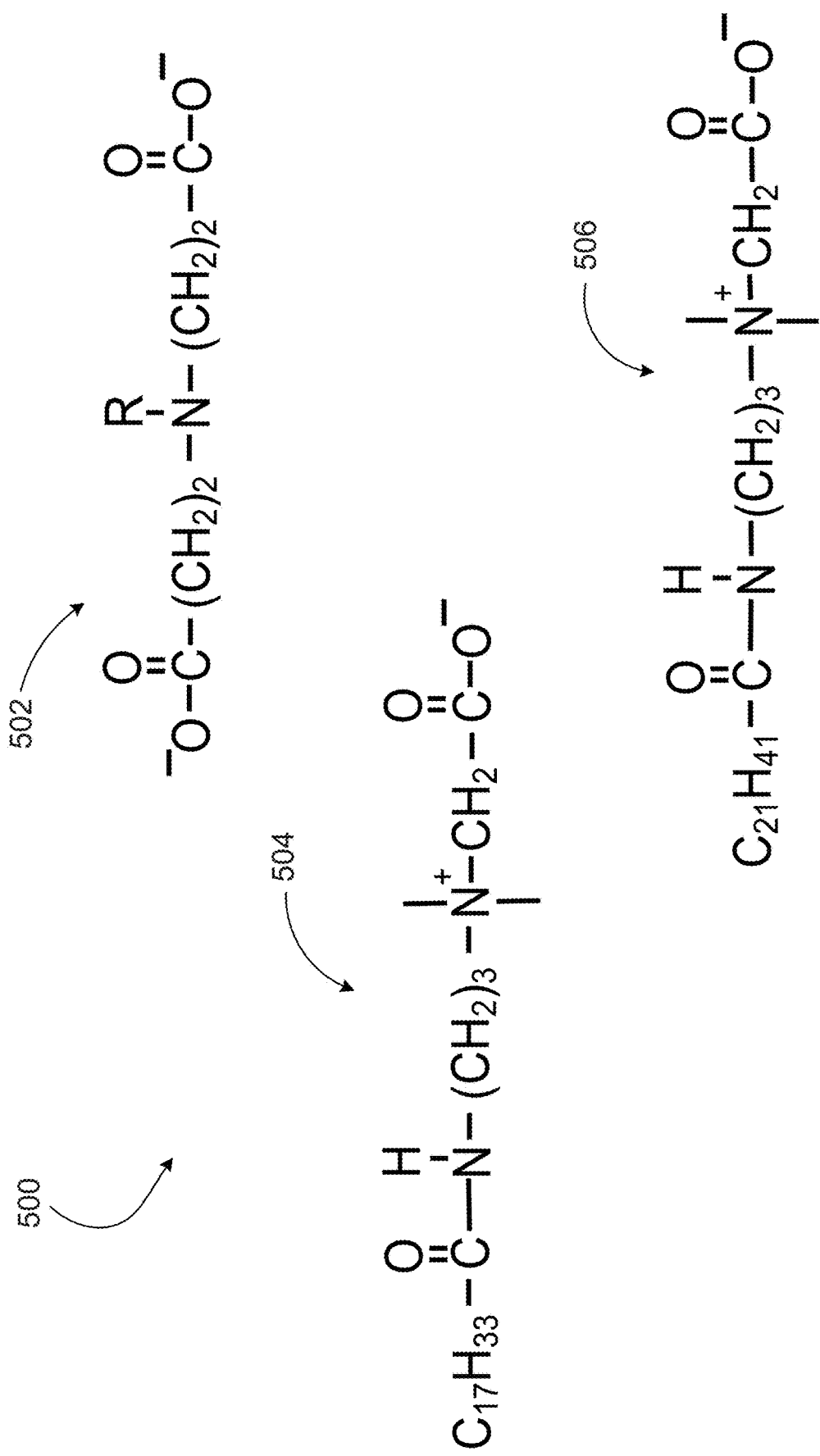
FIG. 5 is a diagram of exemplary chemical structures of zwitterionic surfactants that may be a surfactant in the reactive viscoelastic surfactant (VES)-based fluid.

FIG. 5 depicts exemplary structures 500 of a zwitterionic surfactant that may be the surfactant in the reactive VES-based fluid. These structures 500 include disodium tallowiminodipropionate 502, disodium oleamidopropyl betaine 504, and erucylamidopropyl betaine 506. For the tallowiminodipropionate 502, R=tallow.

Figure 6:
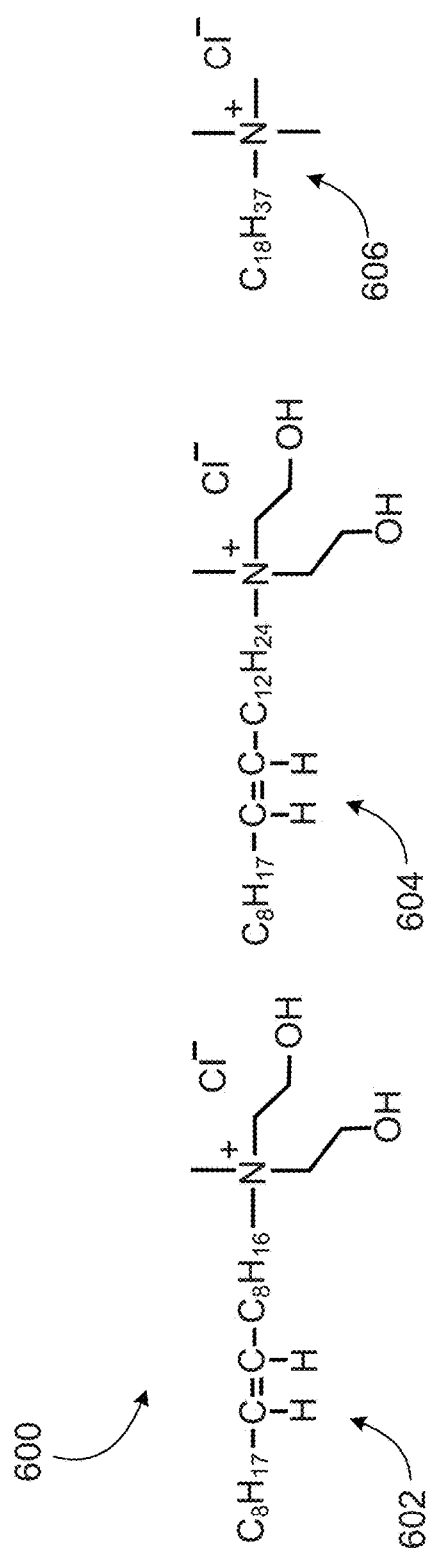
FIG. 6 is a diagram of exemplary chemical structures of cationic surfactants that may be a surfactant in the reactive VES-based fluid.

FIG. 6 depicts specific structures 600 of a cationic surfactant that may be the surfactant in the reactive VES-based fluid. These exemplary structures 600 for the cationic surfactant are alkylammonium salts and include oleyl methyl bis(2-hydroxyethyl)ammonium chloride 602, erucyl bis(2-hydroxylethyl)methylammonium chloride 604, and N,N,N, trimethyl-1-octadecammonium chloride 604. Other alkylammonium salts as the cationic surfactant may include, for example, cetyltrimethylammonium bromide (CTAB) or dimethylene-1,2-bis(dodecyldimethylammonium bromide). The cationic surfactant can be associated with inorganic anions, such as sulfate, nitrate, and halide. The cationic surfactant can be associated with organic anions, such as salicylate, functionalized sulfonates, chlorobenzoates, phenates, picolinates, and acetates. The cationic surfactant can alternatively be associated with an oxidizing anion, such as chlorate, bromate, perchlorate, chlorite, hypochlorite, persulfate, iodate, bromite, perborate, dichromate, permanganate, ferrate, percarbonate, nitrite, and nitrate.

Figure 7:
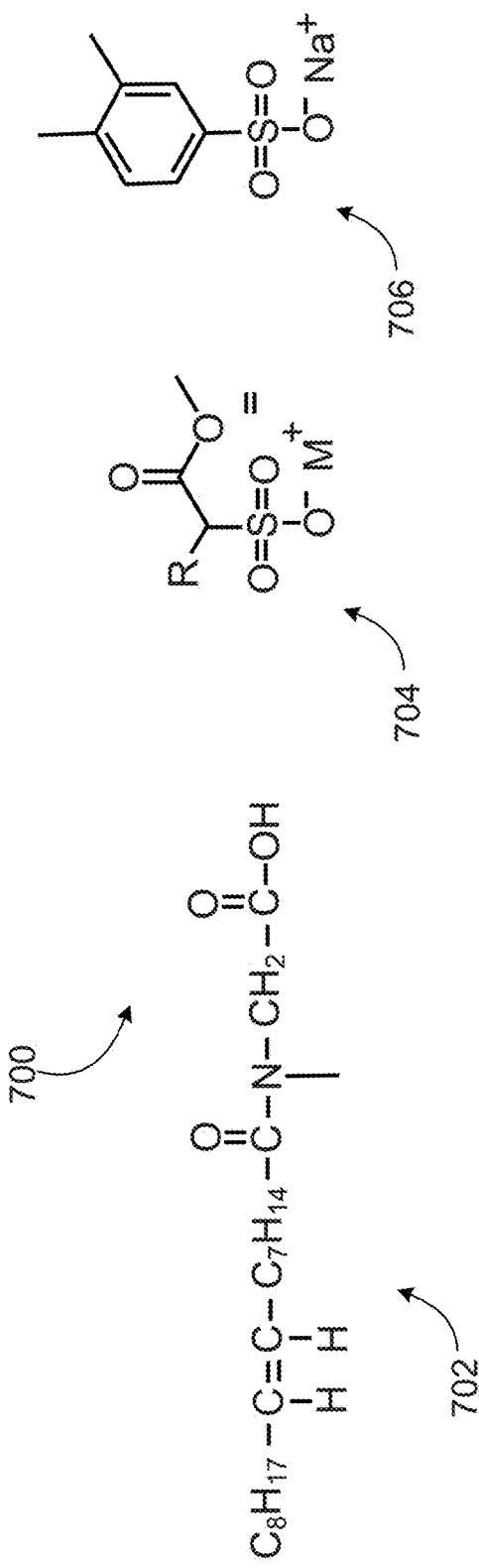
FIG. 7 is a diagram of exemplary chemical structures of anionic surfactants that may be a surfactant in the reactive VES-based fluid.
Figure 8:
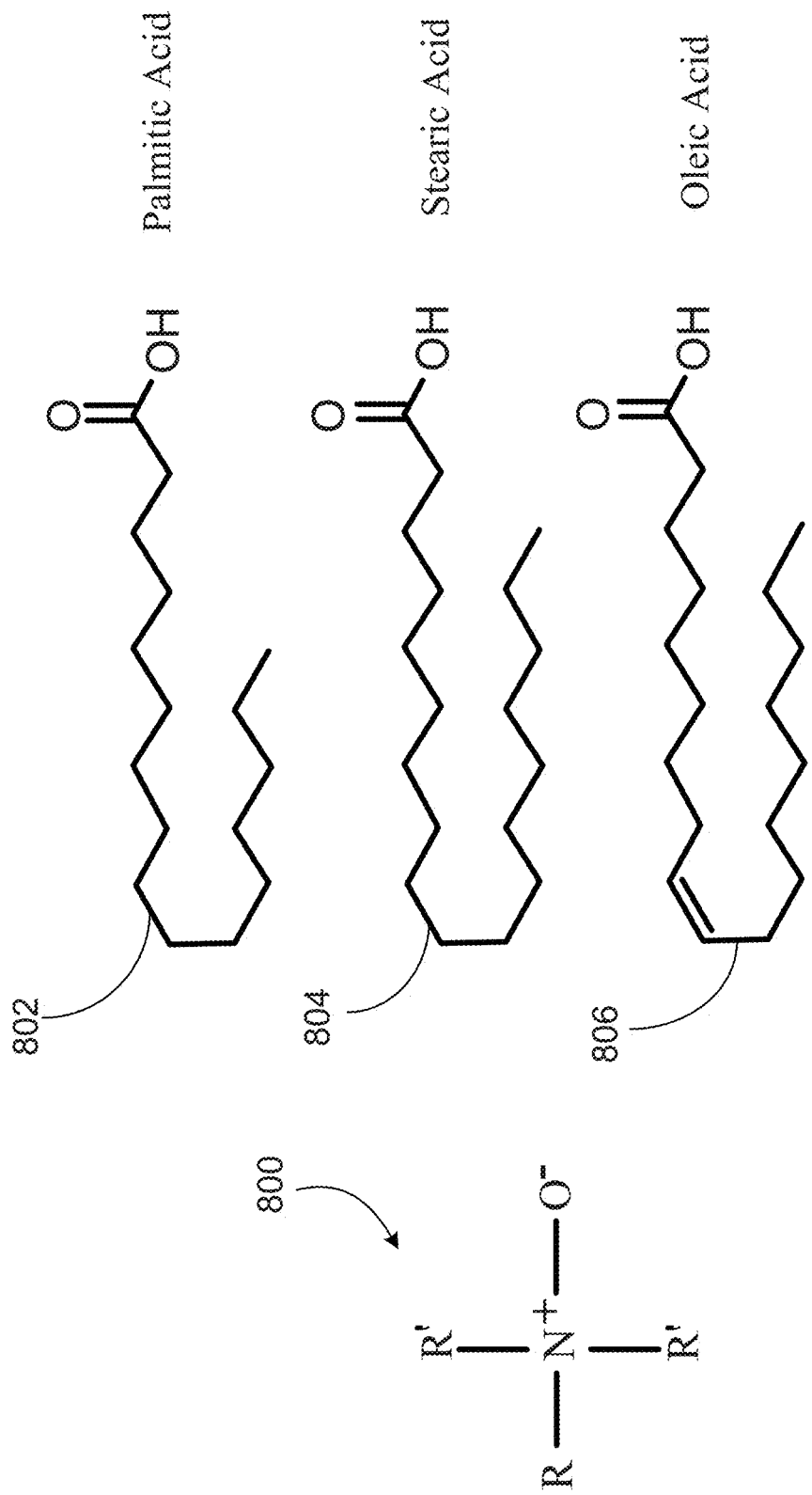
FIG. 8 is a diagram of exemplary chemical structures of nonionic surfactants that may be a surfactant in the reactive VES-based fluid.

Anionic surfactants for the reactive VES-based hydraulic fracturing fluid may include alkyl sarcosinates or sulfonates. FIG. 7 gives exemplary structures 700 of anionic surfactants that may be the surfactant in the VES hydraulic fracturing fluid. Oleoyl sarcosine 702 is an example of an alkyl sarcosinate. In implementations, the oleoyl sarcosine 702 may constitute about 94% of the sarcosinate product that is the surfactant. Methyl ester sulfonate 704 and sodium xylene sulfonate 704 are examples of sulfonates. For the methyl ester sulfonate 704 structure, R is an alkyl chain with 10-30 carbon atoms, Nonionic surfactants for the reactive VES-based hydraulic fracturing fluid may include amine oxides. Referring to FIG. 8, the amine oxide gelling agents have the structure 800 where R is an alkyl or alkylamido group averaging from about 8 to 27 carbon atoms and each R' is independently H, or an alkyl group averaging from about 1 to 6 carbon atoms. In implementations, R is an alkyl or alkylamido group averaging from about 8 to 16 carbon atoms and R' are independently alkyl groups averaging from about 2 to 3 carbon atoms. In a particular implementation, the amino oxide gelling agent is tallow amido propylamine oxide (TAPAO). Major components of the tallow amido substituent are palmitic acid 802, stearic acid 804, and oleic acid 806.

The reactive VES hydraulic fracturing fluid may include monovalent or divalent salts at a concentration in a range of 0 wt % to 50 wt %, in a range of 1 wt % to 50 wt %, in a range of 0 wt % to 15 wt %, in a range of 1 wt % to 15 wt %, or less than 15 wt %. These salts may promote micelle formation, such as wormlike or cylindrical micelles, to increase viscosity of the fracturing fluid. These monovalent or divalent salts may include lithium fluoride (LiF), sodium fluoride (NaF), potassium fluoride (KF), magnesium fluoride ($MgF_2$), calcium fluoride ($CaF_2$), strontium fluoride ($SrF_2$), barium fluoride ($BaF_2$), lithium chloride (LiCl), sodium chloride (NaCl), potassium chloride (KCl), magnesium chloride ($MgCl_2$), calcium chloride ($CaCl_2$), strontium chloride ($SrCl_2$), barium chloride ($BaCl_2$), lithium bromide (LiBr), sodium bromide (NaBr), potassium bromide (KBr), magnesium bromide ($MgBr_2$), calcium bromide ($CaBr_2$), strontium bromide ($SrBr_2$), and barium bromide ($BaBr_2$).

The reactive VES hydraulic fracturing fluid includes inorganic oxidizer salts in concentrations in a range of 1 wt % to 20 wt % or in a range of 1 wt % to 10 wt %. The concentration may generally be more including at the greater end of these ranges or greater (for example, 3 wt % to 20 wt % or 5 wt % to 25 wt %) for implementations where other salt (for example, a monovalent or divalent salt) is not included in the formulation for micelle formation. These inorganic oxidizer salts are an oxidizer or reactive component for the VES hydraulic fracturing fluid to attack and degrade organic material in the geological formation. The inorganic oxidizer salts are typically generally inert to oxidation. The oxidizer salts may include lithium chlorate ($LiClO_3$), sodium chlorate ($NaClO_3$), potassium chlorate ($KClO_3$), magnesium chlorate [$Mg(ClO_3)_2$], calcium chlorate [$Ca(ClO_3)_2$], strontium chlorate [$Sr(ClO_3)_2$], barium chlorate [$Ba(ClO_3)_2$], lithium bromate ($LiBrO_3$), sodium bromate ($NaBrO_3$), potassium bromate ($KBrO_3$), magnesium bromate [$Mg(BrO_3)_2$], calcium bromate [$Ca(BrO_3)_2$], strontium bromate [$Sr(BrO_3)_2$], and barium bromate [$Ba(BrO_3)_2$]. Other oxidizers may include magnesium peroxide, calcium peroxide, sodium nitrate, sodium nitrite, sodium persulfate, potassium persulfate, sodium tetraborate, sodium percarbonate, sodium hypochlorite, an iodate salt, a periodate salt, a dichromate salt, and a permanganate salt. The iodate salt may be a salt of $IO_3^-$ with lithium, sodium, potassium, magnesium, etc. Hydrogen peroxide as an oxidizer may also be used.

The inorganic oxidizer salts may promote formation of micelles, such as cylindrical or worm-like micelles, to increase viscosity of the fracturing fluid. Thus, both the inorganic oxidizer salt and the aforementioned monovalent or divalent salt may promote micelle formation. The combined concentration of the inorganic oxidizer salt and the monovalent or divalent salt in the VES hydraulic fracturing fluid may be at least 1 wt %, at least 3 wt %, at least 5 wt %, at least 7 wt %, at least 10 wt %, or at least 12 wt %, or at least 15 wt %. For implementations where a monovalent or divalent salt is not included in the formulation, the concentration of the inorganic oxidizer salt in the reactive VES hydraulic fracturing fluid may be at least 3 wt %, at least 5 wt %, at least 7 wt %, or at least 10 wt %. These concentrations of the inorganic oxidizer may also be employed with the presence of a monovalent or divalent salt.

As mentioned, the reactive VES-based fluid may include organic compounds, such as phthalic acid, salicylic acid, or their salts. The salicylate or other ion in the presence of the surfactant may cause the viscoelastic gel to form. The acid (nonionic) form of these compounds causes the viscoelasticity development to be delayed until the pH is altered (raised) and the anion is released. For example, the pH may be raised by adding urea that is hydrolyzed as the solution starts to heat after pumping into the wellbore and formation. This is a way of imparting some control over when the viscoelasticity develops. In some cases, carboxylic acid and the —OH group in salicylic acid interacts with the quaternary ammonium group of VES and acts as a crosslinker to link and make the micelles more robust. This aids formation of stable micelles and thus stable viscosity at formation temperatures. As also mentioned, other fluid additives in the reactive VES-based fluid may include a breaker, corrosion inhibitor, scale inhibitor, biocide, or pH buffer, or any combinations of these.

Figure 9:
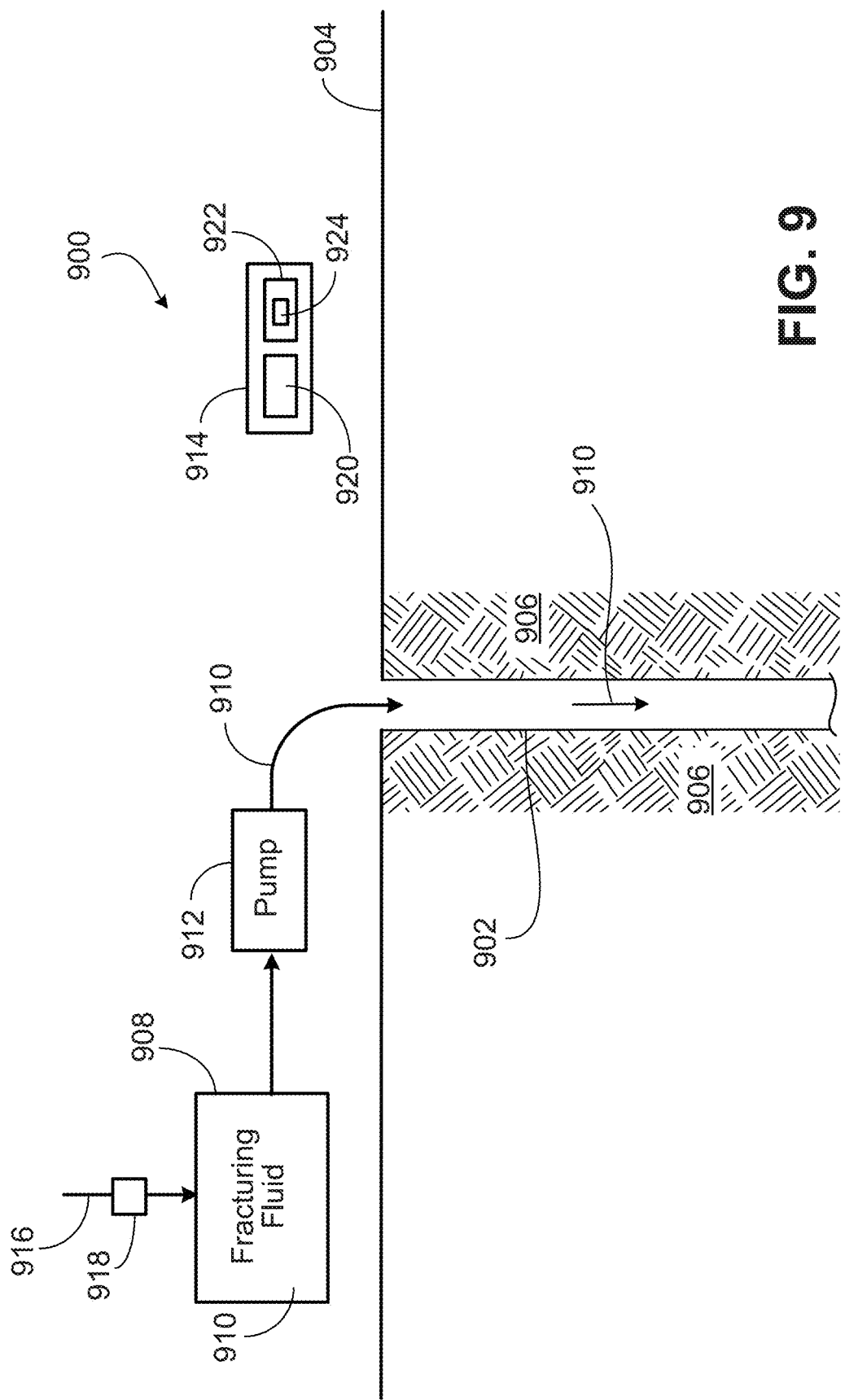
FIG. 9 is a diagram of a well system having a wellbore formed through the Earth surface into a geological formation in the Earth crust.

FIG. 9 is a well site 900 having a wellbore 902 formed through the Earth's surface 904 into a geological formation 906 in the Earth's crust. The geological formation 906 may be labeled as a subterranean formation, a rock formation, or a hydrocarbon formation. The geological formation 906 may be an unconventional formation to be subjected to hydraulic fracturing.

The wellbore 902 can be vertical, horizontal, or deviated. The wellbore 902 can be openhole but is generally a cased wellbore. The annulus between the casing and the formation 906 may be cemented. Perforations may be formed through the casing and cement into the formation 906. The perforations may allow both for flow of fracturing fluid into the geological formation 906 and for flow of produced hydrocarbon from the geological formation 906 into the wellbore 902.

The well site 900 may have a hydraulic fracturing system including a source 908 of fracturing fluid 910 at the Earth surface 904 near or adjacent the wellbore 902. The source 108 may include one or more vessels holding the fracturing fluid 910. The fracturing fluid 110 may be stored in vessels or containers on ground, on a vehicle (for example, truck or trailer), or skid-mounted. The fracturing fluid 910 may be a water-based fracturing fluid. In some implementations, the fracturing fluid 910 is slickwater that may be primarily water (for example, at least 98.5% water by volume). The fracturing fluid 910 can be prepared from seawater. The fracturing fluid 910 can also be gel-based fluids. The fracturing fluid 910 can include polymers and surfactants. Other additives to the fracturing fluid 910 may include hydrochloric acid, friction reducer, emulsion breaker, emulsifier, temperature stabilizer, and crosslinker. Fracturing fluids 910 of differing viscosity may be employed in the hydraulic fracturing. The fracturing fluid 910 may include proppant. In the illustrated embodiment, the fracturing fluid 910 is a reactive VES-based fracturing fluid for at least a portion of the hydraulic fracturing operation.

The hydraulic fracturing system at the well site 900 may include motive devices such as one or more pumps 912 to pump (inject) the fracturing fluid 910 through the wellbore 902 into the geological formation 906. The pumps 912 may be, for example, positive displacement pumps and arranged in series or parallel. Again, the wellbore 902 may be a cemented cased wellbore and have perforations for the fracturing fluid 910 to flow (injected) into the formation 906. In some implementations, the speed of the pumps 910 may be controlled to give desired flow rate of the fracturing fluid 910. The system may include a control component to modulate or maintain the flow of fracturing fluid 910 into the wellbore 902 for the hydraulic fracturing. The control component may be, for example, a control valve(s). In some implementations, as indicated, the control component may be the pump(s) 912 as a metering pump in which speed of the pump 912 is controlled to give the desired or specified flow rate of the fracturing fluid 910. The set point of the control component may be manually set or driven by a control system, such as the control system 914.

The fracturing fluid 910 may be prepared (formulated and mixed) offsite prior to disposition of the fracturing fluid 910 into the source 908 vessel at the well site 900. Alternatively, a portion (some components) of the fracturing fluid 910 may be mixed offsite and disposed into the source 908 vessel and the remaining portion (remaining components) of the fracturing fluid 910 added to the source 908 vessel or to a conduit conveying the fracturing fluid 910. In other implementations, the fracturing fluid 908 may be prepared onsite with components added to (and batch mixed in) the source 908 vessel.

For embodiments of the fracturing fluid 910 as a reactive VES-based fracturing fluid, the fracturing fluid 910 in the source 908 vessel may have all components of the fracturing fluid 910. In certain embodiments, some components of the fracturing fluid 910 may be added to the source 908 vessel near or at the time (or during) the pumping of the hydraulic fracturing fluid 910 into the wellbore 902 for the hydraulic fracturing. However, in other embodiments, not all components of the fracturing fluid 910 are include in the source 908 vessel. Instead, at least one component of the fracturing fluid 910 is be added to the conduit conveying the fracturing fluid 910 either on the suction of the pump 912 or discharge of the pump 912, or both, as the fracturing fluid 910 is being pumped into the wellbore 902.

An additive or component 916 may be added to the fracturing fluid 908. For the reactive VES-based fracturing fluid, the component 916 may be, for example, surfactant or the inorganic oxidizer salt. The concentration of the component 916 (for example, inorganic oxidizer salt) in the fracturing fluid 910 may be maintained or adjusted by modulating a flow rate (mass or volume) of addition of the component 916 via a control device 918. The set point of the control device 918 may be manually set or specified (directed) by the control system 914. The control device 918 may be a control valve on the conduit conveying component 916 to the source 908 (for example, vessel) of the fracturing fluid 910. For the component 916 as the inorganic oxidizer salt, the inorganic oxidizer salt may be added as a solid (powder), for example, via the control device 918 as a rotary feeder valve. Alternatively, the inorganic oxidizer salt may in added in an aqueous dispersion to the fracturing fluid 910 in the source 908 vessel. Moreover, instead of adding the component 916 to the source 108 vessel, the component 916 may be added to the discharge conduit of the pump 912 as the pump 912 is providing the fracturing fluid 910 into the wellbore 902.

The hydraulic fracturing system at the well site 900 may have a source of proppant, which can include railcars, hoppers, containers, or bins having the proppant. Proppant may be segregated by type or mesh size (particle size). The proppant can be, for example, sand or ceramic proppants. The source of proppant may be at the Earth surface 904 near or adjacent the wellbore 902. The proppant may be added to the fracturing fluid 910 such that the fracturing fluid 910 includes the proppant. In some implementations, the proppant may be added (for example, via gravity) to a conduit conveying the frac fluid 110, such as at a suction of a fracturing fluid pump 912. A feeder or blender may receive proppant from the proppant source and discharge the proppant into pump 912 suction conduit conveying the fracturing fluid 110.

The fracturing fluid 910 may be a slurry having the solid proppant. The pump 912 discharge flow rates (frac rates) may include a slurry rate which may be a flow rate of the fracturing fluid 910 as slurry having proppant. The pump 912 discharge flow rates (frac rates) may include a clean rate which is a flow rate of fracturing fluid 910 without proppant. In particular implementations, the fracturing system parameters adjusted may include at least pump(s) 912 rate, proppant concentration in the frac fluid 910, component 916 addition rate, and component 916 concentration in the fracturing fluid 910. Fracturing operations can be manual or guided with controllers.

The well site 900 may include a control system 914 that supports or is a component of the hydraulic fracturing system. The control system 914 includes a processor 920 and memory 922 storing code 924 (logic, instructions) executed by the processor 920 to perform calculations and direct operations at the well site 900. The processor 920 may be one or more processors and each processor may have one or more cores. The hardware processor(s) 920 may include a microprocessor, a central processing unit (CPU), a graphic processing unit (GPU), a controller card, or other circuitry. The memory may include volatile memory (for example, cache and random access memory (RAM)), nonvolatile memory (for example, hard drive, solid-state drive, and read-only memory (ROM)), and firmware. The control system 914 may include a desktop computer, laptop computer, computer server, programmable logic controller (PLC), distributed computing system (DSC), controllers, actuators, control cards, an instrument or analyzer, and a user interface. In operation, the control system 914 may facilitate processes at the well site 900 and including to direct operation of aspects of the hydraulic fracturing system.

The control system 914 may be communicatively coupled to a remote computing system that performs calculations and provides direction. The control system 914 may receive user input or remote-computer input that specifies the set points of the control device 916 or other control components in the hydraulic fracturing system. The control system 914 may specify the set point of the control device 918 for the component 916 addition. In some implementations, the control system 914 may calculate or otherwise determine the set point of the control device 118. The determination may be based at least in part on the operating conditions of the hydraulic fracturing and on information (or feedback) regarding the amount of kerogen in the region of the geological formation 906 being hydraulically fractured.

The fracturing fluid as a VES-based fluid containing oxidative materials may be applied (pumped) without other hydraulic fracturing fluids employed in the hydraulic fracturing. In other words, the VES-based fluid containing oxidative materials (for example inorganic oxidizer salt) may be pumped as a stand-alone hydraulic fracturing treatment to fracture the formation and to transport proppant. However, the VES-based fluid may also be applied (pumped) in tandem (in a sequence) with other fluids including other hydraulic fracturing fluids.

The VES-based fluid containing oxidative materials and proppant may be pumped alternatively with VES-based fluid containing oxidative materials and no proppant as a hybrid treatment. The VES-based fracturing fluid may also be pumped as part of conductivity channel fracturing. In other applications, the VES-based fluid containing oxidative materials may be pumped as part of a slickwater hydraulic fracturing operation in which the VES fluid is the proppant-laden fluid in the sequence. In certain implementations, the slickwater includes oxidizer for breaking down kerogen. The slickwater may be pumped before and after the VES fluid in the hydraulic fracturing. In certain cases, VES fluid is pumped first followed by slickwater fluid or other viscosified fluid so that when the VES fluid enters microfractures, the VES fluid generally does not damage the formation as slick water polymers can leave residue. The other viscosified fluid may include, for example, a fracturing fluid viscosified via a polymer.

The VES-based fluid containing oxidative materials may be pumped alternatively with $CO_2$-based fluids. A benefit of employing a $CO_2$-based fracturing fluid in tandem with the reactive VES-based fracturing fluid is that $CO_2$ slugs can promote expulsion of hydrocarbons from the formation. Further, $CO_2$-based fracturing fluid may include an oxidizer to break down organic material (kerogen) in the formation. $CO_2$ slugs may enhance delivery of oxidizer to the kerogen. The oxidizer in the $CO_2$-based fluid may be an organic oxidizer that is soluble in organic solutions or non-polar media (solvents) because the $CO_2$-based fracturing fluid may generally be non-polar. These "organic oxidizers" may include an organic cation and an oxidizer inorganic anion. The oxidizer inorganic anion may be, for example, chlorate or bromate. Other oxidizer inorganic anions of the organic oxidizers may include persulfate, perborate, percarbonate, hypochlorite, peroxide, or iodate.

Another implementation of a $CO_2$-based fracturing fluid that may be sequenced with the reactive VES-based fracturing fluid is a foam emulsion (oxidizer foam) including $CO_2$ (or other inert gas), water, and oxidizer to break down the kerogen in the formation during hydraulic fracturing. A benefit may include reduction of water use. Another benefit may be the effect of the inert gas ($CO_2$) on hydrocarbon recovery in displacement of hydrocarbons from the kerogen-laden formation. The oxidizer(s) in the foam may be at least one of an inorganic oxidizer and an organic oxidizer, which may reside in different phases of the foam, respectively.

Yet another implementation of a $CO_2$-based fracturing fluid that may be sequenced with the reactive VES-based fracturing fluid is supercritical $CO_2$ fracturing fluid. The supercritical $CO_2$ may have reactive oxidizer gases (for example, bromine, chlorine, chlorine dioxide, or ozone) for the treatment of kerogen-containing rocks to enhance hydraulic fracturing efficiency of unconventional source rock formations. The reactive oxidizer gases may chemically degrade kerogen to enhance rock fracability and clean fracture faces to increase permeability and decrease proppant embedment. The reactive gases may be suited for $CO_2$-based fracturing fluids because unlike conventional oxidizers, the reactive oxidizer gases here are generally soluble in non-polar solvents. The oxidizing gas as molecules may exist as a gas or supercritical fluid (at reservoir conditions) that is soluble in supercritical $CO_2$ and has a standard redox potential in excess of 1 volt. Reservoir conditions may be, for example, temperature greater than 200° F. and pressure greater than 3000 pounds per square inch gauge (psig). These reactive gases include, for example, bromine ($Br_2$), chlorine ($Cl_2$), fluorine ($F_2$), chlorine monofluoride (ClF), chlorine dioxide ($ClO_2$), oxygen ($O_2$), ozone ($O_3$), nitrous oxide ($N_2O$), or nitrite ($NO_2$) gases. Reactive gases may also be generated in situ upon injection of precursors with $CO_2$ into the formation.

The technique may involve mixing of supercritical $CO_2$ with an oxidizing gas stream. These oxidizing gas chemicals can be mixed on-the-fly with liquid $CO_2$ and surfactant to form the emulsion and pumped. The oxidant (oxidizer) should be consumed downhole and therefore may beneficially preclude flowback treatment or disposal. If the oxidant is prepared in situ, then the precursors may be injected with supercritical $CO_2$. For example: (1) the first precursor with $CO_2$ is injected, (2) a $CO_2$ spacer is then pumped, and (3) the second precursor with $CO_2$ is then injected. This sequence may prevent or reduce premature reaction of the precursors to form the reactive gas.

For bromine as the reactive gas, the bromine reacts with the kerogen and pyrite. The bromine may partially depolymerize the kerogen (a geopolymer). This reaction of bromine with kerogen may form light-chain products that escape when the $CO_2$ is vented. This reaction of bromine with kerogen may also form a brominated kerogen tar at least partially soluble in $CO_2$. This kerogen tar may be soluble in hydrocarbons and therefore leave the rock matrix migrating from the formation to the wellbore.

As for supply of $ClO_2$ as an oxidizer in the supercritical $CO_2$, $ClO_2$ generators commercially available may be deployed at the well site. The $ClO_2$ gas can be mixed with liquid $CO_2$ on-the-fly for the stimulation and treatment of organic-rich shale formation for enhanced hydrocarbon production. The $ClO_2$ gas generally does not hydrolyze when entering water and remains a dissolved gas in solution. The $ClO_2$ gas may be up to 10 times more soluble in water than is chlorine and therefore a larger dose (compared to chlorine) of the oxidizer gas $ClO_2$ can be delivered to the formation. In lieu of relying on $ClO_2$ generators, the $ClO_2$ gas may instead be generated in situ (downhole in the wellbore) via, for example, utilizing sodium chlorite. Over time, produced $ClO_2$ gas may help degrade the kerogen and increase production. If $ClO_2$ is the oxidant, $ClO_2$ should be prepared on site and used as a mixture with air.

Lastly, other $CO_2$-based hydraulic fracturing fluids may be employed in tandem with the present reactive VES-based fracturing fluid. For example, $CO_2$-based fluids with an oxidizer contain in-situ forming halogens may be employed.

Figure 10:
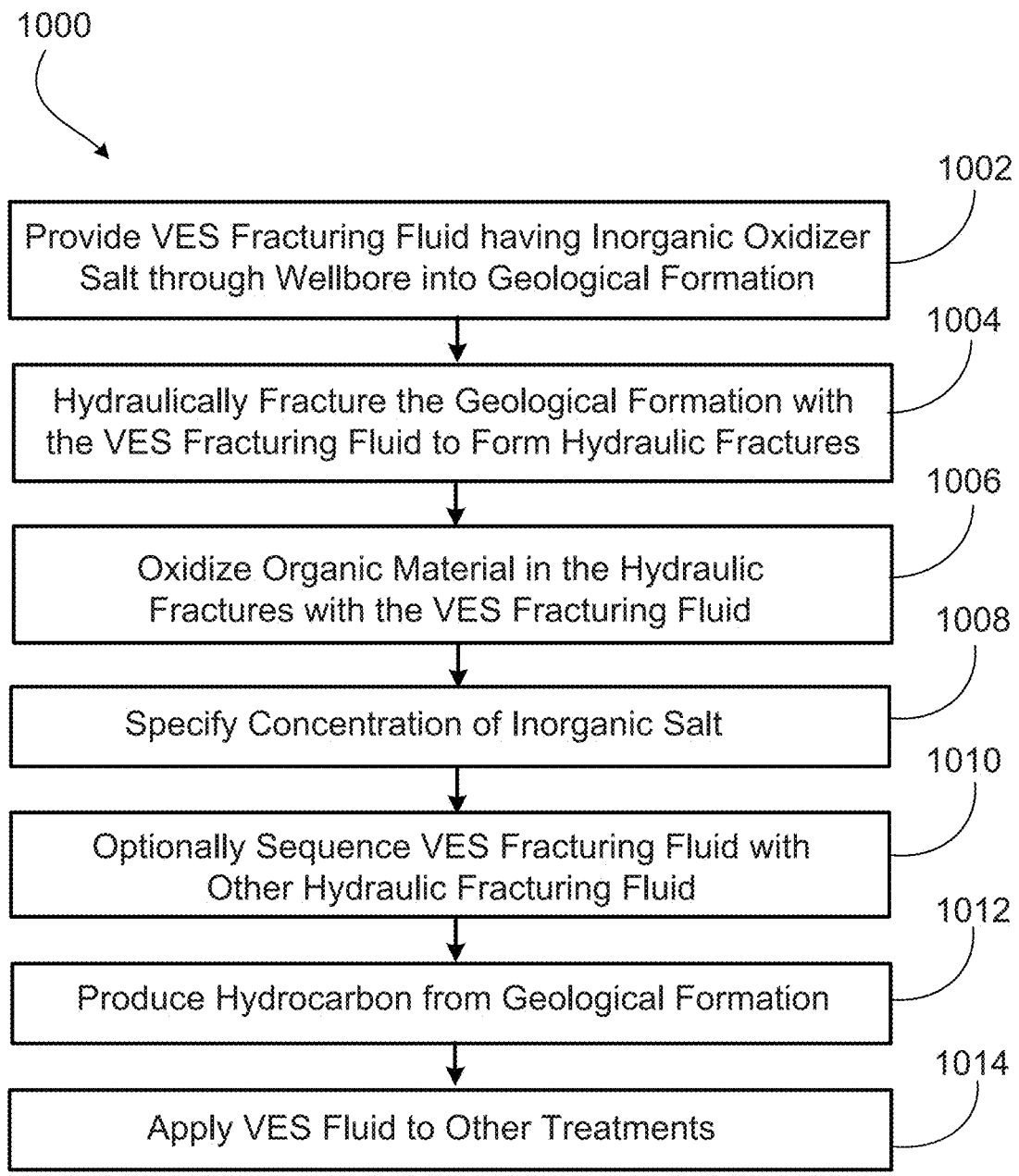
FIG. 10 is a method of hydraulic fracturing a geological formation having organic material.

FIG. 10 is a method 1000 of hydraulic fracturing a geological formation. The geological formation includes organic material, such as kerogen.

At block 1002, the method includes providing a VES fracturing fluid having a surfactant and an inorganic oxidizer salt through a wellbore into the geological formation. In implementations, the method includes pumping the VES fracturing fluid through the wellbore into the geological formation. The pumping may inject the VES fracturing fluid through perforations in cemented casing of the wellbore into the geological formation. The VES fracturing fluid may be a reactive VES fracturing fluid because of the presence of the inorganic oxidizing salt in the VES fracturing fluid. The concentration of the inorganic oxidizing salt in the VES fracturing fluid may be, for example, in a range of 1 wt % to 20 wt %. In some implementations, the concentration of the inorganic salt in the reactive VES fracturing fluid is at least 3 wt % or at least 5 wt %.

The VES fracturing fluid may include water. The VES fracturing fluid may include the surfactant at a concentration in a range of 0.1 wt % to 10 wt %. The method may include forming worm-like micelles from molecules of the surfactant to increase viscosity of the reactive VES fracturing fluid. The reactive VES fracturing fluid may include polymer to further increase viscosity of the reactive VES fracturing fluid. In other embodiments, the VES fracturing fluid does not include polymer.

The VES fracturing fluid may include another salt that is a monovalent salt or a divalent salt to promote formation of worm-like micelles from molecules of the surfactant that entangle to increase viscosity of the VES fracturing fluid. The reactive VES fracturing fluid may have this salt (for example, a monovalent salt or a divalent salt) that is not an oxidizer to promote micelle formation of the surfactant and with this salt at a concentration of less than 15 wt % in the VES fracturing fluid.

The method may include optionally adding proppant to the VES fracturing fluid. The VES fracturing fluid have proppant for at least a portion of time of providing (pumping) the VES fracturing fluid through the wellbore into the geological formation.

At block 1004 the method includes hydraulically fracturing the geological formation via the providing (pumping) of the VES fracturing fluid to form hydraulic fractures in the geological formation. The organic material (for example, kerogen) is present in the hydraulic fractures. Kerogen exists at fracture faces of the hydraulic fractures. In the initial forming of the hydraulic fractures, the kerogen blocks permeability between portions of the fracture faces and the geological formation. A fracture face is generally an interface of a hydraulic fracture with the geological formation.

At block 1006, the method includes oxidizing organic material (for example, kerogen) in the hydraulic fractures with the VES fracturing fluid. The oxidizing of the organic material may involve degrading and fragmenting the organic material. The oxidizing of the organic material may make the organic material (or at least a portion of the organic material) soluble in aqueous fluid. The degrading of the organic material may involve fragmenting the organic material to generate a permeable channel through the organic material. The oxidizing may include oxidizing organic material at a fracture face of the hydraulic fracture to fragment the organic material at the fracture face to generate a permeable channel from the geological formation into the hydraulic fracture. The generating the permeable channel increases conductivity of hydrocarbon from the geological formation through the hydraulic fracture to the wellbore. While fragments of the organic material may remain at the fracture face, the permeability is increased due the oxidation and attack by the VES fracturing fluid having the inorganic oxidizer salt. The oxidizing may include degrading the organic material involving dividing the organic material into pieces that can be solubilized in aqueous treatment fluid that is flowed back through the wellbore to the Earth surface.

At block 1008, the method includes specifying a concentration of the inorganic oxidizer salt in a VES fracturing fluid. The method may include specifying a concentration of the inorganic oxidizer salt in the VES fracturing fluid (reactive) based at least in part on an amount of kerogen in the geological formation. The VES fracturing fluid may include the inorganic oxidizer salt at the concentration as specified. The method may include adding the inorganic oxidizer salt to the reactive VES fracturing fluid to give the concentration as specified.

The concentration of the inorganic oxidizer salt in the VES fracturing fluid can depend on the quantity of kerogen or other organic matter in the reservoir rock in the geological formation, such as in the region of the geological formation being subjected to hydraulic fracturing with the VES fracturing fluid. The concentration of the inorganic oxidizer salt in the VES fracturing fluid to implement can be determined (specified) based on the particular inorganic oxidizer salt selected and on the amount and type of kerogen in the geological formation. Source-rock samples collected from the geological formation being hydraulically fractured or to be hydraulically fractured can be collected and analyzed. For example, laboratory tests (for instance, including etching) can be performed on kerogen embedded in rock surfaces of the samples. Further, the weight percent of the total organic carbon (TOC) in the formation can be determined, for example, via a TOC analyzer or pyrolysis unit. The amount of kerogen in the subterranean region of the geological formation to be hydraulically fractured can be calculated, determined, or estimated.

The amount of pyrite or other iron sulfides in the subterranean formation may also be considered in specifying the concentration of the inorganic oxidizer salt in the VES fracturing fluid. The weight percent of iron sulfide in the formation can be determined, for example, by testing the source-rock samples employing x-ray fluorescence, x-ray diffraction, or energy dispersive x-ray spectroscopy. The amount of kerogen or iron sulfide can also be taken, deduced, or inferred from well logs in certain instances. The determining or specifying the inorganic oxidizer salt concentration can account for the amount of inorganic oxidizer salt needed to degrade the organic material including kerogen while also accounting for the iron sulfide present in the formation.

The rock surface area within the fracture network that the reactive VES fluid will make contact in the formation can be considered with respect to specifying concentration of the inorganic oxidizer salt in the VES fluid. The expected size of the fracture network and the resulting surface area of the fractured zones can be estimated. Other factors relevant in determining or calculating the amount (concentration) of inorganic oxidizer salt to specify in the reactive VES fluid may include: (1) any organic components in the VES fluid; and (2) any organic components and amount of fluid downhole (including in the wellbore) at the time of placing the reactive VES fluid through the wellbore into the geological formation.

At block 1010, the method optionally includes alternating or sequencing the reactive VES fracturing fluid. The VES-based fluid containing oxidative materials and proppant may be pumped alternatively with VES-based fluid containing oxidative materials and no proppant as a hybrid treatment. The VES-based fracturing fluid may also be pumped as part of conductivity channel fracturing. In other applications, the method may include providing (pumping) a slickwater fracturing fluid through the wellbore into the geological formation before (and after) providing the VES fracturing fluid through the wellbore into the geological formation. The slickwater fracturing fluid may include an oxidizer. The VES fracturing fluid may include proppant. The method may include pumping a slickwater fracturing fluid through the wellbore into the geological formation in sequence with the pumping of the reactive VES-based fracturing fluid, where the VES-based fracturing fluid has proppant.

The method may include a sequence that alternates pumping a $CO_2$-based fracturing fluid with pumping the VES fracturing fluid having the oxidizer. The method may include alternating in a sequence: (1) providing a $CO_2$-based fracturing fluid through the wellbore into the geological formation with (2) providing the VES fracturing fluid through the wellbore into the geological formation. The $CO_2$-based fracturing fluid may have an oxidizer to attack kerogen.

At block 1012, the method may further include in addition to hydraulic fracturing, the production of hydrocarbon from the geological formation. The method may include producing hydrocarbon from the geological formation through the permeable channel (block 1006) and the hydraulic fracture(s) to the wellbore.

At block 1014, the method may include applying a reactive VES fluid for treatments other than hydraulic fracturing. This reactive VES-based treatment fluid may be the same or similar as the aforementioned VES fracturing fluid applied for hydraulic fracturing. These additional treatments may be outside of the context of hydraulic fracturing or in combination with the hydraulic fracturing. Implementations of treatments with the VES-based treatment fluid include: (1) upgrading oil in the subterranean formation (geological formation) by oxidizing the oil to reduce the boiling point of the oil; (2) degrading filter cake during open hole drilling or during hydraulic fracturing; (3) breaking organic matter (for example, paraffin, bitumen, or oil) in the subterranean formation by reducing the viscosity of the organic matter; and (4) removing organic scale (buildup) from a subterranean formation for clean-up to facilitate subsequent fluid injection for the wellbore employed as an injection well. The inorganic oxidizer salt in the VES treatment fluid may include iodates ($IO_3^-$).

Iodate salts may be included as the inorganic oxidizer salt in the VES fluid for options of heavy oil upgrading, in situ methane conversion, and other applications. The iodate salt may be $IO_3^-$ paired with lithium, sodium, potassium, magnesium, etc.

An implementation may be to pump the present VES fluid (having an inorganic oxidizer salt) through a wellbore into the subterranean formation to upgrade heavy oil in the subterranean formation. The upgrade of the heavy oil may be performed with the wellbore as an open hole wellbore. Heavy oil can include asphalt and bitumen. Heavy oil may be crude oil having an API gravity less than 22°, less than 21°, or less than 20°. Heavy oil may be crude oil having an API gravity in the range of 10° to 22°, 10° to 21°, or 10° to 20°. Crude oil with an API gravity less than 10° can be characterized or labeled as extra-heavy crude oil. The VES fluid (VES-based fluid) can be employed to upgrade heavy oil or extra-heavy oil. The upgrade may be to reduce the boiling point and viscosity of the heavy oil. The oxidization of the heavy oil by the VES fluid may degrade the heavy oil. The degradation may upgrade the heavy oil in the sense of reducing the boiling point and viscosity. The oxidation may dissolve resinous components of the heavy oil. The oxidation may reduce the molecular weight of the heavy oil by breaking molecular chains (molecules) of the heavy oil into shorter chains (molecules) and thus reduce the viscosity and boiling point of the heavy oil.

Another implementation is to pump the present reactive VES fluid (reactive VES-based fluid) through a wellbore into the subterranean formation to degrade and remove filter cake. A property of drilling fluid (mud) may be the formation of a filter cake. This filter cake may be deposited on the porous rocks under overbalance pressure conditions. Filter cake (mud cake or wall cake) may be a layer formed by solid particles in drilling mud against porous zones due to differential pressure between hydrostatic pressure and formation pressure. The structure of the filter cake may include a solid deposition insoluble in water. The material insoluble in water may be organic material. The removal of the filter cake with the present VES fluid may be in open hole drilling or during hydraulic fracturing. The VES fluid may oxidize (attack) the filter cake to break down and dissolve (or dislodge) the filter cake. The oxidizing of organic material with the reactive VES fluid may involve degrading a filter cake with the reactive VES fluid during drilling of the wellbore as an open hole wellbore or during hydraulic fracturing of the subterranean (geological) formation.

Other implementations include to pump the reactive VES fluid (reactive VES-based fluid) through a wellbore into a subterranean formation to break organic matter (for example, paraffin, bitumen, or oil) in the subterranean formation. The breaking (reducing the viscosity) of the organic matter may be by oxidation via the VES fluid. The oxidation may dissolve or partially dissolve the organic matter to reduce viscosity. Such may advance formation conductivity and thus subsequent oil and gas production. Yet other implementations may pump the present VES through a wellbore of an injection well to remove organic scale (buildup, residue) from a subterranean formation for cleanup of the organic scale. Such may facilitate subsequent fluid injection through the wellbore and subterranean formation in the operation of the injection well.

EXAMPLES

The Example are given only as examples and not meant to limit the present techniques. Example 1 and Example 2 are presented.

Example 1

Example 1 is directed to evaluating substitution of sodium bromate (an inorganic oxidizer salt) for typical salt in a VES fluid. In particular, three VES-based fluids were prepared in order to determine the effect of adding strong oxidizing salts (sodium bromate in particular in Example 1) to the fluid mixture and whether an oxidizing salt could replace the calcium chloride (or potassium chloride) typically used in VES fluids for hydraulic fracturing applications. The three VES fluids were prepared with water and erucamidopropyl hydroxypropylsultaine (as the viscoelastic surfactant) commercially known as Armovis EHS® available from Akzo Nobel N.V. having headquarters in Amsterdam, Netherlands. Salt was added to the three VES fluids. In particular the three VES fluids included: (1) the VES fluid containing calcium chloride ($CaCl_2$) salt; (2) the VES fluid containing both $CaCl_2$) salt and sodium bromate ($NaBrO_3$) oxidizer salt; and (3) the VES fluid containing $NaBrO_3$ oxidizer salt.

FIG. 11 is Table 1 (1100) giving solution parameters for these three VES fluid samples prepared for viscosity measurements. The sample column 1102 notes the respective sample number of 1, 2, or 3. The water 1104 in each sample was 135 milliliters (mL). The VES 1106 (erucamidopropyl hydroxypropylsultaine) in each sample was 7.5 mL. The amount 1108 of calcium chloride dehydrate ($CaCl_2.2H_2O$) is given in grams (g). The molality (m) 1110 of $CaCl_2$ is given in kilogram per mole of solution of the respective VES fluid samples. The amount 1112 of $NaBrO_3$ is given in grams (g). The molality (m) 1114 of $NaBrO_3$ is given in kilogram per mole of solution of the respective VES fluid samples. The total ion molality 1116 is give in kilograms per mole of solution of the respective VES fluid samples. The three samples of the VES fluids were prepared by first dissolving the salt(s) in the volume of water 1104 listed in the table. Then, the VES 1108 was added and the solution agitated for mixing.

After each fluid was prepared, the viscosity was measured with a rheometer. The temperature was initially ramped to 200° F. and held until the viscosity stabilized. The viscosity of all three fluids were similar (around 200 cP) with the most viscosity (about 230 cP) corresponding to the most total ion molality in solution and the least viscosity (about 175 cP) corresponding to the least total ion molality in solution. The effect of oxidizing salt as a replacement or addition is beneficially negligible, which suggests that the charge added by this salt is sufficient to encourage worm-like micelle formation in solution. This evaluation also shows that the surfactant is not susceptible to oxidative degradation at these temperatures. These two factors demonstrate that this fluid could be effectively pumped into the unconventional source rock formation.

In the tests, the temperature of the fluids were ramped and held to a series of greater temperatures: 250° F., 300° F., and 350° F. At 250° F., the viscosities of the fluids notably drop to about 100 cP, but the viscosities are stable at that temperature suggesting that the fluids had not degraded. Further temperature ramping (through 300° F. to 350° F.) shows the viscosity dropping to about 0 cP. These temperatures of 300+° F., however, are beyond the temperatures at which these fluids are pumped and therefore do not limit application of the fluids.

Figure 12:
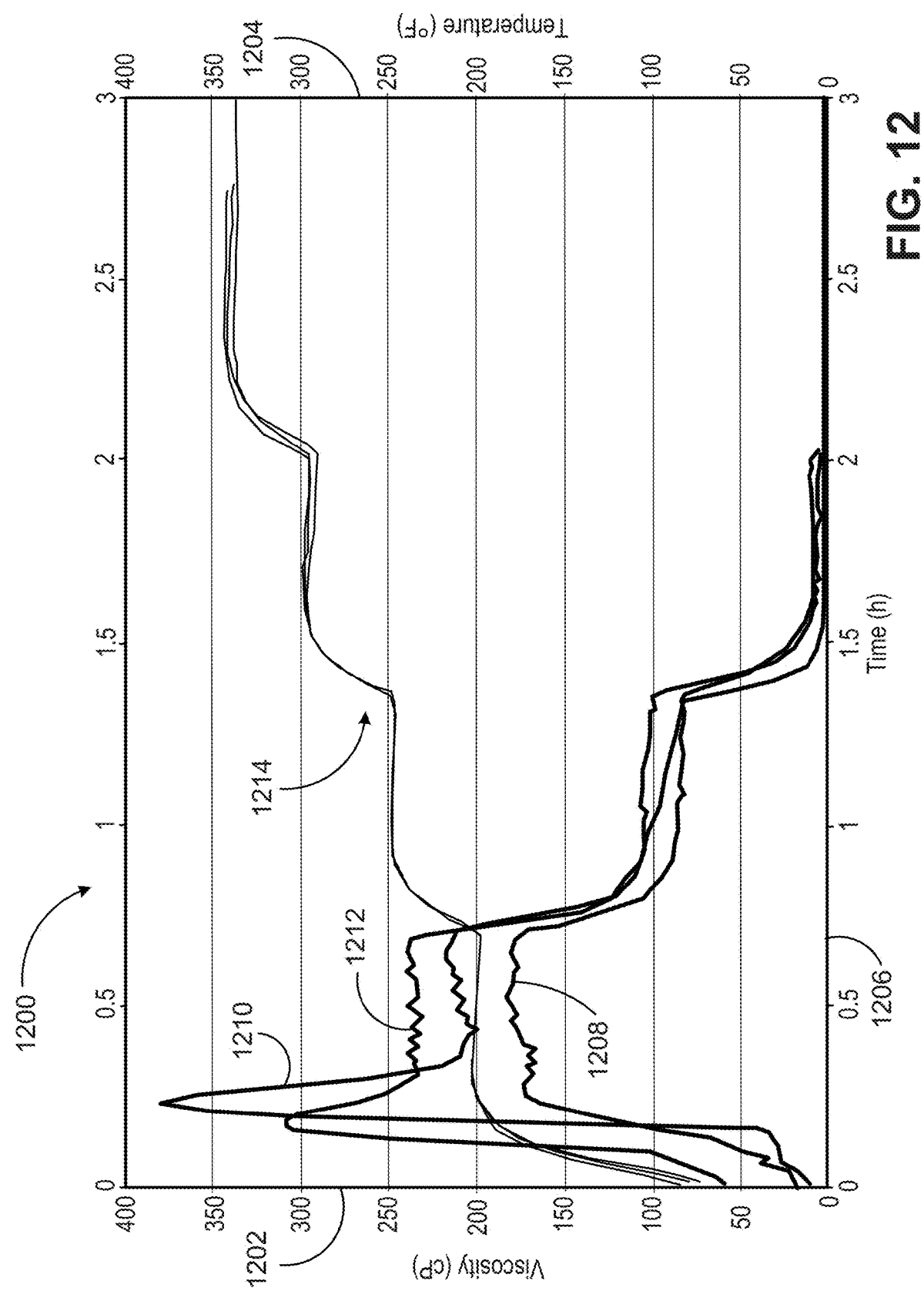
FIG. 12 is a plot of viscosity and temperature over time for the three VES fluid samples in Example 1.

FIG. 12 is a plot 1200 of viscosity (cP) 1202 and temperature (° F.) 1204 over time 1206 in hours (h). The plot 1200 gives rheological data for the three samples of VES-based fluid. The curve 1208 is the viscosity of sample 1. The curve 1210 is the viscosity of sample 2. The curve 1212 is the viscosity of sample 3. The three curves 1214 for temperature of the three samples, respectively, are essentially same at the relevant portion (temperatures) of the tests.

Example 2

Example 2 is directed to evaluating stability of a VES-based fluid having an inorganic oxidizer salt and a polymer. A polymer may be added to a VES fluid to boost viscosity of the VES fluid. However, the polymer may be susceptible to oxidative degradation. To evaluate whether such degradation would occur at the temperatures and timescale of a hydraulic fracturing job with a reactive VES, a VES fluid containing sodium bromate (an inorganic oxidizer salt) as the sole salt was prepared with three different amounts of a polymer. The polymer was Flopaam™ 5915 SH (abbreviated here as FP5915SH) from SNF Floerger having headquarters in Andrézieux, France. The FP5915SH polymer is a hydrophobically modified anionic-polyacrylamide-based terpolymer with the hydrophobic monomer content less than 1.5 mol % and containing 10-25 mol % of sulfonic monomer. The FP5915SH polymer was added in slurry form to three VES fluid samples.

FIG. 13 is Table 2 (1300) giving components of the tested fluids (the three VES fluid samples). Table 2 are solution parameters for the three VES fluids prepared with polymer additive FP9515SH for viscosity measurement. The sample column 1302 notes the respective sample number of 4, 5, or 6. The water 1304 in each sample was 135 mL. The VES 1306 (erucamidopropyl hydroxypropylsultaine) in each sample was 7.5 mL. The volume 1308 of FP9515SH polymer slurry added is given in mL. The amount 1310 of $NaBrO_3$ is given in grams (g). The molality (m) 1312 of $NaBrO_3$ is given in kilogram per mole of solution of the respective VES fluid samples.

Figure 14:
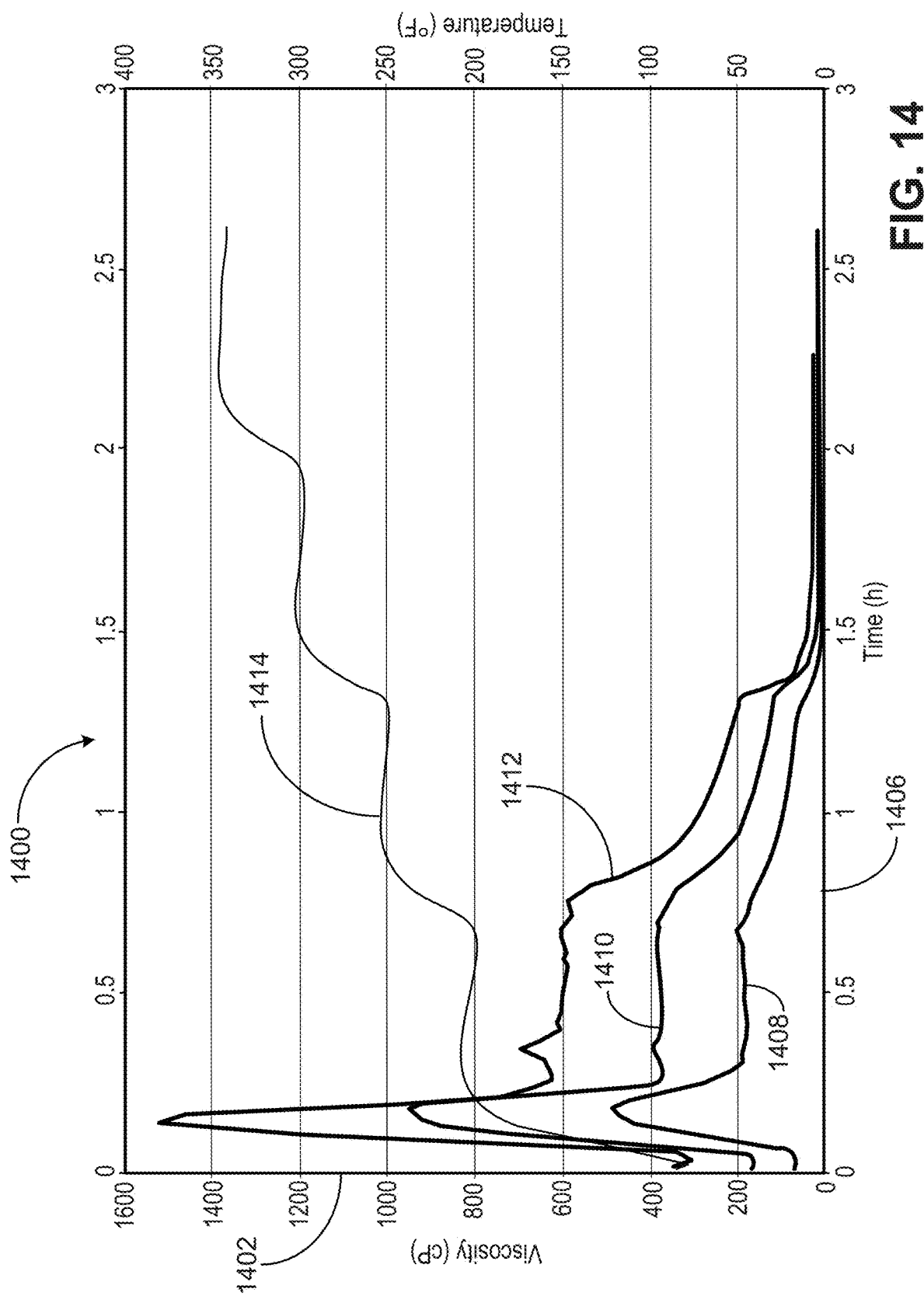
FIG. 14 is a plot of viscosity and temperature over time for the three VES fluid samples in Example 2.

FIG. 14 is a plot 1400 of viscosity (cP) 1402 and temperature (° F.) 1404 over time 1406 in hours (h). The plot 1400 gives rheological data for the three samples of VES-based fluid prepared with the FP9515SH polymer. Fluid compositional data is given in Table 2 of FIG. 13. In FIG. 14, the curve 1408 is the viscosity of sample 4. The curve 1410 is the viscosity of sample 5. The curve 1412 is the viscosity of sample 6. The curves 1414 is the approximate temperature of the three samples 4, 5, and 6 during the viscosity measurements. As can be seen in plot 1400, increasing addition of the polyacrylamide terpolymer (FP9515SH) increases the viscosity of the VES fluid. The fluid is stable at 200° F.

An embodiment is a method of hydraulic fracturing, including providing a VES fracturing fluid having a surfactant and an inorganic oxidizer salt through a wellbore into a geological formation to hydraulically fracture the geological formation to form a hydraulic fracture in the geological formation. The method includes oxidizing organic material in the hydraulic fracture with the VES fracturing fluid. The oxidizing of the organic material includes degrading (for example, fragmenting) the organic material, which includes kerogen. The oxidizing of the organic material may make at least a portion of the organic material soluble in aqueous fluid. The degrading of the organic material may involve fragmenting the organic material to generate a permeable channel through the organic material. The oxidizing may include oxidizing organic material at a fracture face of the hydraulic fracture to fragment the organic material at the fracture face to generate a permeable channel from the geological formation into the hydraulic fracture to increase conductivity of hydrocarbon from the geological formation through the hydraulic fracture to the wellbore. The fracture face may be an interface of the hydraulic fracture with the geological formation.

In certain implementations, the VES fracturing fluid does not include polymer. The concentration of the surfactant in the VES fracturing fluid may be in a range of 0.1 wt % to 10 wt %. The method may include specifying a concentration of the inorganic oxidizer salt in the VES fracturing fluid based at least in part on an amount of kerogen in the geological formation. The VES fracturing fluid may have the inorganic oxidizer salt at the concentration as specified. The concentration of the inorganic salt in the VES fracturing fluid may be in a range of 1 wt % to 20 wt %. The inorganic oxidizer salt may include $LiClO_3$, $NaClO_3$, $KClO_3$, $Mg(ClO_3)_2$, $Ca(ClO_3)_2$, $Sr(ClO_3)_2$, $Ba(ClO_3)_2$, $LiBrO_3$, $NaBrO_3$, $KBrO_3$, $Mg(BrO_3)_2$, $Ca(BrO_3)_2$, $Sr(BrO_3)_2$, or $Ba(BrO_3)_2$, or any combinations thereof. The inorganic oxidizer salt may include iodates ($IO_3^-$).

Iodate salts may be including as the inorganic oxidizer salt with the present VES as a delivery method, for example, for options of heavy oil upgrading, in situ methane conversion, and other applications. The specific iodate ($IO_3^-$) salt may be similar salts to the aforementioned salts with lithium, sodium, potassium, magnesium, etc.

The VES fracturing fluid may have another salt (in addition to the inorganic oxidizer salt) that is a monovalent salt or a divalent salt to promote formation of worm-like micelles from molecules of the surfactant that entangle to increase viscosity of the VES fracturing fluid. The other salt may include $LiF$, $NaF$, $KF$, $MgF_2$, $CaF_2$, $SrF_2$, $BaF_2$, $LiCl$, $NaCl$, $KCl$, $MgCl_2$, $CaCl_2$), $SrCl_2$, $BaCl_2$, $LiBr$, $NaBr$, $KBr$, $MgBr_2$, $CaBr_2$, $SrBr_2$, or $BaBr_2$, or any combinations thereof.

The method may include adding proppant to the VES fracturing fluid. The VES fracturing fluid may include the proppant for at least a portion of time of providing the VES fracturing fluid through the wellbore into the geological formation. The method may include providing a slickwater fracturing fluid (for example, also having an oxidizer) through the wellbore into the geological formation before or after providing the VES fracturing fluid through the wellbore into the geological formation. The method may include providing a viscosified fracturing fluid through the wellbore into the geological formation before or after providing the VES fracturing fluid through the wellbore into the geological formation. The method may include providing a $CO_2$-based fracturing fluid through the wellbore into the geological formation before or after providing the VES fracturing fluid through the wellbore into the geological formation. The $CO_2$-based fracturing fluid may have an organic oxidizer that attacks the organic material. The $CO_2$-based fracturing fluid includes a reactive gas that attacks the organic material. The reactive gas may be, for example, $Br_2$, $Cl_2$, $F_2$, $ClF$, $ClO_2$, $O_2$, $O_3$, $N_2O$, or $NO_2$, or any combinations thereof.

Another embodiment is a method including pumping a reactive VES fracturing fluid having a surfactant and an inorganic oxidizer salt through a wellbore into a geological formation for hydraulic fracturing of the geological formation. The method includes forming hydraulic fractures in the geological formation with the reactive VES fracturing fluid and oxidizing organic material in the hydraulic fractures with the reactive VES fracturing fluid. The method includes generating a permeable channel through organic material at a fracture face of a hydraulic fracture between the geological formation and the hydraulic fracture via oxidizing of the organic material at the fracture face with the reactive VES fracturing fluid. The oxidizing of the organic material (for example, including kerogen) at the fracture face may fragment the organic material at the fracture face. In certain implementations, the concentration of the inorganic salt in the reactive VES fracturing fluid is at least 3 wt %. In some implementations, the inorganic oxidizer salt may include magnesium peroxide, calcium peroxide, sodium nitrate, sodium nitrite, sodium persulfate, potassium persulfate, sodium tetraborate, sodium percarbonate, sodium hypochlorite, an iodate salt, a periodate salt, a dichromate salt, or a permanganate salt, or any combinations thereof. The oxidizing may include degrading the organic material involving dividing the organic material into pieces that can be solubilized in aqueous treatment fluid that is flowed back through the wellbore to the Earth surface.

The method may include forming worm-like micelles from molecules of the surfactant to increase viscosity of the reactive VES fracturing fluid. The reactive VES fracturing fluid may further include polymer to further increase viscosity of the reactive VES fracturing fluid. The reactive VES fracturing fluid may include a salt that is not an oxidizer to promote micelle formation of the surfactant. This salt may be, for example, a monovalent salt or a divalent salt and at a concentration in the reactive VES fracturing fluid less than 15 wt %. The method may include specifying a concentration of the inorganic oxidizer salt in the reactive VES fracturing fluid based at least in part on an amount of kerogen in the geological formation. The method may include adding the inorganic oxidizer salt to the reactive VES fracturing fluid to give the concentration as specified. The reactive VES fracturing fluid may include proppant for at least a portion of time of pumping the reactive VES fracturing fluid through the wellbore into the geological formation. The method may include pumping a slickwater fracturing fluid through the wellbore into the geological formation in sequence with the pumping of the reactive VES-based fracturing fluid having proppant in the sequence. The method may include producing hydrocarbon from the geological formation through the permeable channel and the hydraulic fracture to the wellbore.

Yet another embodiment is a reactive VES fracturing fluid for hydraulic fracturing of a geological formation. The reactive VES fracturing fluid includes a surfactant at a concentration in the reactive VES fracturing fluid in a range of 0.1 wt % to 10 wt %. The reactive VES fracturing fluid includes an inorganic oxidizer salt for the reactive VES fracturing fluid to degrade kerogen in the geological formation. The concentration of the inorganic oxidizer salt in the VES fracturing fluid may be in a range of 1 wt % to 20 wt %. The concentration of the inorganic oxidizer salt in the VES fracturing fluid may be at least 3 wt %. In implementations, the inorganic oxidizer salt may promote micelle formation of the surfactant. The inorganic oxidizer salt may include $LiClO_3$, $NaClO_3$, $KClO_3$, $Mg(ClO_3)_2$, $Ca(ClO_3)_2$, $Sr(ClO_3)_2$, $Ba(ClO_3)_2$, $LiBrO_3$, $NaBrO_3$, $KBrO_3$, $Mg(BrO_3)_2$, $Ca(BrO_3)_2$, $Sr(BrO_3)_2$, or $Ba(BrO_3)_2$, or any combinations thereof. The inorganic oxidizer salt may include magnesium peroxide, calcium peroxide, sodium nitrate, sodium nitrite, sodium persulfate, potassium persulfate, sodium tetraborate, sodium percarbonate, sodium hypochlorite, an iodate salt, a periodate salt, a dichromate salt, or a permanganate salt, or any combinations thereof. The reactive VES fracturing fluid may include a salt that is not the inorganic oxidizer salt, that is inert to oxidation, and that promotes micelle formation of the surfactant to increase viscosity of the reactive VES fracturing fluid. Concentration of this salt (for example, a monovalent salt or a divalent salt) in the reactive VES fracturing fluid is generally in a range of 1 wt % to 50 wt %, or may be less than 15 wt %. This salt that is not the inorganic oxidizer salt may include LiF, NaF, KF, $MgF_2$, $CaF_2$, $SrF_2$, $BaF_2$, LiCl, NaCl, KCl, $MgCl_2$, $CaCl_2$, $SrCl_2$, $BaCl_2$, LiBr, NaBr, KBr, $MgBr_2$, $CaBr_2$, $SrBr_2$, or $BaBr_2$, or any combinations thereof. The reactive VES fracturing fluid may include phthalic acid, salicylic acid, or their salts, or any combination thereof. The reactive VES fracturing fluid may include a crosslinkable polymer. The reactive VES fracturing fluid may include a crosslinked polymer that increases viscosity of the reactive VES fracturing fluid.

Yet another embodiment is a reactive VES fracturing fluid for hydraulic fracturing of a subterranean formation. The reactive VES fracturing fluid includes water (for example seawater), a surfactant at a concentration in the reactive VES fracturing fluid in a range of 0.5 wt % to 10 wt %, and an inorganic oxidizer salt for the reactive VES fracturing fluid to oxidize kerogen in the subterranean formation to fragment the kerogen. The VES fracturing fluid may have another salt including a monovalent salt or a divalent salt, or a combination thereof, to promote micelle formation of the surfactant. The surfactant may be a zwitterionic surfactant that is a betaine or a sultaine. The surfactant may be a zwitterionic surfactant that is a dihydroxyl alkyl glycinate, alkyl ampho acetate or propionate, alkyl amidoamine oxide, gemini VES, alkyl betaine, alkyl amidopropyl betaine, alkylimino monopropionates, or alkylimino di-propionates, or any combinations thereof. The surfactant may be a zwitterionic surfactant that is disodium tallowiminodipropionate, disodium oleamidopropyl betaine, or erucylamidopropyl betaine, or any combinations thereof. The surfactant may be a cationic surfactant, such as an alkylammonium salt. The alkylammonium salt may include oleyl methyl bis(2-hydroxyethyl) ammonium chloride, erucyl bis(2-hydroxylethyl)methylammonium chloride, N, N, N, trimethyl-1-octadecammonium chloride, cetyltrimethylammonium bromide (CTAB), or dimethylene-1,2-bis(dodecyldimethylammonium bromide), or any combinations thereof. The surfactant may include an anionic surfactant, such as at least one of an alkyl sarcosinate or a sulfanate. The surfactant may include a nonionic surfactant, such as an amido amino oxide. In implementations, the surfactant may include a first surfactant that is a cationic surfactant and a second surfactant that is an anionic surfactant.

Yet another embodiment is a method of applying a reactive VES-based fluid. The method includes providing the reactive VES-based fluid having a surfactant and an inorganic oxidizer salt through a wellbore into a subterranean formation. The concentration of the inorganic oxidizer salt in the reactive VES-based fluid is in a range of 1 wt % to 20 wt %. In certain implementations, the concentration is at least is at least 3 wt %. The method includes oxidizing organic material in the subterranean formation with the reactive VES-based fluid. In some implementations, a filter cake includes the organic material. If so, the oxidizing of the organic material involves degrading the filter cake with the reactive VES-based fluid and where the wellbore is an open hole wellbore. The oxidizing of organic material may include degrading a filter cake with the reactive VES-based fluid during drilling of the wellbore, where the wellbore includes an open hole wellbore. The oxidizing of organic material may include degrading a filter cake with the reactive VES-based fluid during hydraulic fracturing of the subterranean formation with the reactive VES-based fluid.

In implementations, an injection well includes the wellbore. In these implementations, the oxidizing of the organic material involves oxidizing accumulated organic material to remove the accumulated organic material (for example, organic scale or organic residue) to promote fluid injection through the injection well into the subterranean formation. In other implementations, the oxidizing of the organic material involves upgrading oil in subterranean formation with the reactive VES-based fluid. The wellbore may be an open hole wellbore. The oil includes heavy oil having an American Petroleum Institute (API) gravity less than 20°. In implementations, the oxidizing of the organic material comprises includes breaking organic matter in subterranean formation with the reactive VES-based fluid. The organic matter includes heavy oil or paraffin, or a combination thereof.

A number of implementations have been described. Nevertheless, it will be understood that various modifications may be made without departing from the spirit and scope of the disclosure.

What is claimed is:

1. A method of hydraulic fracturing, comprising:
providing a viscoelastic surfactant (VES) fracturing fluid comprising a surfactant and an inorganic oxidizer salt through a wellbore into a geological formation to hydraulically fracture the geological formation to form a hydraulic fracture in the geological formation;
oxidizing organic material in the hydraulic fracture with the VES fracturing fluid, wherein oxidizing the organic material comprises degrading the organic material comprising fragmenting the organic material, thereby generating a permeable channel through the organic material, and wherein the organic material comprises kerogen; and
providing a carbon dioxide ($CO_2$)-based fracturing fluid through the wellbore into the geological formation before or after providing the VES fracturing fluid through the wellbore into the geological formation, wherein the $CO_2$-based fracturing fluid comprises an organic oxidizer that attacks the organic material, and wherein the organic oxidizer comprises an organic cation and an oxidizer inorganic anion comprising chlorate, bromate, persulfate, perborate, percarbonate, hypochlorite, peroxide, or iodate, or any combination thereof.

2. The method of claim 1, wherein oxidizing comprises oxidizing organic material at a fracture face of the hydraulic fracture to fragment the organic material at the fracture face to generate the permeable channel from the geological formation into the hydraulic fracture, the permeable channel increasing conductivity of hydrocarbon from the geological formation through the hydraulic fracture to the wellbore, wherein the fracture face comprises an interface of the hydraulic fracture with the geological formation.

3. The method of claim 1, comprising specifying a concentration of the inorganic oxidizer salt in the VES fracturing fluid based at least in part on an amount of kerogen in the geological formation, wherein the VES fracturing fluid comprises the inorganic oxidizer salt at the concentration as specified, wherein the concentration of the inorganic oxidizer salt in the VES fracturing fluid is in a range of 1 weight percent (wt %) to 20 wt %, and wherein the oxidizer inorganic anion comprises chlorate or bromate, or both.

4. The method of claim 1, wherein oxidizing the organic material makes at least a portion of the organic material soluble in aqueous fluid, and wherein the inorganic oxidizer salt comprises lithium chlorate ($LiClO_3$), sodium chlorate ($NaClO_3$), potassium chlorate ($KClO_3$), magnesium chlorate [$Mg(ClO_3)_2$], calcium chlorate [$Ca(ClO_3)_2$], strontium chlorate [$Sr(ClO_3)_2$], barium chlorate [$Ba(ClO_3)_2$], lithium bromate ($LiBrO_3$), sodium bromate ($NaBrO_3$), potassium bromate ($KBrO_3$), magnesium bromate [$Mg(BrO_3)_2$], calcium bromate [$Ca(BrO_3)_2$], strontium bromate [$Sr(BrO_3)_2$], or barium bromate [$Ba(BrO_3)_2$], or any combinations thereof.

5. The method of claim 1, comprising:
specifying adding another salt comprising a monovalent salt or a divalent salt to the VES fracturing fluid to promote formation of worm-like micelles from molecules of the surfactant that entangle to increase viscosity of the VES fracturing fluid; and
adding the another salt in response to specifying adding the another salt, thereby promoting formation of the worm-like micelles by adding the another salt, wherein adding the another salt gives a concentration of the another salt in the VES fracturing fluid in a range of 1 wt % to 50 wt %.

6. The method of claim 5, wherein the another salt comprises lithium fluoride (LiF), sodium fluoride (NaF), potassium fluoride (KF), magnesium fluoride ($MgF_2$), calcium fluoride ($CaF_2$), strontium fluoride ($SrF_2$), barium fluoride ($BaF_2$), lithium chloride (LiCl), potassium chloride (KCl), magnesium chloride ($MgCl_2$), calcium chloride ($CaCl_2$), strontium chloride ($SrCl_2$), barium chloride ($BaCl_2$), lithium bromide (LiBr), sodium bromide (NaBr), potassium bromide (KBr), magnesium bromide ($MgBr_2$), calcium bromide ($CaBr_2$), strontium bromide ($SrBr_2$), or barium bromide ($BaBr_2$), or any combinations thereof.

7. The method of claim 5, comprising adding proppant to the VES fracturing fluid, wherein the VES fracturing fluid comprises the proppant for at least a portion of time of providing the VES fracturing fluid through the wellbore into the geological formation, wherein the VES fracturing fluid comprises the surfactant at a concentration in a range of 0.1 wt % to 10 wt %, wherein the VES fracturing fluid does not comprise seawater, and wherein the VES fracturing fluid does not comprise polymer.

8. The method of claim 1, comprising providing a slickwater fracturing fluid through the wellbore into the geological formation before or after providing the VES fracturing fluid through the wellbore into the geological formation.

9. The method of claim 8, wherein the slickwater fracturing fluid comprises an oxidizer, and wherein the VES fracturing fluid comprises proppant.

10. The method of claim 1, comprising providing a viscosified fracturing fluid through the wellbore into the geological formation before or after providing the VES fracturing fluid through the wellbore into the geological formation.

11. A method comprising:
pumping a reactive viscoelastic-surfactant (VES) fracturing fluid comprising a surfactant and an inorganic oxidizer salt through a wellbore into a geological formation for hydraulic fracturing of the geological formation;
forming hydraulic fractures in the geological formation with the reactive VES fracturing fluid;
oxidizing organic material in the hydraulic fractures with the reactive VES fracturing fluid;
generating a permeable channel through organic material at a fracture face of a hydraulic fracture between the geological formation and the hydraulic fracture via oxidizing of the organic material at the fracture face with the reactive VES fracturing fluid, the permeable channel increasing conductivity of hydrocarbon from the geological formation into the hydraulic fracture; and
providing a carbon dioxide ($CO_2$)-based fracturing fluid through the wellbore into the geological formation before or after providing the VES fracturing fluid through the wellbore into the geological formation, wherein the $CO_2$-based fracturing fluid comprises an organic oxidizer that attacks the organic material, and wherein the organic oxidizer comprises an organic cation and an oxidizer inorganic anion comprising chlorate, bromate, persulfate, perborate, percarbonate, hypochlorite, peroxide, or iodate, or any combination thereof.

12. The method of claim 11, comprising forming worm-like micelles from molecules of the surfactant to increase viscosity of the reactive VES fracturing fluid by adding a salt to the reactive VES fracturing fluid, the salt comprising a monovalent salt or divalent salt, or both, wherein oxidizing comprises degrading the organic material comprising dividing the organic material into pieces that can be solubilized in aqueous treatment fluid that is flowed back through the wellbore to an Earth surface.

13. The method of claim 12, wherein the reactive VES fracturing fluid comprises polymer to further increase viscosity of the reactive VES fracturing fluid, and wherein adding the salt gives a concentration of the salt in the VES fracturing fluid in a range of 1 wt % to 15 wt %.

14. The method of claim 11, wherein the reactive VES fracturing fluid comprises a salt that is not an oxidizer to promote micelle formation of the surfactant, the salt comprising a monovalent salt or a divalent salt, and wherein concentration of the salt in the VES fracturing fluid is in a range of 1 weight percent to 15 weight percent (wt %).

15. The method of claim 14, wherein oxidizing the organic material at the fracture face fragments the organic material at the fracture face, wherein the organic material at the fracture face comprises kerogen, and wherein the salt comprises lithium fluoride (LiF), sodium fluoride (NaF), potassium fluoride (KF), magnesium fluoride ($MgF_2$), calcium fluoride ($CaF_2$), strontium fluoride ($SrF_2$), barium fluoride ($BaF_2$), lithium chloride (LiCl), potassium chloride (KCl), magnesium chloride ($MgCl_2$), calcium chloride ($CaCl_2$), strontium chloride ($SrCl_2$), barium chloride ($BaCl_2$), lithium bromide (LiBr), sodium bromide (NaBr), potassium bromide (KBr), magnesium bromide ($MgBr_2$), calcium bromide ($CaBr_2$), strontium bromide ($SrBr_2$), or barium bromide ($BaBr_2$), or any combinations thereof.

16. The method of claim 11, comprising specifying a concentration of the inorganic oxidizer salt in the reactive VES fracturing fluid based at least in part on an amount of kerogen in the geological formation.

17. The method of claim 16, comprising adding the inorganic oxidizer salt to the reactive VES fracturing fluid to give the concentration as specified.

18. The method of claim 17, wherein concentration of the inorganic oxidizer salt in the reactive VES fracturing fluid is at least 3 wt %, wherein the reactive VES fracturing fluid comprises proppant for at least a portion of time of pumping the reactive VES fracturing fluid through the wellbore into the geological formation, and wherein the inorganic oxidizer salt comprises lithium chlorate ($LiClO_3$), sodium chlorate ($NaClO_3$), potassium chlorate ($KClO_3$), magnesium chlorate [$Mg(ClO_3)_2$], calcium chlorate [$Ca(ClO_3)_2$], strontium chlorate [$Sr(ClO_3)_2$], barium chlorate [$Ba(ClO_3)_2$], lithium bromate ($LiBrO_3$), sodium bromate ($NaBrO_3$), potassium bromate ($KBrO_3$), magnesium bromate [$Mg(BrO_3)_2$], calcium bromate [$Ca(BrO_3)_2$], strontium bromate [$Sr(BrO_3)_2$], or barium bromate [$Ba(BrO_3)_2$], or any combinations thereof.

19. The method of claim 17, wherein the inorganic oxidizer salt comprises magnesium peroxide, calcium peroxide, sodium nitrate, sodium nitrite, sodium persulfate, potassium persulfate, sodium tetraborate, sodium percarbonate, sodium hypochlorite, an iodate salt, a periodate salt, a dichromate salt, or a permanganate salt, or any combinations thereof.

20. The method of claim 11, comprising pumping a slickwater fracturing fluid through the wellbore into the geological formation in sequence with the pumping of the reactive VES-based fracturing fluid, wherein the VES-based fracturing fluid comprises proppant.

21. The method of claim 11, comprising producing hydrocarbon from the geological formation through the permeable channel and the hydraulic fracture to the wellbore.

22. A method of applying a reactive viscoelastic surfactant (VES) based fluid, comprising:
  providing the reactive VES-based fluid comprising a surfactant and an inorganic oxidizer salt through a wellbore into a subterranean formation, wherein concentration of the inorganic oxidizer salt in the reactive VES-based fluid is in a range of 1 wt % to 20 wt %;
  oxidizing organic material in the subterranean formation with the reactive VES-based fluid, wherein oxidizing organic material comprises:
    degrading kerogen at a fracture face of a hydraulic fracture formed via the reactive VES-based fluid, wherein degrading the kerogen comprises fragmenting the kerogen to generate a permeable channel through the kerogen from the subterranean formation to the hydraulic fracture, thereby increasing conductivity of hydrocarbon from the subterranean formation into the hydraulic fracture; and
    degrading a filter cake with the reactive VES-based fluid during hydraulic fracturing of the subterranean formation with the reactive VES-based fluid; and
  providing a carbon dioxide ($CO_2$)-based fracturing fluid through the wellbore into the subterranean formation before or after providing the VES-based fluid through the wellbore into the subterranean formation, wherein the $CO_2$-based fracturing fluid comprises an organic oxidizer that attacks the organic material, and wherein the organic oxidizer comprises an organic cation and an oxidizer inorganic anion comprising chlorate, bromate, persulfate, perborate, percarbonate, hypochlorite, peroxide, or iodate, or any combination thereof.

* * * * *